US011204767B2

(12) United States Patent
Nilsen

(10) Patent No.: US 11,204,767 B2
(45) Date of Patent: Dec. 21, 2021

(54) CONTEXT SWITCHING LOCATIONS FOR COMPILER-ASSISTED CONTEXT SWITCHING

(71) Applicant: International Business Machines Corporation, Armonk, NY (US)

(72) Inventor: Kelvin Don Nilsen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 16/734,739

(22) Filed: Jan. 6, 2020

(65) Prior Publication Data

US 2021/0208886 A1 Jul. 8, 2021

(51) Int. Cl.
G06F 9/30 (2018.01)
G06F 8/41 (2018.01)
G06F 16/901 (2019.01)
G06F 9/46 (2006.01)

(52) U.S. Cl.
CPC ............ G06F 9/3016 (2013.01); G06F 8/441 (2013.01); G06F 8/4434 (2013.01); G06F 9/461 (2013.01); G06F 16/9014 (2019.01)

(58) Field of Classification Search
None
See application file for complete search history.

(56) References Cited

U.S. PATENT DOCUMENTS

| 5,815,701 | A  | 9/1998  | Slavenburg |
| 5,872,963 | A  | 2/1999  | Bitar et al. |
| 6,081,665 | A  | 6/2000  | Nilsen |
| 7,360,216 | B2 | 4/2008  | Spoltore |
| 7,565,659 | B2 | 7/2009  | Day et al. |
| 7,756,911 | B2 | 7/2010  | Bacon |
| 7,831,961 | B1 | 11/2010 | Bush |
| 8,402,429 | B2 | 3/2013  | Kielstra |
| 8,909,892 | B2 | 12/2014 | Zetterman et al. |
| 9,424,105 | B2 | 8/2016  | Park |
| 9,710,354 | B2 | 7/2017  | Klausner |
| 9,811,434 | B1 | 11/2017 | Wagner |
| 9,870,252 | B2 | 1/2018  | Bates |
| 9,996,386 | B2 | 6/2018  | Rauchfuss et al. |

(Continued)

OTHER PUBLICATIONS

Bril et al., "Improved Feasibility of Fixed-Priority Scheduling with Deferred Preemption Using Preemption Thresholds for Preemption Points", RTNS '13 Proceedings of the 21st International Conference on Real-Time Networks and Systems, Sophia Antipolis, France, Oct. 2013, pp. 255-264.

(Continued)

Primary Examiner — Corey S Faherty
(74) Attorney, Agent, or Firm — Michael A. Petrocelli

(57) ABSTRACT

Generating context switching locations for compiler-assisted context switching. A set of possible locations is determined for preferred preemption points in a set of threads based on (i) an identification of a set of candidate markers for preferred preemption points and (ii) a type of characteristic that is associated with a possible location included in the set of possible locations. A modified set of possible locations is generated in a data structure based on the type of characteristic, wherein the modified set of possible locations indicate one or more preferred preemption points in the set of threads.

19 Claims, 42 Drawing Sheets

(56) References Cited

U.S. PATENT DOCUMENTS

| | | | |
|---|---|---|---|
| 10,078,515 | B2 | 9/2018 | Gschwind |
| 10,282,812 | B2* | 5/2019 | Koker .................. G06F 9/30185 |
| 10,552,201 | B2* | 2/2020 | Cuadra .................. G06F 9/3844 |
| 2002/0062463 | A1 | 5/2002 | Hines |
| 2004/0078785 | A1 | 4/2004 | Dutt |
| 2006/0112377 | A1 | 5/2006 | Nacul |
| 2007/0022423 | A1 | 1/2007 | Bril |
| 2007/0288538 | A1 | 12/2007 | Bacon |
| 2008/0270771 | A1 | 10/2008 | Lee |
| 2010/0251260 | A1 | 9/2010 | May |
| 2011/0202907 | A1 | 8/2011 | Dice |
| 2013/0152096 | A1 | 6/2013 | Park |
| 2014/0115596 | A1 | 4/2014 | Khan |
| 2014/0195788 | A1 | 7/2014 | Kalogeropulos |
| 2016/0140686 | A1* | 5/2016 | Lueh .................. G06F 9/30043 345/522 |
| 2017/0269964 | A1 | 9/2017 | Ashbaugh |
| 2018/0293692 | A1* | 10/2018 | Koker ........................ G06T 1/20 |
| 2020/0264880 | A1* | 8/2020 | Nilsen ...................... G06F 8/458 |

OTHER PUBLICATIONS

Degenbaev et al., "Idle Time Garbage Collection Scheduling", PLDI'16, Proceedings of the 37th ACM SIGPLAN Conference on Programming Language Design and Implementation, Jun. 2016, Santa Barbara, CA, pp. 570-583, ACM, New York, NY.

Github, Inc., "Runtime: Tight Loops Should Be Preemptible #10958", aclements opened issue, <https://github.com/golang/go/issues/10958>, May 26, 2015, 19 pages.

Gregg et al., "A method-level comparison of the Java Grande and SPEC JVM98 benchmark suites", Concurrency Computat.: Pract. Exper. 2005; 17:757-773, Copyright © 2005 John Wiley & Sons, Ltd., 17 pages.

IBM Appendix P., "List of IBM Patents or Patent Applications to be Treated as Related", Dated Herewith, 2 pages.

Kalibera, "Replicating Real-Time Garbage Collector", Concurrency Computat.: Pract. Exper, 2010, Copyright © 2010 John Wiley & Sons, Ltd., 22 pages.

Kim et al., "Micro-Preemption Synthesis: An Enabling Mechanism for Multi-Task VLSI Systems", IEEE, © 1997 IEEEE, pp. 33-38.

Kim et al., "Perfecting Preemption Threshold Scheduling for Object-Oriented Real-Time System Design: From the Perspective of Real-Time Synchronization", LCTES'02-SCOPES'02, Jun. 19-21, 2002, Berlin, Germany, Copyright 2002 ACM, pp. 223-232.

Kumar et al., "Low Overhead Program Monitoring and Profiling", PASTE'05, Sep. 5-6, 2005, Lisbon, Portugal. Copyright 2005, pp. 28-34.

Lee et al., "Preemptible I/O Scheduling of Garbage Collection for Solid State Drives", IEEE Transactions on Computer-Aided Design of Integrated Circuits and Systems, vol. 32, No. 2, Feb. 2013, pp. 247-260.

Lin et al., "Enabling Efficient Preemption for SIMT Architectures with Lightweight Context Switching", Proceedings of the International Conference for High Performance Computing, Networking, Storage and Analysis (SC16), Article 77, Nov. 2016, 11 pages, IEEE Press, Piscataway, NJ.

Linux, "Kill", Net Admin Tools, This document was created by man2html using the manual Section: Linux Programmer's Manual (1), Updated: Oct. 14, 1994,3 pages, <https://www.netadmintools.com/html/1kill.man.html>.

Manson et al., "Preemptible Atomic Regions for Real-Time Java", Proceedings of the 26th IEEE International Real-Time Systems Symposium (RTSS'05), Miami, Florida, Dec. 2005, 10 pages.

Nilsen, K., "Compiler-Optimized Context Switching", U.S. Appl. No. 16/276,740, filed Feb. 15, 2019, IBM, 34 pages.

Nilsen, K., "Placement of Explicit Preemption Points Into Compiled Code", U.S. Appl. No. 16/282,807, filed Feb. 22, 2019, IBM, 89 pages.

Radhakrishnan et al., "Execution Characteristics of Object Oriented Programs on the UltraSPARC-II", Proceedings. Fifth International Conference on High Performance Computing (Cat. No. 98EX238), Dec. 20-20, 1998, 11 pages.

Schoeberl, "Scheduling of Hard Real-Time Garbage Collection", Real-Time Systems, Aug. 2010, vol. 45, Issue 3, 37 pages.

Snyder et al., "Fast Context Switches: Compiler and Architectural Support for Preemptive Scheduling", Microprocessors and Microsystems, vol. 19, No. 1, Issue 1, Feb. 1995, pp. 35-42, Elsevier B.V., UK, ISSN: 0141-9331.

Zhou et al., "Cross-Layer Customization for Rapid and Low-Cost Task Preemption in Multitasked Embedded Systems", ACM Transactions on Embedded Computing Systems (TECS), vol. 8, No. 2, Issue 2, Article 14, Jan. 2009, 28 pages, ACM New York, USA, DOI: 10.1145/1457255.1457261.

Zhou et al., "Rapid and Low-Cost Context-Switch through Embedded Processor Customization for Real-Time and Control Applications", DAC 2006, Jul. 24-28, 2006, San Francisco, California, Copyright 2006 ACM, pp. 352-357.

Peng et al., "Explicit Preemption Placement for Real-Time Conditional Code," 2014 26th Euromicro Conference on Real-Time Systems, Madrid, 2014, pp. 177-188. (Year: 2014).

Albrecht et al., "Cooperative software multithreading to enhance utilization of embedded processors for network applications," 12th Euromicro Conference on Parallel, Distributed and Network-Based Processing, 2004. Proceedings., Coruna, Spain, 2004, pp. 300-307. (Year: 2004).

Divi Pruthvi et al., "RTOS Acceleration by Reducing Overhead due to Context Switching," International Journal of Technology and Engineering Science vol. 1 (4), pp. 236-240, Jul. 2013 (Year: 2013).

Ramaprasad et al., "Tightening the Bounds on Feasible Preemption Points," 2006 27th IEEE International Real-Time Systems Symposium (RTSS'06), Rio de Janeiro, 2006, pp. 212-224. (Year: 2006).

Shieh et al., "Enabling fast preemption via Dual-Kernel support on GPUs," 2017 22nd Asia and South Pacific Design Automation Conference (ASP-DAC), Chiba, 2017, pp. 121-126. (Year: 2017).

Bertogna et al., "Optimal Selection of Preemption Points to Minimize Preemption Overhead," 2011 23rd Euromicro Conference on Real-Time Systems, Porto, 2011, pp. 217-227. (Year: 2011).

Jaaskelainen et al., "Reducing Context Switch Overhead with Compiler-Assisted Threading," 2008 IEEE/IFIP International Conference on Embedded and Ubiquitous Computing, Shanghai, 2008, pp. 461-466. (Year: 2008).

Simonson et al., "Use of preferred preemption points in cache-based real-time systems," Proceedings of 1995 IEEE International Computer Performance and Dependability Symposium, Erlangen, Germany, 1995, pp. 316-325. (Year 1995).

Yu et al., "Sim Latte: A Framework to Support Testing for Worst-Case Interrupt Latencies in Embedded Software," 2014 IEEE Seventh International Conference on Software Testing, Verification and Validation, Cleveland, OH, 2014, pp. 313-322. (Year: 2014).

Lin et al., "Enabling Efficient Preemption for SIMT Architectures with Lightweight Context Switching," SC '16: Proceedings of the International Conference for High Performance Computing, Networking, Storage and Analysis, Salt Lake City, UT, 2016, pp. 898-908. (Year: 2016).

* cited by examiner

```
Reduction (Reduction loop_body) {
   this.terminating_path = loop_body.terminating_path;

int outflow_index = loop_body.outward_flows.length;
   int back_edge_index;
   this.outward_flows = new Reduction [outflow_index - 1];
   this.outward_paths = new CodePath [outflow_index - 1] [ ];
   for (int i = 0; i < this.outward_flows.length; i++) {
      if (loop_body.outward_flows [--outflow_index] != loop_body) {
         this.outward_flows [i] = loop_body.outward_flows [outflow_index];
         /* Ok to share array references, because these arrays are immutable. */
         this.outward_paths [i] = loop_body.outward_paths [outflow_index];
      }
      else
         back_edge_index = outflow_index;
   }
   int back_paths = loop_body.outward_paths [back_edge_index].length;
   CodePath back_edge;
   if (back_paths > 1) {
      back_edge = new AlternationPath (back_paths);
      for (int i = 0; i < back_paths; i++)
         back_edge
            .establishAlternative (i, loop_body.outward_paths [back_edge_index][i]);
   } else
      back_edge = loop_body.outward_paths [back_edge_index][0];

IterationPath iter = new IterationPath (back_edge);
   iter.setPredecessor (loop_body.entry ());
   loop_body.entry ().setPredecessor (iter);
   Traversal v = new Traversal (iter, back_edge);
   v.computeAttributes ();
   /* Require each loop to have at least one preemption point.  Enforce that
      loop's oblivion_at_start and oblivion_at_end are no greater than HalfPsi. */
   v.insertPreemptionPoints (true, HalfPsi, QuarterPsi,
                              Psi, QuarterPsi, HalfPsi, QuarterPsi);
   loop_body.markLoop (iter, 0);
   this.entry = iter;
}
```

FIG. 7

```
Reduction (Reduction pred_region, Reduction succ_region) {
  this.entry = pred_region.entry;
  if (pred_region.terminating_path != null)
     this.terminating_path = pred_region.terminating_path;
  else if (succ_region.terminating_path != null)
     this.terminating_path = succ_region.terminating_path;
  /* else, this.terminating_path is null */

/* See if pred_region and succ_region have out flows to pred_region. */
  int pred_self_index = -1;
  for (int i = 0; i < pred_region.outward_flows.length; i++) {
     if (pred_region.outward_flows [i] == pred_region) {
        pred_self_index = i;
        break;
     }
  }
  int succ_self_index = -1;
  for (int i = 0; i < succ_region.outward_flows.length; i++) {
     if (succ_region.outward_flows [i] == pred_region) {
        succ_self_index = i;
        break;
     }
  } int new_flow_count = (pred_region.outward_flows.length +
                        succ_region.outward_flows.length - 1);
  if ((pred_self_index >= 0) && (succ_self_index >= 0))
     new_flow_count--;
  this.outward_flows = new Reduction [new_flow_count];
  this.outward_paths = new CodePath [new_flow_count] [ ];
  int new_array_index = 0;
  int connect_index = -1;

```
/*continued from FIG. 8A*/ for (int i = 0; i < pred_region.outward_flows.length; i++) {
    if (pred_region.outward_flows [i] == succ_region) connect_index = i;
    else if (i == pred_self_index) {
      this.outward_flows [new_array_index] = this;
      if (succ_self_index >= 0) {        /* Merge the outward_paths lists. */
        int path_count =
          pred_region.outward_paths [pred_self_index].length
          + succ_region.outward_paths [succ_self_index].length;
        this.outward_paths [new_array_index] = new CodePath [path_count];
        for (int j = 0;
            j < pred_region.outward_paths [pred_self_index].length; j++)
          this.outward_paths [new_array_index][--path_count]
            = pred_region.outward_paths [pred_self_index][j];
        for (int j = 0; j < succ_region.outward_paths [succ_self_index].length; j++)
          this.outward_paths [new_array_index][--path_count]
            = pred_region.outward_paths [succ_self_index][j];
        new_array_index++;
      } else
        this.outward_paths [new_array_index++]
          = pred_region.outward_paths [i];
    } else {
      this.outward_flows [new_array_index] = pred_region.outward_flows [i];
      this.outward_paths [new_array_index++] = pred_region.outward_paths [i];
    }
  }
  for (int i = 0; i < succ_region.outward_flows.length; i++) {
    if (i == succ_self_index) {
      if (pred_self_index < 0) {
        this.outward_flows [new_array_index] = this;
        this.outward_paths [new_array_index++]
          = succ_region.outward_paths [i];
      }              /* else, this case was handled above. */
    } else {
      this.outward_flows [new_array_index] = succ_region.outward_flows [i];
      this.outward_paths [new_array_index++] = succ_region.outward_paths [i];
    }
  }
  /* Not shown: fix up the inward_flows values similarly. */
  /* Assume proper invocation, so connect_index >= 0. */
  int connecting_paths = pred_region.outward_paths [connect_index].length;
  CodePath connecting_edge;
  if (connecting_paths > 1) {
    connecting_edge = new AlternationPath (connecting_paths);
    for (int i = 0; i < connecting_paths; i++)
      connecting_edge.
        establishAlternative (i, pred_region.outward_paths [connecting_paths][i]);
  } else
    connecting_edge = pred_region.outward_paths [connecting_paths] [0];
  succ_region.entry ().setPredecessor (connecting_edge);
  /* No need to compute attributes or insert preemption here. Defer. */
}
```

FIG. 8B

```
void insertPreemptionChecks (boolean enforce_preemption, ET max_oblivion_at_start,
        ET at_start_tolerance, ET max_oblivion_during, ET during_tolerance,
        ET max_oblivion_at_end, ET at_end_tolerance) {
    if (!enforce_preemption &&
        this.oblivion_at_start.le (max_oblivion_at_start) &&
        this.oblivion_during.le (max_oblivion_during) &&
        this.oblivion_at_end.le (max_oblivion_at_end))
        return;    /* Constraints satisfied. No need for new preemption checks. */
    /* Multiple backward flowing analyses may specify different constraints
     * for max_oblivion_at_end. Remember the constraint that is most severe. */
    if (this.visits++ == 0) {
        this.max_oblivion_at_end = max_oblivion_at_end;
        this.max_tolerance_at_end = at_end_tolerance;
    }
    else if (max_oblivion_at_end.lt (this.max_oblivion_at_end)) {
        this.max_oblivion_at_end = max_oblivion_at_end;
        this.max_tolerance_at_end = at_end_tolerance;
    }
    if (this.visits == this.expected_visits) {
        while (this.insertLocalPreemptionCheckBackward (enforce_preemption,
                max_oblivion_during, during_tolerance, this.max_oblivion_at_end, at_end_tolerance) {
            enforce_preemption = false;    /* No need to enforce more than once. */
            this.adjustAttributes ();
        }
        ETC at_end_tolerance_container = new ETC (this.max_tolerance_at_end);
        ET pred_max_oblivion_at_end =
            calcPredMaxOblivionAtEnd (this.max_oblivion_at_end, max_oblivion_during,
                        at_end_tolerance_container, during_tolerance);
        at_end_tolerance = at_end_tolerance_container.get ();
        if (this.traversal.getEntry () != this) {
            for (int i = this.predecessorCount (); i-- > 0; ) {
                CodePath pred = this.predecessor ();
                pred.insertPreemptionChecks (false,
                    max_oblivion_at_start, at_start_tolerance,
                    max_oblivion_during, during_tolerance,
                    pred_max_oblivion_at_end, at_end_tolerance) {
                }
            }
            while (this.insertLocalPreemptionCheckForward (max_oblivion_at_start, at_start_tolerance)
                this.adjustAttributes ();
            this.visits = 0;
        }
    }
}
```

FIG. 9

```
void accommodateTraversalPassOne (Traversal traversal) {
    if (this.traversal != traversal) {      /* This is first visit for this traversal. */
        this.traversal = traversal;
        this.visits = 0;
        this.forward_visits = 0;
        this.expected_visits = 1;
        for (int i = 0; i < this.predecessorCount (); i++) {
            CodePath pred = this.predecessor (i);
            if (pred != this.traversal.startSentinel ())
                pred.accomodateTraversalPassOne (traversal);
        }
    } else
        this.expected_visits++;
}
```

FIG. 10

```
CodePath accommodateTraversalPassTwo (CodePath successor) {
    CodePath result = null;
    if (this.visits == 0)
        this.traveral_successors = new CodePath [this.expected_visits];
    this.traversal_successors [this.visits++] = successor;
    if (this.visits == this.expected_visits) {
        result = this;
        for (int i = 0; i < this.predecessorCount (); i++) {
            CodePath pred = this.predecessor (i);
            if (pred != this.traversal.start_sentinel) {
                CodePath entry candidate = pred.accommodateTraversalPassTwo (this);
                if (entry_candidate != NULL) result = entry_candidate;
            }
        }
        this.visits = 0;
    } /* else, returned null result will be replaced in a caller context with entry */
    return result;
}
```

FIG. 11

```
void computeAttributes () {
    this.initializeAttributesForwardFlow ();
    for (int i = 0; i < this.traversal_successors.length; i++) {
        CodePath succ = this.traversal_successors [i];
        succ.continueComputingAttributes ();
    }
}
```

FIG. 12

```
private void continueComputingAttributes () {
    this.forward_visits++;
    if (this.forward_visits == this.predecessorCount()) {
        this.computeAttributesForwardFlow ();
        if (this != this.traversal.getEnd ()) {
            for (int i = 0; i < this.traversal_successors.length; i++) {
                CodePath succ = this.traversal_successors [i];
                succ.continueComputingAttributes ();
            }
        }
        this.forward_visits = 0;
    }
}
```

FIG. 13

```
void adjustAttributes () {
   boolean continue_adjusting;
   if (this.traversal.getEntry () == this)
      continue_adjusting = this.initializeAttributesForwardFlow ();
   else
      continue_adjusting = this.computeAttributesForwardFlow ();
   if (continue_adjusting) {
      for (int i = this.traversal_successors.length; i-- > 0; ) {
         CodePath succ = this.traversal_successors [i];
         succ.continueAdjustingAttributes ();
      }
   }
}
```

FIG. 14

```
private void continueAdjustingAttributes () {
   if (this.computeAttributesForwardFlow ()) {
      if (this != this.traversal.getEnd ()) {
         for (int i = this.traversal_successors.length; i-- > 0; ) {
            CodePath succ = this.traversal_successors [i];
            succ.continueAdjustingAttributes ();
         }
      }
   }
}
```

FIG. 15

```
/* AlternationPath has multiple predecessors and no associated basic block. */ private final boolean initializeAttributesForwardFlow () {
   assert (false);         /* AlternationPath is never a traversal entry. */
}
```

FIG. 16

```
/* CatenationPath has one predecessor and an associated basic block. */ final boolean initializeAttributesForwardFlow () {
  BasicBlock bb = this.associatedBlock ();

boolean orig_checks_preemption = checks_preemption;
  ET orig_execution_time = execution_time;
  ET orig_oblivion_at_start = oblivion_at_start;
  ET orig_oblivion_at_start_ongoing = oblivion_at_start_ongoing;
  ET orig_oblivion_at_end = oblivion_at_end;
  ET orig_oblivion_during = oblivion_during;

checks_preemption = bb.checksPreemption ();
  execution_time = this.localExecutionTime ();
  oblivion_at_start_ongoing = (checks_preemption)? ET.Zero: execution_time;
  oblivion_at_start = bb.oblivionAtStart ();
  oblivion_at_end = bb.oblivionAtEnd ();
  oblivion_during = bb.oblivionDuring ();

if ((checks_preemption != orig_checks_preemption) ||
      !orig_execution_time.eq (execution_time) ||
      !orig_oblivion_at_start.eq (oblivion_at_start) ||
      !orig_oblivion_at_start_ongoing.eq (oblivion_at_start_ongoing) ||
      !orig_oblivion_at_end.eq (oblivion_at_end) ||
      !orig_oblivion_during.eq (oblivion_during))
    return true;
  else
    return false;
  }
```

FIG. 17

```
/* IterationPath has one predecessor and no associated block. */ final boolean initializeAttributesForwardFlow () { boolean orig_checks_preemption = checks_preemption;
   ET orig_execution_time = execution_time;
   ET orig_oblivion_at_start_ongoing = oblivion_at_start_ongoing;
   ET orig_oblivion_at_start = oblivion_at_start;
   ET orig_oblivion_at_end = oblivion_at_end;
   ET orig_oblivion_during = oblivion_during;

checks_preemption = false;
   execution_time = ET.zero;
   oblivion_at_start_ongoing = ET.Zero;
   oblivion_at_start = ET.Zero;
   oblivion_at_end = loop_body.oblivionAtEnd ();
   oblivion_during = oblivion_at_end;

if ((checks_preemption != orig_checks_preemption) ||
      !orig_execution_time.eq (execution_time) ||
      !orig_oblivion_at_start.eq (oblivion_at_start) ||
      !orig_oblivion_at_start_ongoing.eq (oblivion_at_start_ongoing) ||
      !orig_oblivion_at_start.eq (oblivion_at_end) ||
      !orig_oblivion_during.eq (oblivion_during))
      return true;
   else
      return false;
}
```

FIG. 18

```
/* An AlternationPath has multiple predecessors and no associated block. */
final boolean computeAttributesForwardFlow () {
  BasicBlock bb = this.associatedBlock ();
  assert (bb != NULL);   /* IterationPath, AlternationPath override this method. */ boolean orig_checks_preemption = checks_preemption;
  ET orig_execution_time = execution_time;
  ET orig_oblivion_at_start = oblivion_at_start;
  ET orig_oblivion_at_start_ongoing = oblivion_at_start_ongoing;
  ET orig_oblivion_during = oblivion_during;
  ET orig_oblivion_at_end = oblivion_at_end;
  checks_preemption = true;
  execution_time = ET.Zero;
  oblivion_at_start = ET.Zero;
  oblivion_at_start_ongoing = ET.Zero;
  oblivion_at_end = ET.Zero;
  oblivion_during = ET.Zero;
  for (int i = this.predecessorCount (); i-- > 0; ) {
    CodePath pred = this.predecessor (i);
    if (!pred.checksPreemption ())
      checks_preemption = false;
    if (pred.executionTime ().gt (execution_time))
      execution_time = pred.executionTime ();
    if (pred.oblivionAtStartOngoing ().gt (oblivion_at_start_ongoing))
      oblivion_at_start_ongoing = pred.oblivionAtStartOngoing ();
    if (pred.oblivion_at_start.gt (oblivion_at_start))
      oblivion_at_start = pred.oblivion_at_start;
    if (pred.oblivion_at_start_ongoing.gt (oblivion_at_start_ongoing))
      oblivion_at_start_ongoing = pred.oblivion_at_start_ongoing;
    if (pred.oblivion_at_end.gt (oblivion_at_end))
      oblivion_at_end = pred.oblivion_at_end;
    if (pred.oblivion_during.gt (oblivion_during))
      oblivion_during = pred.oblivion_during;
  }
  if ((checks_preemption != orig_checks_preemption) ||
      !orig_execution_time.eq (execution_time) ||
      !orig_oblivion_at_start.eq (oblivion_at_start) ||
      !orig_oblivion_at_start_ongoing.eq (oblivion_at_start_ongoing) ||
      !orig_oblivion_during.eq (oblivion_during) ||
      !orig_oblivion_at_end.eq (oblivion_at_end))
    return true;
  else
    return false;
}
```

FIG. 19

```
/* CatenationPath has one predecessor and an associated basic block. */
final boolean computeAttributesForwardFlow () {
  BasicBlock bb = this.associatedBlock ();
  assert (bb != NULL);
  boolean orig_checks_preemption = checks_preemption;
  ET orig_execution_time = execution_time;
  ET orig_oblivion_at_start = oblivion_at_start;
  ET orig_oblivion_at_start_ongoing = oblivion_at_start_ongoing;
  ET orig_oblivion_during = oblivion_during;
  ET orig_obivion_at_end = oblivion_at_end;
  ET max_pred_oblivion_at_end = ET.Zero;
  ET max_pred_oblivion_during = ET.Zero;

/* A CatenationPath object has only one predecessor. */
  CodePath pred = this.predecessor (0);
  checks_preemption = pred.checks_preemption;
  execution_time = pred.execution_time;
  oblivion_at_start_ongoing = pred.oblivion_at_start_ongoing;
  oblivion_at_start = pred.oblivion_at_start;
  ET pred_oblivion_at_end = pred.oblivion_at_end;
  ET pred_oblivion_during = pred.oblivion_during;

/* oblivion_at_start has been computed as maximum predecessor value, but
     needs to be adjusted if oblivion_at_start_ongoing is larger. */
  execution_time = execution_time.sum (this.local_execution_time);
  if (bb.checksPreemption ()) {
    oblivion_at_start_ongoing = ET.Zero;
    oblivion_at_end = bb.oblivionAtEnd ();
    ET new_oblivion_duration =
        pred_oblivion_at_end.sum (bb.oblivionAtStart ());
    oblivion_during = (new_oblivion_duration.gt (pred_oblivion_during))
        ? new_oblivion_duration : pred_oblivion_during;
  } else {
    if (oblivion_at_start_ongoing.gt (ET.Zero)) {
      oblivion_at_start_ongoing =
          pred_oblivion_at_start_ongoing.sum (bb.executionTime ());
      if (oblivion_at_start_ongoing.gt (oblivion_at_start))
        oblivion_at_start = oblivion_at_start_ongoing;
    }
    oblivion_at_end = pred_oblivion_at_end.sum (bb.executionTime ());
    oblivion_during = (oblivion_at_end.gt (pred_oblivion_during))
        ? oblivion_at_end : pred_oblivion_during;
  }
/*Continued in FIG. 20B*/
```

FIG. 20A

```
/*Continued from FIG. 20A*/

ET max_oblivion_either_end = (oblivion_at_start.gt (oblivion_at_end))
     ? oblivion_at_start: oblivion_at_end;
  if (max_oblivion_either_end.gt (oblivion_during))
     oblivion_during = max_oblivion_either_end;

if ((checks_preemption != orig_checks_preemption) ||
     !orig_execution_time.eq (execution_time) ||
     !orig_oblivion_at_start.eq (oblivion_at_start) ||
     !orig_oblivion_at_start_ongoing.eq (oblivion_at_start_ongoing) ||
     !orig_oblivion_during.eq (oblivion_during) ||
     !orig_oblivion_at_end.eq (oblivion_at_end))
     return true;
  else
     return false;
}
```

FIG. 20B

```
/* An IterationPath has only one predecessor and no associated basic block.
   Computation of oblivion_at_end and oblivion_during must account for behavior
   of the loop_body. */ final boolean computeAttributesForwardFlow () { boolean orig_checks_preemption = checks_preemption;
   ET orig_execution_time = execution_time;
   ET orig_oblivion_at_start = oblivion_at_start;
   ET orig_oblivion_at_start_ongoing = oblivion_at_start_ongoing;
   ET orig_oblivion_during = oblivion_during;
   ET orig_obivion_at_end = oblivion_at_end;

/* IterationPath object has only one predecessor. */
   CodePath pred = this.predecessor (0);
   checks_preemption = pred.checks_preemption;
   execution_time = pred.execution_time;
   oblivion_at_start = pred.oblivion_at_start;
   oblivion_at_start_ongoing = pred.oblivion_at_start_ongoing;
   oblivion_at_end = pred.oblivion_at_end;
   oblivion_during = pred.oblivion_during;

if (loop_body.oblivion_at_end.gt (oblivion_at_end))
      oblivion_at_end = loop_body.oblivion_at_end;

if (oblivion_at_end.gt (oblivion_during))
      oblivion_during = oblivion_at_end;

if ((checks_preemption != orig_checks_preemption) ||
       !orig_execution_time.eq (execution_time) ||
       !orig_oblivion_at_start.eq (oblivion_at_start) ||
       !orig_oblivion_at_start_ongoing.eq (oblivion_at_start_ongoing) ||
       !orig_oblivion_during.eq (oblivion_during) ||
       !orig_oblivion_at_end.eq (oblivion_at_end))
      return true;
   else
      return false;
}
```

FIG. 21

```
void markLoop (IterationPath header, int expect_level) {
    if (this.loopNestingLevel () == expect_level)
        this.incrementLoopNestingLevel ();
    if (this.isIterationPath ()) {
        IterationPath iter = (IterationPath) this;
        iter.loop_body.markLoop (iter, expect_level + 1);
    }
    if (this != header) {
        for (int i = this.predecessorCount (); i-- > 0; ) {
            CodePath pred = this.predecessor (i);
            pred.markLoop (header, expect_level);
        }
    }
}
```

FIG. 22

```
    private ET calcPredMaxOblivionAtEnd (ET my_max_oblivion_at_end,
                                        ET my_max_oblivion_during,
                                        ETC at_end_tolerance,
                                        ET during_tolerance) {
        ET result;
        if (this.localChecksPreemption ()) {
            bb = this.associatedBlock ();  /* Since checksPreemption, bb != null. */
            result = max_oblivion_during.difference (bb.oblivionAtStart ());
            at_end_tolerance.set (during_tolerance);
        } else
            result = max_oblivion_at_end.difference (this.localExecutionTime ());
            /* assert (result.gt (ET.Zero)). Otherwise, we would have inserted a
               preemption check into this block or one of its successors. */ return result;
    }
```

FIG. 23

```
private boolean insertLocalPreemptionCheckBackward (
    boolean enforce_preemption,
    ET max_oblivion_during, ET during_tolerance,
    ET max_oblivion_at_end, ET at_end_tolerance) {
  ET end_for_this_block;

BasicBlock bb = this.associatedBlock ();
  if (bb == null)
    return false;
  else if (enforce_preemption) {
    this.insertOptimalPreemptionBackward (this.localExecutionTime (-1),
                                          ET.Infinity);
    return true;
  } else if (max_oblivion_at_end.lt (this.oblivion_at_end) &&
        (end_for_this_block = this.localExecutionTime ()
            .difference (max_oblivion_at_end.difference (at_end_tolerance)))
          .gt (ET.Zero)) {
    this.insertOptimalPreemptionBackward(end_for_this_block,
                                          at_end_tolerance);
    return true;
  } else if (max_oblivion_during.lt (this.oblivion_at_end) &&
        (end_for_this_block = this.localExecutionTime ()
            .difference (max_oblivion_during.difference (during_tolerance)))
          .gt (ET.Zero)) {
    this.insertOptimalPreemptionBackward(end_for_this_block,
                                          during_tolerance);
    return true;
  } else
    /* Any unsatisfied max_oblivion_during or max_oblivion_at_end constraints
       must be enforced within predecessor contexts. */
    return false;
}
```

FIG. 24

```
private void insertOptimalPreemptionBackward (ET no_later_than, ET not_before_delta) {
    BasicBlock bb = this.associatedBlock ();
    ET start_for_this_block, delta;
    int insn_offset;
    int best_offset = -1;
    int best_pressure = TooManyRegisters;
    if (no_later_than.gt (not_before_delta)) {
        start_for_this_block = no_later_than.difference (not_before_delta);
        delta = ET.Zero;
    } else {       /* Includes case that not_before_delta is ET.Infinity. */
        start_for_this_block = ET.Zero;
        delta = not_before_delta.difference (no_later_than);
    }
    if (bb != null) {
        if (bb.checksPreemption()) {/* See if preemption already present. */
            for (int i = 0; i < bb.preemptions (); i++) {
                insn_offset = bb.preemptionOffset (i);
                ET time_of_preemption = bb.executionTime (insn_offset);
                if (time_of_preemption.gt (no_later_than))
                    break;
                else if (time_of_preemption.ge (start_for_this_block))
                    return;    /* requested preemption check is already present */
            }
        }
        /* Find preferred preemption point within this block. */
        for (int i = 0;
            bb.executionTime (insn_offset = bb.instructionOffset (i)).lt (no_later_than);
            i++) {
            if (bb.executionTime (insn_offset).ge (start_for_this_block)) {
                int this_pressure = (bb.registerPressureAt (insn_offset)
                                    * this.loopNestingLevel () * LOOP_SCALE_FACTOR);
                if (this_pressure < best_pressure) {
                    best_offset = insn_offset;
                    best_pressure = this_pressure;
                }
            }         /* else, ignore this instruction that precedes start_for_this_block. */
        }
    }
/*Continued in FIG. 26*/
```

FIG. 25

```
/*Continued from FIG. 25*/

/* best_offset, best_pressure represent best preemption point found so far.  If
        no valid preemption point found, best_pressure is TooManyRegisters. */
    if (delta.gt (ET.Zero)) {
        /* Consider inserting preemption into predecessor code.  If any predecessor
            has higher preemption cost than this block's costs, insert single preemption
            check into this block. */
        if (this.traversal.getEntry () != this) {
            int worst_pressure = 0;
            for (int i = this.predecessorCount (); i-- > 0; ) {
                CodePath pred = this.predecessor (i);
                if (delta.eq (ET.Infinity) || pred.executionTime ().gt (delta)) {
                    int this_pressure = pred.bestBackwardRegisterPressure (delta);
                    if (this_pressure > worst_pressure) worst_pressure = this_pressure;
                }
            }
            if (worst_pressure < best_pressure) {
                /* All predecessors have better preemption points than this block, so
                    insert preemption into each predecessor. */
                for (int i = this.predecessorCount(); i-- > 0; ) {
                    CodePath pred = this.predecessor (i);
                    if (delta.eq (ET.Infinity) || pred.executionTime ().gt (delta)) {
                        ET pred_et = pred.localExecutionTime (-1);
                        pred.insertOptimalPreemptionBackward (pred_et, delta);
                    }
                }
                return;
            }               /* else, fall through and insert preemption into this block. */
        }
    }
    /* If this node is an AlternationPath, then every predecessor path to  traversal.getEntry () has non-
        zero execution time.  Thus, every predecessor path has better preemption points than this block.
        We only reach this code if  this node is not an AlternationPath. For any CatenationPath, it is known
        that bb != null and best_offset >= 0.  This method is only invoked on a IterationPath object if it was
        already determined that the IterationPath object and its predecessor have favorable register
        pressure cost. */
    assert ((bb != null) && (best_offset >= 0));
    bb.insertPreemptionAt (best_offset);
    this.adjustAttributes ();
}
```

FIG. 26

```
private boolean insertLocalPreemptionCheckForward (
    ET max_oblivion_at_start, ET at_start_tolerance)
ET enforcement_start = max_oblivion_at_start.difference (at_start_tolerance);
ET block_start = this.execution_time.difference (this.localExecutionTime ());

BasicBlock bb = this.associatedBlock ();
if (bb == null)
    return false;
else if (max_oblivion_at_start.lt (this.oblivion_at_start) &&
        enforcement_start.ge (block_start) &&
        this.execution_time.gt (enforcement_start)) {
    ET start_for_this_block = enforcement_start.difference (block_start);
    this.insertOptimalPreemptionForward(start_for_this_block,
                                        at_start_tolerance);
    return true;
} else
    /* Any unsatisfied max_oblivion_at_start constraints must be enforced within
       successor contexts. */
    return false;
}
```

FIG. 27

```
private void insertOptimalPreemptionForward (ET no_sooner_than, ET not_after_delta) {
   BasicBlock bb = this.associatedBlock ();
   int best_pressure = TooManyRegisters;
   int best_offset = -1;
   int insn_offset;
   ET delta, end_for_this_block;
   ET block_et = (bb != null)? bb.executionTime (-1): ET.Zero;
   end_for_this_block = no_sooner_than.sum (not_after_delta);
   if (end_for_this_block.gt (block_et)) {
      delta = end_for_this_block.difference (block_et);
      end_for_this_block = block_et;
   } else
      delta = ET.Zero;
   if (bb != null) {
      if (bb.checksPreemption ()) {
         for (int i = 0; i < bb.preemptions (); i++) {
            insn_offset = bb.preemptionOffset (i);
            ET time_of_preemption = bb.executionTime (insn_offset);
            if (time_of_preemption.gt (end_for_this_block))
               break;
            else if (time_of_preemption.ge (no_sooner_than))
               return;    /* Required preemption is already present. */
         }
      }
      /* Find preferred preemption point within this block. */
      for (int i = 0;
            (i < bb.instructions ()) &&
            bb.executionTime (insn_offset = bb.instructionOffset (i))
               .le (end_for_this_block); i++) {
         if (bb.executionTime (insn_offset).ge (no_sooner_than)) {
            int this_pressure = (bb.registerPressureAt (insn_offset)
                              * this.loopNestingLevel () * LOOP_SCALE_FACTOR);
            if (this_pressure < best_pressure) {
               best_offset = insn_offset;
               best_pressure = this_pressure;
            }
         }           /* else, ignore this instruction that precedes start_for_this_block. */
      }
   }
}
/*Continued in FIG. 28B*/
```

FIG. 28A

```
/*Continued from FIG. 28A*/

/* best_offset, best_pressure represent best preemption point found so far. If
       no valid preemption point found, best_pressure is TooManyRegisters. */
    if (delta.gt (ET.Zero)) {
        /* Consider inserting preemption into successor code. If any successors have higher preemption
           costs than this block's costs, insert a single preemption check into this block. */
        int worst_pressure = 0;
        boolean all_successors_valid = true;
        if (traversal.getEnd () != this) {
            for (int i = this.traversal_successors.length; i-- > 0; ) {
                CodePath succ = this.traversal_successors[i];
                int this_pressure = succ.bestForwardRegisterPressure (delta);
                if (this_pressure > worst_pressure) worst_pressure = this_pressure;
            }
            if (worst_pressure < best_pressure) {
                /* all successors have better preemption points than this block, so
                   insert preemption into each successor. */
                for (int i = this.traversal_successors.length; i-- > 0; ) {
                    CodePath succ = this.traversal_successors [i];
                    ET succ_et = succ.localExecutionTime (-1);
                    succ.insertOptimalPreemptionForward (ET.Zero, delta);
                }
                return;
            }                   /* else, fall through and insert preemption into this block. */
        } else {
            /* No successors and delta.gt (ET.Zero). Preemption is not required since
               this control flow has execution time less than max_oblivion_at_start. */
            return;
        }
    }                   /* else, not_after_delta ends before successors, so insert here. */

/* Either this node has an associated BasicBlock, in which case it has at least one feasible preemption
       point with register pressure less than TooManyRegisters, or it has an unconditional traversal
       successor that has at least one feasible preemption point in which case we would have inserted
       preemption into the successor above and returned, or all control flows through this node to
       this.traversal.getEnd () are shorter than max_oblivion_at_start, in which case we would have returned
       above without inserting a preemption point. */
    assert ((bb != null) && (best_offset >= 0))
    bb.insertPreemptionAt (best_offset);
    this.adjustAttributes ();
}
```

FIG. 28B

```
private int bestBackwardRegisterPressure (ET range) {
  BasicBlock bb = this.associatedBlock ();
  int best_pressure = TooManyRegisters;

if (bb != null) {
    ET block_et = bb.executionTime (-1);
    ET start_of_range = (range.gt (block_et))? ET.Zero: block_et.difference (range);
    /* See if preemption check already present. */
    if (bb.checksPreemption()) {
      for (int i = 0; i < bb.preemptions (); i++) {
        insn_offset = bb.preemptionOffset (i);
        ET time_of_preemption = bb.executionTime (insn_offset);
        if (time_of_preemption.ge (start_of_range))
          return 0;   /* requested preemption check is already present */
      }
    }
    /* Find an optimal preemption check in this basic block. */
    for (int i = bb.instructions (); i-- > 0; i--) {
      int insn_offset = bb.instructionOffset (i);
      ET insn_timestamp = bb.executionTime (insn_offset);
      if (insn_timestamp.ge (start_of_range)) {
        int insn_pressure = (this.registerPressureAt (insn_offset)
                             * this.loopNestingLevel () * LOOP_SCALE_FACTOR);
        if (insn_pressure < best_pressure) best_pressure = insn_pressure;
      } else
        break;
    }
    range = range.difference (block_et);
  }
  /* best_pressure represents best pressure found so far. */
  if (range.gt (ET.Zero) &&
      (this != traversal.getEntry) && (this.predecessorCount() > 0)) {
    /* See if all predecessors have better pressure. */
    int worst_pred_pressure = 0;
    for (int i = this.predecessorCount (); i-- > 0; ) {
      CodePath pred = this.predecessor (i);
      if (pred.checksPreemption ()) {
        /* leave worst_pred_pressure unchanged. */
      } else {
        int pred_best_pressure =
          pred.bestBackwardRegisterPressure (range);
        if (pred_best_pressure > worst_pred_pressure)
          worst_pred_pressure = pred_best_pressure;
      }
    }
    if (worst_pred_pressure < best_pressure)
      return worst_pred_pressure;
  }
  return best_pressure;
}
```

FIG. 29

```
private int bestForwardRegisterPressure (ET range) {
   BasicBlock bb = this.associatedBlock ();
   int best_pressure = TooManyRegisters;

if (bb != null) {
      ET block_et = bb.executionTime (-1);
      ET end_of_this_block = (range.gt (block_et))? block_et: range;
      /* See if preemption check already present. */
      if (bb.checksPreemption ()) {
         for (int i = 0; i < bb.preemptions (); i++) {
            insn_offset = bb.preemptionOffset (i);
            ET time_of_preemption = bb.executionTime (insn_offset);
            if (time_of_preemption.ge (end_of_this_block)) break;
            else return 0;   /* requested preemption check is already present */
         }
      }
      /* Find an optimal preemption check in this basic block. */
      for (int i = 0; i < bb.instructions (); i++) {
         int insn_offset = bb.instructionOffset (i);
         ET insn_timestamp = bb.executionTime (insn_offset);
         if (insn_timestamp.ge (end_of_this_block)) break;
         int insn_pressure = (this.registerPressureAt (insn_offset)
                           * this.loopNestingLevel () * LOOP_SCALE_FACTOR);
         if (insn_pressure < best_pressure) best_pressure = insn_pressure;
      }
      range = range.difference (block_et);
   }
   /* best_pressure represents best pressure found so far. */ if (this == this.traversal.getEnd ()) {
      /* If suffix is shorter than range, cost is 0 because preemption not needed. */
      return (range.gt (ET.Zero))? 0: best_pressure;
   } else if (range.gt (ET.Zero)) {
      int worst_succ_pressure = 0;
      for (int i = this.traversal_successors.length; i-- > 0; ) {
         CodePath succ = this.traversal_successors[i];
         int succ_best_pressure = succ.bestForwardRegisterPressure (range);
         if (succ_best_pressure > worst_succ_pressure)
            worst_succ_pressure = succ_best_pressure;
      }
      if (worst_succ_pressure < best_pressure)
         return worst_succ_pressure;
   }
   return best_pressure;
}
```

FIG. 30

```
private ET calcPredMaxOblivionAtEnd (ET my_max_oblivion_at_end,
                                     ET my_max_oblivion_during,
                                     ETC at_end_tolerance,
                                     ET during_tolerance) {
  /* The portion of the loop body that exits the loop to flow into the
     surrounding context has already been traversed within the context that
     encloses this loop.  Simply, pass along the values computed in that
     traversal. */
  return my_max_oblivion_at_end;
}
```

FIG. 31

```
main:
.LCF4:
0:  addis 2,12,.TOC.-.LCF4@ha
    addi 2,2,.TOC.-.LCF4@l
    mflr 0
    std 26,-48(1)              # Prologue: preserve non-volatile registers std
    27,-40(1)
    rlwinm 3,3,0,0xff          # Instruction scheduling interleaves
                               # code from prologue and body
    std 28,-32(1)
    std 29,-24(1)
    addis 10,2,.LC9@toc@ha     # Overwrites GPR register 10
    mtvsrd 32,3                # Overwrites VSR register 32 addis
    9,2,.LANCHOR0@toc@ha       # Overwrites GPR register 9 std 30,-
    16(1)
    std 31,-8(1)
    addi 10,10,.LC9@toc@l      # Overwrites GPR register 10 addi
    9,9,.LANCHOR0@toc@l        # Overwrites GPR register 9 li
    27,128                     # Overwrites GPR register 27
    li 26,144                  # Overwrites GPR register 26
    lxvd2x 33,0,10             # Overwrites VSR register 33
    addis 3,2,.LC10@toc@ha     # Overwrites GPR register 3
    li 28,112                  # Overwrites GPR register 28 std
    0,16(1)
    stdu 1,-224(1)             # Reserve 224 bytes for activation frame

# Preferred preemption point
    # Prologue saved non-volatile registers used by this function: 26, 27, 28, 29, 30, 31 #
    # The following volatile registers are live: 3, 9, 10
    # The following volatile vector registers are live: 32, 33 # The
    following non-volatile registers are live: 26, 27, 28

```
/*Continued from FIG. 41A*/

# The function body continues here addi
    3,3,.LC10@toc@l
    addis 30,2,.LC1@toc@ha addi
    30,30,.LC1@toc@l vaddubm
    0,0,1
    lxvd2x 0,0,9
    addi 4,1,96
    addi 31,1,159
    stxvd2x 32,1,27
    addi 29,1,175
    stxvd2x 0,1,26 bl
    dump_struct
    addis 3,2,.LC11@toc@ha
    xxpermdi 0,0,0,2 mfvsrd 11,0
    xxpermdi 0,0,0,3
    mfvsrd 10,0
    mtvsrd 0,11
    mtvsrd 1,10
    xxpermdi 12,0,1,0
    xxpermdi 0,12,12,2
    stxvd2x 0,1,28 bl
    dump_struct lxvd2x
    32,1,27
    lxvd2x 33,1,26
    addis 3,2,.LC12@toc@ha addi
    4,1,96
    addi 3,3,.LC12@toc@l
    vaddubm 0,0,1
    stxvd2x    32,1,28    bl
    dump_struct    lxvd2x
    0,1,28
    li 9,160
    addis 3,2,.LC13@toc@ha addi
    3,3,.LC13@toc@l stxvd2x 0,1,9
    bl printf nop
    .p2align 5,,31

```
/*Continued from FIG. 41B*/

.L20:
    lbzu 4,1(31)
    mr   3,30   bl
    printf nop
    cmpld 7,29,31
    bne 7,.L20
    addis
    3,2,.LC14@to
    c@ha addi
    3,3,.LC14@to
    c@l
    bl puts nop addi 1,1,224                          # Remove activation frame from
    stack # Second preferred preemption point. No context registers are live.
    ld 0,16(1)                            # Restore preserved registers ld 26,-
    48(1)
    ld 27,-40(1)
    ld 28,-32(1)
    ld 29,-24(1)
    ld 30,-16(1)
    ld 31,-8(1)
    mtlr 0
    blr         # Return to caller
```

FIG. 41C

… # CONTEXT SWITCHING LOCATIONS FOR COMPILER-ASSISTED CONTEXT SWITCHING

BACKGROUND

The field of the invention is data processing, and more specifically to compiler-assisted context switching.

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

One aspect of the invention provides a computer implemented method. The method comprising: determining that an instruction represents a preferred preemption point based on a determination that bits of an opcode representation of the instruction match a particular pattern; determining that the preferred preemption point has been reached by a first thread based on pattern matching of an instruction opcode that is to be decoded; determining that preemption of the first thread for a second thread has been requested; and performing a context switch from the first thread to the second thread.

Another aspect of the invention provides a computer program product embodied as program instructions stored on a computer readable storage medium. The program instructions comprising instructions to cause a computing device to perform the aforementioned method. The method comprising: determining that an instruction represents a preferred preemption point based on a determination that bits of an opcode representation of the instruction match a particular pattern; determining that the preferred preemption point has been reached by a first thread based on pattern matching of an instruction opcode that is to be decoded; determining that preemption of the first thread for a second thread has been requested; and performing a context switch from the first thread to the second thread.

Another aspect of the invention provides a computer system. The computer system including program instructions stored on a computer readable storage medium that, when executed by the computer system, causes the computer system to perform the aforementioned method. The method comprising: determining that an instruction represents a preferred preemption point based on a determination that bits of an opcode representation of the instruction match a particular pattern; determining that the preferred preemption point has been reached by a first thread based on pattern matching of an instruction opcode that is to be decoded; determining that preemption of the first thread for a second thread has been requested; and performing a context switch from the first thread to the second thread.

Still yet, any of the components of the present invention could be deployed, managed, serviced, etc., by a service provider who offers to implement generation of and/or use of context switching locations in a computer system. Some embodiments of the present invention of the present invention also provide and encompass related systems, methods, and/or program products.

BRIEF DESCRIPTION OF THE DRAWINGS

These and other features of this invention will be more readily understood from the following detailed description of the various aspects of the invention taken in conjunction with the accompanying drawings.

FIG. 7 shows exemplary pseudocode for constructing a Reduction object following a T1 transformation according to embodiments of the present invention;

FIG. 8A shows exemplary pseudocode for constructing a Reduction object following a T2 transformation according to embodiments of the present invention;

FIG. 8B shows exemplary pseudocode, continued from FIG. 8A, for constructing a Reduction object following a T2 transformation according to embodiments of the present invention;

FIG. 9 shows exemplary pseudocode for implementing the insertPreemptionChecks function of the CodePath class according to embodiments of the present invention;

FIG. 10 shows exemplary pseudocode for implementing the accommodateTraversalPassOne function of the CodePath class according to embodiments of the present invention;

FIG. 11 shows exemplary pseudocode for implementing the accommodateTraversalPassTwo function of the CodePath class according to embodiments of the present invention;

FIG. 12 shows exemplary pseudocode for implementing the computeAttributes function of the CodePath class according to embodiments of the present invention;

FIG. 13 shows exemplary pseudocode for implementing the continueComputingAttributes function of the CodePath class according to embodiments of the present invention;

FIG. 14 shows exemplary pseudocode for implementing the adjustAttributes function of the CodePath class according to embodiments of the present invention;

FIG. 15 shows exemplary pseudocode for implementing the continueAdjustingAttributes function of the CodePath class according to embodiments of the present invention;

FIG. 16 shows exemplary pseudocode for an overriding implementation of the initializeAttributesForwardFlow function for the AlternationPath subclass according to embodiments of the present invention;

FIG. 17 shows exemplary pseudocode for an overriding implementation of the initializeAttributesForwardFlow function for the CatenationPath subclass according to embodiments of the present invention;

FIG. 18 exemplary pseudocode an overriding implementation of the initializeAttributesForwardFlow function for the IterationPath subclass according to embodiments of the present invention;

FIG. 19 shows exemplary pseudocode for an overriding implementation of the computeAttributesForwardFlow function for the AlternationPath subclass according to embodiments of the present invention;

FIG. 20A shows exemplary pseudocode for an overriding implementation of the computeAttributesForwardFlow function for the CatenationPath subclass according to embodiments of the present invention;

FIG. 20B shows exemplary pseudocode, continued from FIG. 20A for an overriding implementation of the computeAttributesForwardFlow function for the CatenationPath subclass according to embodiments of the present invention;

FIG. 21 shows exemplary pseudocode for an overriding implementation of the computeAttributesForwardFlow function for the IterationPath subclass according to embodiments of the present invention;

FIG. 22 shows exemplary pseudocode for implementing the markLoop function of the CodePath class according to embodiments of the present invention;

FIG. 23 shows exemplary pseudocode for implementing the calcPredMaxOblivionAtEnd function of the CodePath class according to embodiments of the present invention;

FIG. 24 shows exemplary pseudocode for implementing the insertLocalPreemptionCheckBackward function of the CodePath class according to embodiments of the present invention;

FIG. 25 shows exemplary pseudocode for implementing the insertOptimalPreemptionBackward function of the CodePath class according to embodiments of the present invention;

FIG. 26 shows exemplary pseudocode, continued from FIG. 25, for implementing the insertOptimalPreemptionBackward function of the CodePath class according to embodiments of the present invention;

FIG. 27 shows exemplary pseudocode for implementing the insertLocalPreemptionCheckForward function of the CodePath class according to embodiments of the present invention;

FIG. 28A shows exemplary pseudocode for implementing the insertOptimalPreemptionForward function of the CodePath class according to embodiments of the present invention;

FIG. 28B shows exemplary pseudocode, continued from FIG. 28A, for implementing the insertOptimalPreemptionForward function of the CodePath class according to embodiments of the present invention;

FIG. 29 shows exemplary pseudocode for implementing the bestBackwardRegisterPressure function of the CodePath class according to embodiments of the present invention;

FIG. 30 shows exemplary pseudocode for implementing the bestForwardRegisterPressure function of the CodePath class according to embodiments of the present invention;

FIG. 31 shows exemplary pseudocode for an overriding implementation of the calcPredMaxOblivionAtEnd method of the IterationPath according to embodiments of the present invention;

FIGS. 41A-41C shows exemplary annotated pseudocode for eliminating an extra instruction to identify preferred preemption points according to embodiments of the present invention;

DETAILED DESCRIPTION

Figure 1:
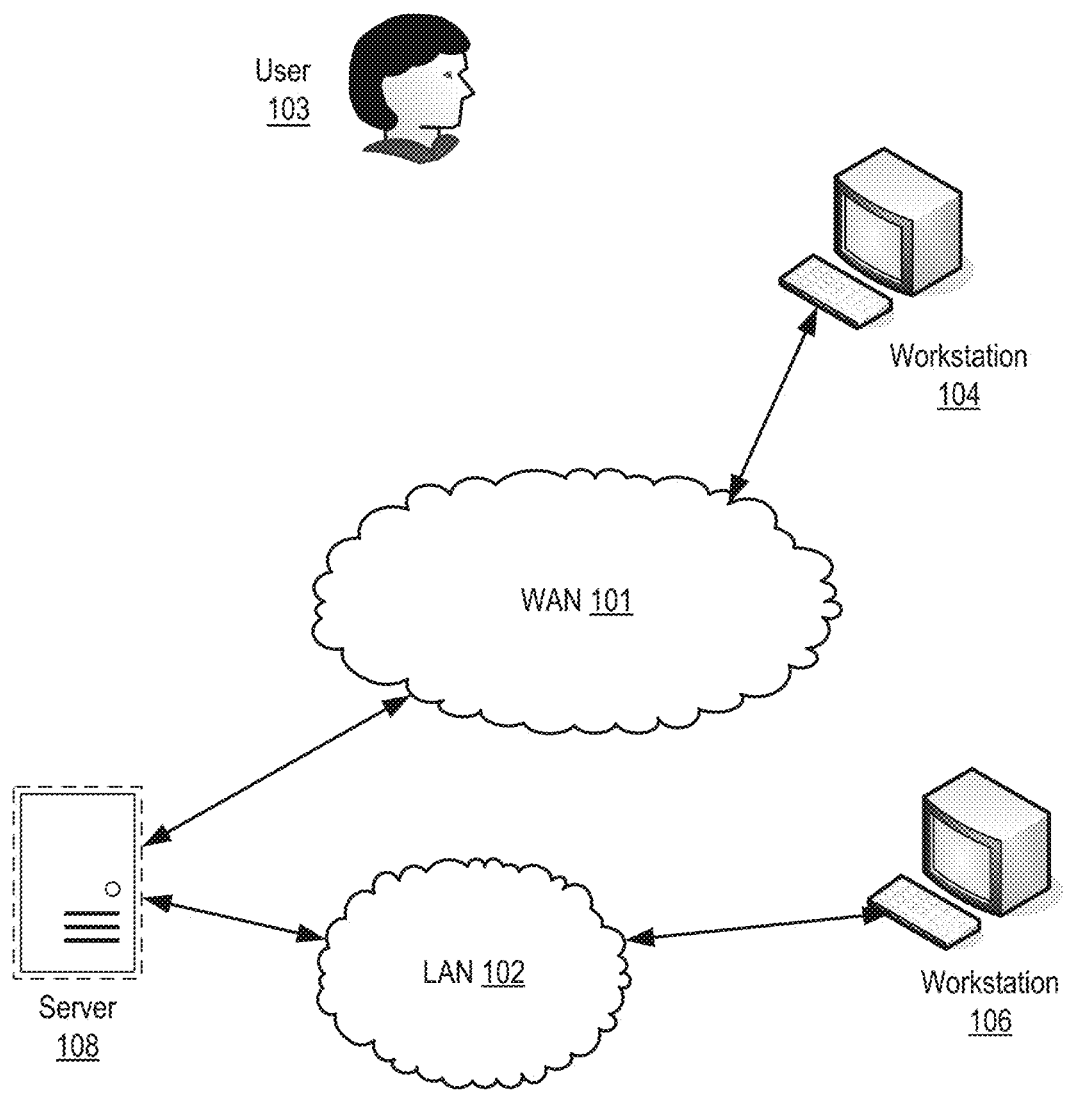
FIG. 1 is a network environment in accordance with embodiments of the present invention.

Detailed embodiments of the present invention are disclosed herein with reference to the accompanying drawings. In the drawings, like numbering represents like elements. It is to be understood that the disclosed embodiments of the present invention are merely illustrative of potential embodiments of the present invention and may take various forms. In addition, each of the examples given in connection with the various embodiments of the present invention is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments of the present invention whether or not explicitly described.

Some embodiments of the present invention recognize the difficulties associated with data processing, and more specifically the difficulties associated with context switching. Some embodiments of the present invention leverage the placement of explicit preemption points into compiled code to provide compiler-assisted context switching.

Some embodiments of the present invention recognize and leverage the tradeoffs between recognizing blr or certain addi (e.g., addi 1,1,X) as preferred preemption points. Some embodiments of the present invention recognize and leverage scenarios in which some instructions are only treated as preferred preemption points if they occur in particular contexts. Some embodiments of the present invention recognize and leverage scenarios in which the thread state may be represented by more than one bit to identify different code generation models. Some embodiments of the present invention recognize and leverage scenarios in which new instruction encodings may be treated as versions that do not denote a preferred preemption point since these versions may presumably occur less frequently in the code.

Some embodiments of the present invention recognize that processors are able to process two or more threads concurrently by performing context switches between threads. A context switch causes the processing of a first thread to be interrupted and the state of the first thread (e.g., register values, program counter values, addresses of instructions to be executed next) to be saved in memory. The state of a second thread may then be loaded (e.g., values loaded into the registers, program counter values set) so that the second thread may be processed until another context switch back to the first thread, or another thread. Some embodiments of the present invention recognize that, in some scenarios, context switching can require an amount of computational overhead and processing time that is dependent on the amount of data saved and loaded. A thread is a term of art that describes a running task. A compiler is not aware of threads. Instead, the compiler is aware of functions. An operating system and/or the managed run-time environment are responsible for starting up threads (tasks) and running them. Each thread has its own context, its own run-time stack, its own set of registers, including stack pointer and program counter registers.

Some embodiments of the present invention recognize that, during the past three decades, various trends in computer architecture have resulted in significant increases in the time required to perform a thread context switch. Some embodiments of the present invention recognize that the size of a machine's typical "small" register has increased from 8 bits to 64 bits wide. Some embodiments of the present invention recognize that the size of a machine's typical "large" register has increased from 16 bits to 512 bits (for vector data types). Some embodiments of the present invention recognize that the number of registers has increased from less than 10 to over 100. For example, some state of the art computing systems have 32 64-bit general-purpose registers, 64×128-bit Vector Scalar Registers, and over 100 special-purpose registers, many of which also hold data that must be saved as part of a thread's context. Some embodiments of the present invention recognize that the implicit state of each thread is also much larger, due to features such as deep pipelines, SIMD instructions, and speculative execution. This means more cycles are required to allow the thread state to quiesce before its context can be saved.

Some embodiments of the present invention recognize that the time required to perform a context switch from one thread to another has increased significantly, especially in proportion to the time required to perform other useful computations. Some embodiments of the present invention recognize that the trends that have driven this increase in time continue, adding further to the anticipated proportional costs of context switching on future architectures. Some embodiments of the present invention recognize that, before beginning to search for optimal preemption points, each function's control flow graph must be examined to determine whether it already contains any of the special instructions, described herein, that are now recognized automatically as preferred preemption points.

Some embodiments of the present invention recognize that some typical state of the art computers might have memory access times of 1.35 ns for L1 cache, 3.5 ns for L2 cache, 12 ns for L3 cache, and 115 ns for memory. A typical context switch might require storing 100 128-bit words and fetching 100 128-bit words, with cumulative execution times ranging between 270 ns and 23 µs. Some embodiments of the present invention recognize that whether thread state information is typically resident within caches depends on attributes of the workload, which can vary greatly across application domains.

For example, assume the time required to perform a context switch on a modern computer ranges from approximately 300 ns to 25 µs, depending on whether stored write operations can be effectively buffered and whether fetched values are available in caches, so assume the typical context switch time is 5 µs. With a batch-oriented workload that time slices 30 times a second, the overhead of context switching is negligible at 5 µs/33,000 µs, which is approximately equal to 0.015%.

However, the time required to perform a context switch is more of an issue in time-critical workloads, due to much more frequent context switching and due to the need for tight bounds on response time latencies. Electronic securities trading is an application with tasks that must respond to thousands of events per second, with typical response-time deadlines measured in the tens of microseconds (µs). With high-frequency task workloads such as securities trading applications, the overhead of context switching may consume as much as 20% of the total processing capacity.

Some embodiments of the present invention leverage the use of compiler technology to improve the efficiency of context switching. Some embodiments of the present invention provide a new machine instruction and new instruction processing semantics that allow the compiler to denote preferred preemption points. Some embodiments of the present invention recognize that certain control points are preferred for preemption because they represent points at which there is less state to be saved and restored. Some embodiments of the present invention provide a compile-time analysis that determines the points at which context switching requires the saving and restoring of less state information.

Some embodiments of the present invention recognize that early designs of so-called real-time garbage collection algorithms focused on shortening the typical time required to respond to asynchronous events, the so-called response time. Response time includes the time required to preempt the running thread (the preemption latency), switch contexts to the high-priority thread that is responsible for responding to the event and allow the newly dispatched thread to complete the work that comprises the intended response. Some embodiments of the present invention recognize that other objectives, such as achieving high throughput of application code on multi-core platforms, assuring that recycling of memory by the garbage collector stays on pace with the application's consumption of memory, and obtaining tight bounds on the expected preemption latency rather than simply minimizing the average preemption latency, may be of equal or even greater importance when applied to real-time garbage collection.

Some embodiments of the present invention recognize that, in comparison with the use of legacy languages like C and C++, programs that use managed run-time environments providing support for tracing garbage collection of dead memory may offer tremendous improvements in software developer productivity and large decreases in software maintenance costs. However, some embodiments of the present invention also recognize that the use of real-time garbage collection in time-critical applications typically extracts a high toll on system performance. Some embodiments of the present invention recognize that some existing commercial time-critical virtual machine products usually run at less than half the speed of comparable virtual machine products that do not honor timeliness constraints.

Some embodiments of the present invention recognize that one reason that time-constrained managed run-time environments run much slower is because the application code is required to continually coordinate with asynchronous garbage collection activities. Some embodiments of the present invention recognize that each pointer variable or field overwritten by an application thread must be communicated to the garbage collector as this impacts its assessment of which objects are garbage. Likewise, some embodiments of the present invention recognize that whenever the garbage collector relocates objects to reduce memory fragmentation, this must be communicated promptly to any application code that is accessing the objects.

Some embodiments of the present invention recognize that analyses and proofs for compliance with timing constraints in real-time computing are often based on understanding various worst-case scenarios. Some embodiments of the present invention recognize that analysis of an application's timeliness is based on the application's thread execution times and on its preemption latencies. Some embodiments of the present invention recognize that, in terms of this analysis, there may be little value in knowing that the typical thread preemption latency is 10 ns if the upper bound on preemption latency is no smaller than 200 μs. Some embodiments of the present invention recognize that such a system can be considered unbalanced. For example, some embodiments of the present invention recognize that such a system, as a managed run-time platform, is likely poorly serving the needs of developers creating time-critical applications. Some embodiments of the present invention recognize that, insofar as time-critical developers need to assure compliance with timing constraints, they are likely to be much better served by a system that offers consistent preemption latency of, for example, no more than 1 μs rather than a system that offers unpredictable preemption latencies ranging from 10 ns to 200 μs. Some embodiments of the present invention recognize that this may be especially true if a system so configured offers improvements in overall performance, which may essentially cut in half the expected execution times of each time-critical thread.

Some embodiments of the present invention recognize that, in some scenarios, in order to assure timely preemption of running application threads, a preemption point is placed in every unbounded loop. However, some embodiments of the present invention further recognize a preemption point being placed in every unbounded loop requires execution of one extra instruction in the loop preheader. This instruction specifies an instruction address within the loop at which preemption is preferred. This represents an improvement over certain existing Java code generation models, for example, which require execution of three extra instructions on each iteration of the loop.

Some embodiments of the present invention recognize that to assure that deeply recursive functions have sufficiently frequent preemption points, a preemption point is also required within each function's prologue. Some embodiments of the present invention recognize that adding even a single instruction to each function's prologue may incur overheads from 5-10% on some object-oriented workloads. Therefore, some embodiments of the present invention provide an elimination of the need for extra preemption-identifying instructions in function prologues and epilogues.

Some embodiments of the present invention recognize that inter-procedural analysis is especially difficult with object-oriented programs written in certain languages, such as Java, due both to dynamic dispatch and dynamic class loading. Some embodiments of the present invention recognize that in the absence of inter-procedural analysis, some conventions may require that a preemption point be placed into each function's translation within alpha execution time of the function's entry point and within gamma execution time of the function's return instruction. Some embodiments of the present invention recognize that these two symbolic constants, alpha and gamma, which represent characteristics of the target platform, typically represent values smaller than 50 ns. Some embodiments of the present invention recognize that for small functions, a single preemption point inserted into the function's code may satisfy both constraints.

As described herein, some embodiments of the present invention provide a compiler that selects preferred preemption points and performs the following actions for each: (i) If the preferred preemption point is represented by an instruction that is known by the underlying computer system to match a pattern that identifies preferred preemption points in the intended execution mode, simply insert into the translated program's preemption-point data structure an entry to describe this preferred preemption point, (ii) otherwise, (a) the compiler inserts into the code sequence an instruction to identify to the underlying hardware instruction dispatcher that preemption is preferred at a particular instruction address, and (b) the compiler inserts into the translated program's preemption-point data structure an entry to describe this preemption point. The preemption-point data structure supplies information regarding which registers are live at each of the preferred preemption points. Some embodiments of the present invention recognize and leverage that the instruction that immediately follows a stdu or addi instruction, i.e., an instruction set architecture (ISA) instruction, is typically recognized as a preferred preemption point if both the target and source operands of the instruction is register 1, e.g., the stack pointer. Further, the preemption performing exception handler only saves and restores these registers when a context switch is required. As such, some embodiments of the present invention provide an elimination of the need for the extra instruction(s) to identify preferred preemption points.

Some embodiments of the present invention recognize that other instructions may also be considered candidate markers for preferred preemption points. In one embodiment, the stdux instruction may be used in addition to the stdu instruction, as stdux is typically used to set up an activation frame whose size depends on a function's incoming arguments. In one embodiment, the add instruction with register 1 serving as both input and result operands may be used to remove an activation frame whose size depends on a function's incoming arguments. In one embodiment, on a 32-bit target, the stwu and stwux instructions serve the role of stdu and stdux on a 64-bit target. On a 32-bit target, the addi instruction may be represented by an addi followed by mr, where the target of the mr instruction is register 1 (e.g., the stack pointer). One embodiment recognizes that other languages and other compilers may have different "common use cases". In one such embodiment, a survey of common usage patterns is leveraged to guide the choice of which instructions are considered implicit preferred preemption points. For example, the translation of an object-oriented programs written in, for example, the Java language, will have frequent invocations of virtual method calls, which are typically represented by the bctrl instruction. When the running application is known to have been written in Java, recognizing bctrl instruction as a typical preferred preemption point is worthwhile.

In one embodiment, the choice to treat the point immediately following a particular pattern instruction as the preferred preemption point is intentional. In some scenarios and embodiments of the present invention, such a design choice allows more effective pipelining while minimizing or without imposing delays on the fast path through the instruction. In one embodiment, the fast path represents the scenario in which no preemption is requested, so code executes normally without the need for an event-based branch to prepare for the context switch.

In one embodiment, and following certain embodiments of FIGS. 34-39, some embodiments do not require changes to the application binary interface (ABI). An ABI is an interface between two binary program modules; often, one of these modules is a library or operating system facility, and the other is a program that is being run by a user 103. In general, the ABI defines how data structures or computational routines are accessed in machine code, which is a low-level, hardware-dependent format. In contrast, an application programming interface (API) defines this access in source code, which is a relatively high-level, hardware-independent, often human-readable format. A common aspect of an ABI is the calling convention, which determines how data is provided as input to or read as output from computational routines, for example, the x86 calling conventions. Some embodiments of the present invention recognize that adhering to an ABI (which may or may not be officially standardized) is usually the job of a compiler, operating system, or library author. However, some embodiments of the present invention recognize that an application programmer may have to deal with an ABI directly when writing a program in a mix of programming languages, which can be achieved by using foreign function calls.

Some embodiments of the present invention recognize that, in some scenarios, the goal of improving the performance of high-frequency context switching is best served by adjusting the balance between volatile and non-volatile registers. In one embodiment, in a given ABI, the numbers of volatile and non-volatile registers are approximately equal. However, some embodiments of the present invention recognize that the performance of fast compiler-assisted context switching can be improved if the number of volatile registers is much larger than the number of non-volatile registers. As such, in certain embodiments of the present invention, the number of volatile registers is much larger than the number of non-volatile registers.

Some embodiments of the present invention recognize that it is safe for application code generated according to the conventions of a new ABI, which specifies an increase in the number of volatile registers, to call library services provided by code generated according to a legacy ABI with a smaller number of volatile registers. Some embodiments of the present invention recognize that, in the case that such library code calls back into the application code, it is necessary to save those registers that are considered volatile in the new ABI but not in the legacy ABI. Thus, any functions referenced by function pointers passed into library code for the purpose of enabling call-backs from library code to application code must include code that saves and restores all of the registers that are considered volatile within the new ABI but are not considered volatile within the legacy ABI.

Some embodiments of the present invention recognize that ABIs may control, in part, system characteristics, such as, but are not limited to: (i) a processor instruction set (with details like register file structure, stack organization, memory access types, . . . ). (ii) the sizes, layouts, and alignments of basic data types that the processor can directly access. (iii) the calling convention, which controls how functions' arguments are passed and return values are retrieved. For example, whether all parameters are passed on the stack or some are passed in registers, which registers are used for which function parameters, and whether the first function parameter passed on the stack is pushed first or last onto the stack. (iv) How an application should make system calls to the operating system and, if the ABI specifies direct system calls rather than procedure calls to system call stubs using the system call numbers. (v) In the case of a complete operating system ABI, the binary format of object files, program libraries and so on.

Some embodiments of the present invention recognize that a complete ABI allows a program from one operating system supporting that ABI to run without modifications on any other such system, provided that necessary shared libraries are present and similar prerequisites are fulfilled. Some embodiments of the present invention recognize that other ABIs standardize details, such as the C++ name mangling, exception propagation, and calling conventions between code produced by multiple compilers targeting the same platform.

Some embodiments of the present invention recognize that an embedded-application binary interface (EABI) specifies standard conventions for file formats, data types, register usage, stack frame organization, and function parameter passing of an embedded software program, for use with an embedded operating system. Some embodiments of the present invention recognize that compilers that support the EABI create object code that is compatible with code generated by other such compilers, allowing developers to link libraries generated with one compiler with object code generated with another compiler. Some embodiments of the present invention recognize that developers writing their own assembly language code may also interface with assembly generated by a compliant compiler. Some embodiments of the present invention recognize that EABIs are designed to optimize for performance within the limited resources of an embedded system. Therefore, some embodiments of the present invention recognize that many EABIs omit most abstractions that are made between kernel and user code in complex operating systems. As examples, dynamic linking may be avoided to allow smaller executables and faster loading, fixed register usage may be leveraged to allow more compact stacks, and kernel calls and running the application in privileged mode can be leveraged to allow direct access to custom hardware operation without the indirection of calling a device driver. As such, some embodiments of the present invention recognize that the choice of EABI can affect performance.

In some embodiments of the present invention and scenarios, there is no required particular frequency for preemption points to exist in the generated code. Some embodiments of the present invention recognize that a compiler may, however, be configured to guarantee a maximum execution time interval between consecutive preferred preemption points. Some embodiments of the present invention provide a compiler that is configured to only generate preferred preemption points in parts of code that are known to represent performance critical loops. Since typical application workloads spend most of their CPU time executing within these performance critical loops, inserting preferred preemption points into these critical loops in order to improve the context switching performance of these loops may deliver nearly all the performance benefits of compiler-optimized context switching while only requiring a relatively small percentage of the full application's code to be recompiled according to the conventions of a new preferred-preemption-point ABI. Multiple embodiments of the present invention and scenarios therefore benefit from the more efficient performance offered by using the preferred preemption points.

Some embodiments of the present invention recognize that, in the scenario where (i) an operating system or managed run-time environment requests preemption of a running thread and (ii) the thread does not yield sufficiently quickly, that the thread may experience a traditional operating system context switch, which may result in the saving and restoration of all registers. In some embodiments of the present invention and scenarios, this behavior occurs in response to expiration of a timeout alarm that is set and handled by the operating system or managed run-time environment.

Some embodiments of the present invention provide recognition of preferred preemption points within very small leaf functions, some of which may not build an activation frame. To support these functions, some embodiments of the present invention treat the blr instruction, which represents return from function call, as a preferred preemption point. Some embodiments of the present invention recognize that treating the blr instruction as a preferred preemption point requires the compiler to generate live-register information at each point to which control returns following a function call. In some embodiments of the present invention and scenarios, if the blr instruction is treated as a preferred preemption point, then there is less incentive to treat the addi to target and source register 1 instruction as a preferred preemption point. In many embodiments of the present invention and scenarios, the blr instruction will occur within ten instructions or so of the occurrence of the addi instruction.

In some embodiments of the present invention and scenarios, the compiler and hardware are configured to support either (a) treating the blr instruction as a preferred preemption point or (b) treating the addi to target and source register 1 instruction as a preferred preemption point. However, some embodiments of the present invention leverage both of the options, i.e., both (a) and (b), since the preferred preemption point at the addi instruction typically has much less state to be saved and restored when compared to a corresponding blr instruction that is treated as a preferred preemption point. Some embodiments of the present invention recognize that if both types of preemption points, i.e., both (a) and (b), are supported, it is much more likely that the preemption point associated with the addi instruction will be encountered, since there is typically more code in the function body than in the function epilogue. Some embodiments of the present invention recognize that supporting both instructions may make the hardware of such a system more complex and more expensive. Some embodiments of the present invention recognize that supporting both instructions may also require larger data structures, e.g., larger data tables, to be generated by the compiler to identify the live registers at each preferred preemption point. In some embodiments of the present invention, where only one of the two options, i.e., either (a) or (b), can be supported by hardware, then the blr instruction, not the addi instruction, is treated as a preferred preemption point since this instruction provides reliable epilogue preemption point for both (i) functions that establish activation frames and (ii) functions that do not establish activation frames.

In some embodiments of the present invention and scenarios, there are situations in which the compiler generates or emits the special instructions that the computer system normally recognizes as preferred preemption points when the control point at which the special instruction appears is not actually a preferred preemption point. The following describes several possible modes of operation for a compiler's generation and treatment of such special instructions. Some embodiments of the present invention exclusively operate using only one such possible mode. In other embodiments of the present invention, the additional processing characteristics of a given scenario are detected and the compiler selects a mode of operation that best matches those additional context/processing characteristics.

In one such embodiment, in a first mode of operation, whenever the compiler 312 generates or emits an instruction that is known to the processor 156 as a preferred preemption point, it also places into the translated program's preemption-point data structure an entry to describe all of the registers that must be saved and restored if preemption occurs at this control point. Since this control point is not an actual preferred preemption point, the number and sizes of the registers that would need to be preserved across a context switch if it occurred at this control point is typically very large. Thus, this mode of operation is best suited to situations where the occurrence of the special instruction in control points that do not represent preferred preemption points is very rare. Thus, the rare need to save and restore the abnormally large amount of contextual information would be expected to have a minimal impact on overall system performance.

In one such embodiment, in a second mode of operation, whenever the compiler 312 generates or emits an instruction that the processor 156 normally recognizes as a preferred preemption point, the compiler either (a) does not generate an entry in the program's preemption-point data structure corresponding to the address of this special instruction, or (b) it generates a special sentinel entry within the program's preemption-point data structure to identify that this control point is really not a preferred preemption point. As such, when the context-switching event handler executes, the context-switching event handler (i) consults the preemption-point data structure and determines that the given preempted control point does not correspond to an actual preferred preemption point and (ii) sets the machine state to continue looking for a preferred preemption point and immediately returns so that the system resumes execution of the currently running thread.

In one such embodiment, in a third mode of operation, to reduce the occurrence of false identification of preferred preemption points, selected instructions may be treated as preferred preemption points only if they occur in particular contexts. In one such embodiment, the stdu and stdux instructions are only treated as preferred preemption points by the compiler 312 and by the processor 156 if the stdu and stdux instructions follow an execution of a branch-and-link instruction that has not already been followed by a stdu or stdux instruction.

In one such embodiment, in a fourth mode of operation, a single bit is provided as part of each thread's execution state and that bit denotes whether or not the thread is running in legacy mode or cooperative-preemption mode. Some embodiments of the present invention recognize that binaries compiled for legacy architectures are run in the legacy mode. In such an embodiment, if the compiler is set to use preferred-preemption marking instructions along with contexts that are not associated with preferred preemption points, then the compiler generates/transmits instructions to temporarily switch the thread's status between legacy and compiler-assisted-preferred-preemption modes of execution.

In one such embodiment, in a fifth mode of operation, multiple bits are provided as part of each thread's execution state and those bits denote one of multiple possible execution modes. Some embodiments of the present invention recognize that such an approach may be useful if, for example, there is code that is derived from different source languages or if different compiler versions conform to different code generation protocols. For example, in one scenario, the prologue and epilogue conventions for a program written in Go are different from all of: (a) the prologue and epilogue conventions for a Java program, (b) the prologue and epilogue conventions for a modernized C program, (c) the prologue and epilogue conventions for a legacy C program, and (d) the prologue and epilogue conventions for a 32-bit code model C program. In one such embodiment, the options are simplified by not addressing the large diversity of legacy practices. In one embodiment, there is a description of the conventions supported by a given new hardware and a compiler adjusts its code generation behavior to conform to those new conventions.

In one such embodiment, in a sixth mode of operation, the set of instructions that are recognized as preferred preemption points is set by each application using special instructions to load masks, patterns, and certain other information into special purpose registers which are used for the purpose of determining the instructions that represent preferred preemption points. A mask identifies which bits of an operation code are considered relevant in the matching of an instruction against a pattern. If the bits of an instruction's operation code are logically anded with the mask and the result equals the pattern, this instruction is considered to represent a preferred preemption point. Certain other information which may also be loaded into special purpose registers for the purpose of enabling programmable preemption point detection may include for each of the preferred-preemption-point mask/pattern pairs a required prefix mask/pattern pair representing an instruction that must precede a matched preferred-preemption-point pattern, an exclusion mask/pattern pair which represents instructions that must not appear between an occurrence of the prefix instruction and the candidate preferred-preemption-point instruction, and an integer proximity value which represents the maximum number of instructions between an occurrence of an instruction matched by the prefix pattern and an instruction matched by the preferred-preemption-point pattern.

In one such embodiment, in a seventh mode of operation, new forms of instruction operation codes are added to the instruction set architecture (ISA) that distinguish between legacy-mode behavior and compiler-assisted-preferred-preemption mode behavior. As such, when the compiler introduces a preferred preemption point, the compiler uses the new form of the instruction. When this same special instruction is emitted by the compiler at control points that do not represent preferred preemption points, the compiler emits the original legacy-mode form of the same instruction. In some embodiments of the present invention, since most operation codes (i.e., opcodes) are already assigned, it is required that the compiler-assisted-preferred-preemption mode instructions use a multi-word opcode. Such embodiments of the present invention recognize that certain processing characteristics such as, but not limited to, instruction prefetch, decode, and instruction cache efficiency, may be degraded by the use of multi-word instruction encodings. Therefore, some embodiments of the present invention may prohibit the use of this mode of operating in certain scenarios that have certain processing conditions, e.g. when one or both of instruction prefetch, decode, and instruction cache efficiency may be degraded to below a threshold. As such, it is to be understood that the compiler can recognize those scenarios and processing conditions and select available modes of operation accordingly.

Finally, some embodiments of the present invention recognize that the use of the special instructions that are associated with actual preferred preemption points are presumably more frequent than the aforementioned uses of the special instructions at control points that do not represent preferred preemption points. Therefore, in some embodiments of the present invention, if a new alternative encoding of an instruction is introduced, then the processor 156 and the compiler 312 associate the new multi-word encoding with the version of the instruction that is not recognized as a preferred preemption point. In some embodiments of the present invention and scenarios, this approach is used in combination with the aforementioned thread execution state bit(s) to run legacy code without incurring the overhead of unwanted exception handling that is associated with false alerts for preemption.

The present invention will now be described in further detail with reference to the Figures. FIGS. 1-43 provide embodiments encompassing a computer system, a computer implemented method, and computer program product that provide compiler-assisted context switching in accordance with various embodiments of the present invention. FIGS. 1-33 specifically address various embodiments of the present invention that provide placement of explicit preemption points into compiled code in accordance with the present invention. FIGS. 34-39 specifically address various embodiments of the present invention that provide compiler-optimized context switching in accordance with the present invention. FIGS. 40-43 specifically address various embodiments of the present invention that (i) provide compiler-assisted context switching and that (ii) leverage instructions that can be recognized as preferred preemption points based, at least in part, on associated contexts that dictate the treatment of those instructions in accordance with the present invention.

One aspect of the invention provides a computer implemented method. The method comprising: determining, by at least one computer processor, a set of possible control locations for preemption of a running thread; determining, by the at least one computer processor, a ranking of the efficiency of possible control locations for preemption whereby preempting a thread at a control location that holds less program state is considered more efficient than preempting a thread at a control location that holds more program state; determining, by the at least one computer processor, a ranking of the expediency of possible locations for preemption whereby control locations that are more easily recognized at run time as possible control locations for preemption are considered to be more expedient; determining, by the at least one computer processor, a set of preferred preemption points, wherein the preferred preemption points are selected because they are both efficient and expedient; and generating, by the at least one computer processor, a data structure that is included as part of a program's executable image, which identifies exactly which contextual information must be saved and restored if a thread experiences a context switch at each identified preferred preemption point.

Another aspect of the invention provides a computer program product embodied as program instructions stored on a computer readable storage medium. The program instructions comprising instructions to cause a computing device to perform the aforementioned method. Another aspect of the invention provides a computer system. The computer system including program instructions stored on a computer readable storage medium that, when executed by the computer system, causes the computer system to perform the aforementioned method.

In various embodiments of the present invention the method includes: comparing the efficiency and expediency of possible control locations for preemption to determine the set of preferred preemption points.

In various embodiments of the present invention the method includes: (i) determining that a possible control location for preemption satisfies one or more rules that govern the selection of preferred preemption points and (ii) generating an entry in the data structure that indicates the instruction address and the contextual information associated with the preferred preemption point.

In various embodiments of the present invention the method includes: (i) determining that a certain control point that is highly expedient for preemption fails to satisfy one or more rules that govern creation of preferred preemption points and (ii) generating an entry in the data structure that indicates that the possible location corresponds to a control point that is unavailable as a preferred preemption point, wherein an attempt to preempt a given thread at this control point is rejected.

In various embodiments of the present invention the method includes: determining that certain frequently occurring instructions represent control points following which the typical amount of contextual information is small, wherein, recognition at run time that one of these certain is executing may trigger the currently running thread to be preempted upon completion of this instruction's execution.

In various embodiments of the present invention the method includes: determining that different sets of the frequently occurring instructions that represent control points following which the typical amount of contextual information is small are selected during different modes of operation, wherein the computer is configured to recognize different instructions as triggering preemption during different modes of operation.

In various embodiments of the present invention the method includes: (i) introducing new modes of operation for the purpose of improving the efficiency and latency of frequent context switching between threads running according to the constraints of these new modes of operation, and (ii) establishing the code-generation convention for modes of operation designed to support high-frequency context switching that the number of volatile (caller-saved) registers is much larger than the number of non-volatile (callee-saved) registers, (iii) establishing protocols to allow intermode calling conventions such that (a) when calling a function that executes according to a mode with a large number of volatile registers from a function with a small number of volatile registers, registers that are treated as non-volatile according to the caller's but not the callee's mode are saved and restored around the call, and (b) when calling a function that executes according to a mode with a small number of volatile registers from a function that executes according to a mode with a larger number of volatile registers, no extra efforts are required.

In various embodiments of the present invention the method includes: (i) determining a threshold that corresponds to a maximum allowable execution time interval between consecutive preferred preemption points, and (ii) selecting preferred preemption points such that the maximum execution time between consecutive preemption points is assured to be less than or equal to the threshold value.

In various embodiments of the present invention the method includes: generating (i) an instruction that includes (a) an indication that a given control point in the thread is a preferred preemption point, and (b) an indication that the given control point is associated with particular information that is stored within a data structure that identifies registers that must be saved if preemption is triggered at the given control point, and (ii) an entry in the data structure that identifies registers that must be saved if preemption is triggered at the given control point.

In various embodiments of the present invention the method includes: (i) identifying certain instruction opcodes as typically representing preferred preemption points whereby upon emitting one of these certain instruction opcodes, the compiler (a) also makes an entry within the particular data structure that represents the contextual information that must be saved and restored at each preemption point to represent this instruction, the entry therein either (b) providing a description of the registers that must be saved and restored at this preemption point, or (c) holding a special sentinel value which denotes that the given control point is not a preferred preemption point, and (ii) preventing preemption at the given control point if the data structure entry holds the sentinel value.

In various embodiments of the present invention the method includes: generating one or more bits as part of an execution state of a given thread that is included in the set of threads, wherein the one or more bits indicate a given execution mode included in a set of possible execution modes, wherein each possible execution mode of the set of possible execution modes includes a set of processing behaviors for processing the set of threads.

In various embodiments of the present invention the method includes: generating a preferred preemption point in the given thread using a type of instruction that distinguishes between a processing behavior of the given execution mode and respective processing behaviors of other execution modes included in the set of possible execution modes. In other words, the instructions recognized as preferred preemption points in the "given execution mode" may be different than the instructions that are recognized as preferred preemption points in other execution modes.

In various embodiments of the present invention the method includes: (i) generating a bit as part of an execution state of a given thread included in the set of threads, wherein the bit denotes whether the given thread is running in a legacy mode or a cooperative-preemption mode, and (ii) allowing each thread to change the configuration of this bit depending on its current mode of execution.

In various embodiments of the present invention, the method includes: (i) allowing each thread to identify whether it is running in legacy mode or in a cooperative-preemption mode, (ii) allowing a run-time thread scheduling service to determine the mode of the currently running thread before performing a context switch on that thread, (iii) the run-time thread scheduling service causing a context switch to occur by interrupting the currently running thread and saving all machine registers if the currently running thread is executing in legacy mode, (iv) the run-time thread scheduler causing a context switch to occur by requesting the currently running thread to preempt itself, saving only the subset of machine registers that are currently in use in a timely manner if the currently running thread is executing in cooperative-preemption mode, (v) the run-time thread scheduler interrupting a currently running thread that is executing in cooperative-preemption mode, forcing a context switch that saves all machine registers if the currently running thread does not yield to the preemption request within a threshold amount of time.

In various embodiments of the present invention the cooperative-preemption mode instructions for preferred preemption points include multi-word operation codes.

In various embodiments of the present invention the method includes: (i) allowing each thread to establish as part of its context the set of instruction operation codes (opcodes) that are recognized as typically representing preferred preemption points, and (ii) allowing each thread to modify the set of instruction opcodes that are typically recognized as preferred preemption points when the thread changes between different execution modes.

In various embodiments of the present invention the method includes: restricting the use of a particular execution mode included in a set of possible execution modes based on a determination that use of that the particular execution mode will create an unacceptable processing condition.

In various embodiments of the present invention the method includes: (i) introducing new instruction encodings (operation codes) that implement the exact same functionality as existing instructions, with the additional characteristic that the new instruction encodings are designated as typical preferred preemption points, (ii) arranging for the compiler to emit the alternative encoding of the instruction instead of the original instruction in and only in contexts that the compiler chooses to identify as preferred preemption points.

Various embodiments of the present invention that provide placement of explicit preemption points into compiled code in accordance with the present invention will now be discussed with reference to at least FIGS. 1-33. More specifically, exemplary computer implemented methods, computer systems/apparatus, and computer program products that provide placement of explicit preemption points into compiled code in accordance with the present invention are described with reference to the accompanying drawings, beginning with FIG. 1. FIG. 1 sets forth a network diagram of a system configured for placement of explicit preemption points into compiled code according to embodiments of the present invention. The system of FIG. 1 includes a user 103, workstation 104 that can communicate via a Wide-Area Network (WAN) 101 to a server 108 configured for the placement of explicit preemption points into compiled code in accordance with the present invention. Alternatively, a user 103 workstation 106 can communicate with the server 108 via a Local Area Network (LAN) 102.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Placement of explicit preemption points into compiled code in accordance with the present invention is generally implemented with computers, that is, with automated computing machinery. In the system of FIG. 1, for example, all the server 108 and workstations 104 and 106 are implemented to some extent at least as computers. Therefore, for further explanation, FIG. 2 sets forth a block diagram of automated computing machinery comprising an exemplary computer 152 configured for placement of explicit preemption points into compiled code according to embodiments of the present invention. The computer 152 of FIG. 2 includes at least one computer processor 156 or 'CPU' as well as random-access memory ('RAM') 168 which is connected through a high-speed memory bus 166 and bus adapter 158 to processor 156 and to other components of the computer 152.

Stored in RAM 168 is a managed run-time environment 310, a module of computer program instructions for managing the execution of one or more threads, such as thread 309. Also stored in RAM 168 are a compiler 312, a module of computer program instructions for translating program code of the one or more threads, such as thread 309, into processor-executable instructions. Also stored in RAM 168, as part of compiler 312 is a preemption point verifier 314, a module of computer program instructions improved for placement of explicit preemption points into compiled code according to embodiments of the present invention.

Figure 2:
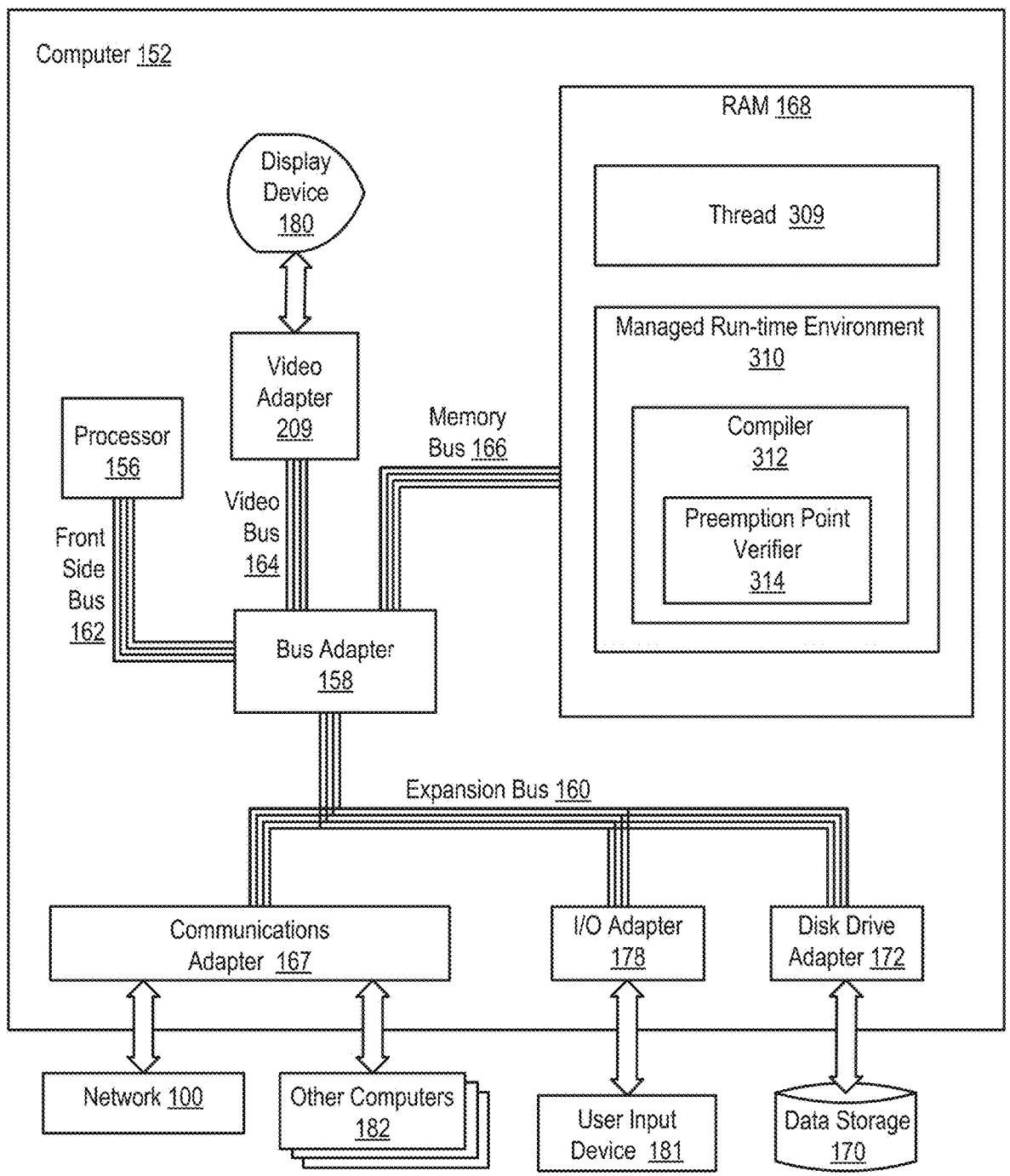
FIG. 2 is system diagram in accordance with embodiments of the present invention.

The computer 152 of FIG. 2 includes disk drive adapter 172 coupled through expansion bus 160 and bus adapter 158 to processor 156 and other components of the computer 152. Disk drive adapter 172 connects non-volatile data storage to the computer 152 in the form of data storage 170. Disk drive adapters useful in computers configured for placement of explicit preemption points into compiled code according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example computer 152 of FIG. 2 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example computer 152 of FIG. 2 includes a video adapter 209, which is an example of an I/O adapter specially designed for graphic output to a display device 180 such as a display screen or computer monitor. Video adapter 209 is connected to processor 156 through a high-speed video bus 164, bus adapter 158, and the front side bus 162, which is also a high-speed bus.

The exemplary computer 152 of FIG. 2 includes a communications adapter 167 for data communications with other computers 182 and for data communications with a data communications network, herein denoted network 100. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for placement of explicit preemption points into compiled code according to embodiments of the present invention include modems for wired dial-up communications, Ethernet (IEEE 802.3) adapters for wired data communications, and 802.11 adapters for wireless data communications.

Some embodiments of the present invention are directed to improvements in a managed run-time environment, which may be implemented in the exemplary computer 152, to (a) bound the amount of execution time between preemption-safe points along all valid control paths, and (b) provide a compile-time algorithm that places explicit preemption points into generated code in order to establish balance between efficient execution of application threads and a tight upper bound on preemption latency. The bound for preemption latency is tunable over a range of possible values. In examples according to embodiments of the present invention described herein, a typical execution time value for the preemption latency bound in time-critical systems may be 1 μs. Depending on the cycles per instruction (CPI) of the application workload and the processor clock rate, several thousand instructions may be executed between preemption-safe execution points within this preemption latency bound In embodiments of the present invention, CPU time (or process time) is the amount of time for which a central processing unit (CPU) such as processor 156 dedicates its resources to the execution of a particular thread of control. Since modern processors typically process more than one thread of control in parallel, partitioning of CPU time between multiple parallel threads is typically based on the dispatching of instructions. "Execution time" is used to describe the expected amount of CPU time required to execute the instructions that implement a particular capability. On modern computer architectures, the execution time required to execute a sequence of instructions may differ from the worst-case time by a factor of 100 or more due to differences in cache contents, contention with other threads for shared pipeline resources, the impacts of speculative execution, and other factors. It is common for soft-real-time developers to budget CPU time in terms of expected execution time rather than worst-case CPU time because this is more representative of the underlying computer's true workload capacity. The expected time to execute a sequence of instructions can be estimated, for example, by multiplying the number of instructions by a measurement of the target computer's average CPI on the workload of interest. Other estimation techniques, such as using a different CPI for each individual machine instruction to improve the accuracy of the estimate, measuring the typical CPU time of a particular instruction sequence when running in the context of the actual application, or other suitable techniques for measuring execution time to execute a sequence of instructions as known to those knowledgeable in the art may be employed without departing from the scope of the present invention.

The use of preemption-safe points in garbage collected systems is a technique for minimizing the overhead of coordinating between application and garbage collection threads. The compiler identifies certain points at which it is safe to preempt each application thread and context switches between threads are only allowed at these preemption-safe points. Postponing preemption until a thread reaches its next preemption-safe point has the effects of both increasing the thread's preemption latency and significantly improving the efficiency of the code that executes between explicit preemption points. During the long intervals between preemption points, with a typical interval executing a thousand or more instructions, a compiler, such as compiler 312, has freedom to efficiently allocate registers, to introduce induction variable optimizations, and to perform other optimizations that might otherwise confuse a garbage collector's analysis of a thread's run-time stack and register usage. Furthermore, the cost of each context switch is also reduced. By allowing the compiler to select preemption points at which the number of live registers is small, the amount of state data that needs to be saved and restored at each preemption point is much smaller than with context switches orchestrated by the operating system, e.g., operating system 3510 of FIGS. 35 and 43.

Figure 3:
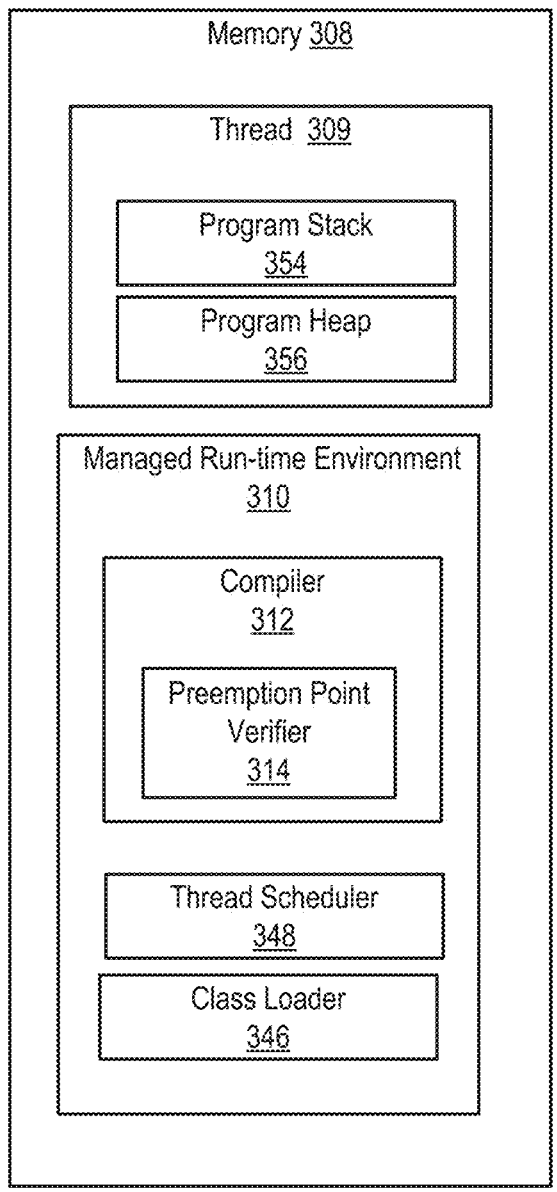
FIG. 3 is a program execution environment in accordance with embodiments of the present invention.

For further explanation, FIG. 3 shows a memory 308 of a typical multitasking computer system, e.g., computer 152, which includes a Random-Access Memory (RAM) and non-volatile memory for storage. The memory 308 stores a managed run-time environment 310 and one or more threads, such as thread 309. Each active thread 309 in the system is assigned a portion of the computer's memory, including space for storing the application thread program stack 354, a program heap 356 that is used for dynamic memory allocation, and space for storing representations of execution states. The managed run-time environment 310 further includes a thread scheduler 348, which takes responsibility for deciding which of the multiple tasks being executed to dedicate CPU time to. Typically, the thread scheduler 348 must weigh tradeoffs between running application process threads and preempting threads when CPU resources need to be reassigned. Further, within the managed run-time environment 310, multiple independently developed applications may run concurrently.

In particular, the managed run-time environment 310 includes a compiler 312 that further includes a preemption point verifier 314 in accordance with the present invention, for verifying whether a compiled bytecode program satisfies certain preemption latency criteria.

The managed run-time environment 310 also includes a class loader 346, which loads object classes into the heap.

Figure 4:
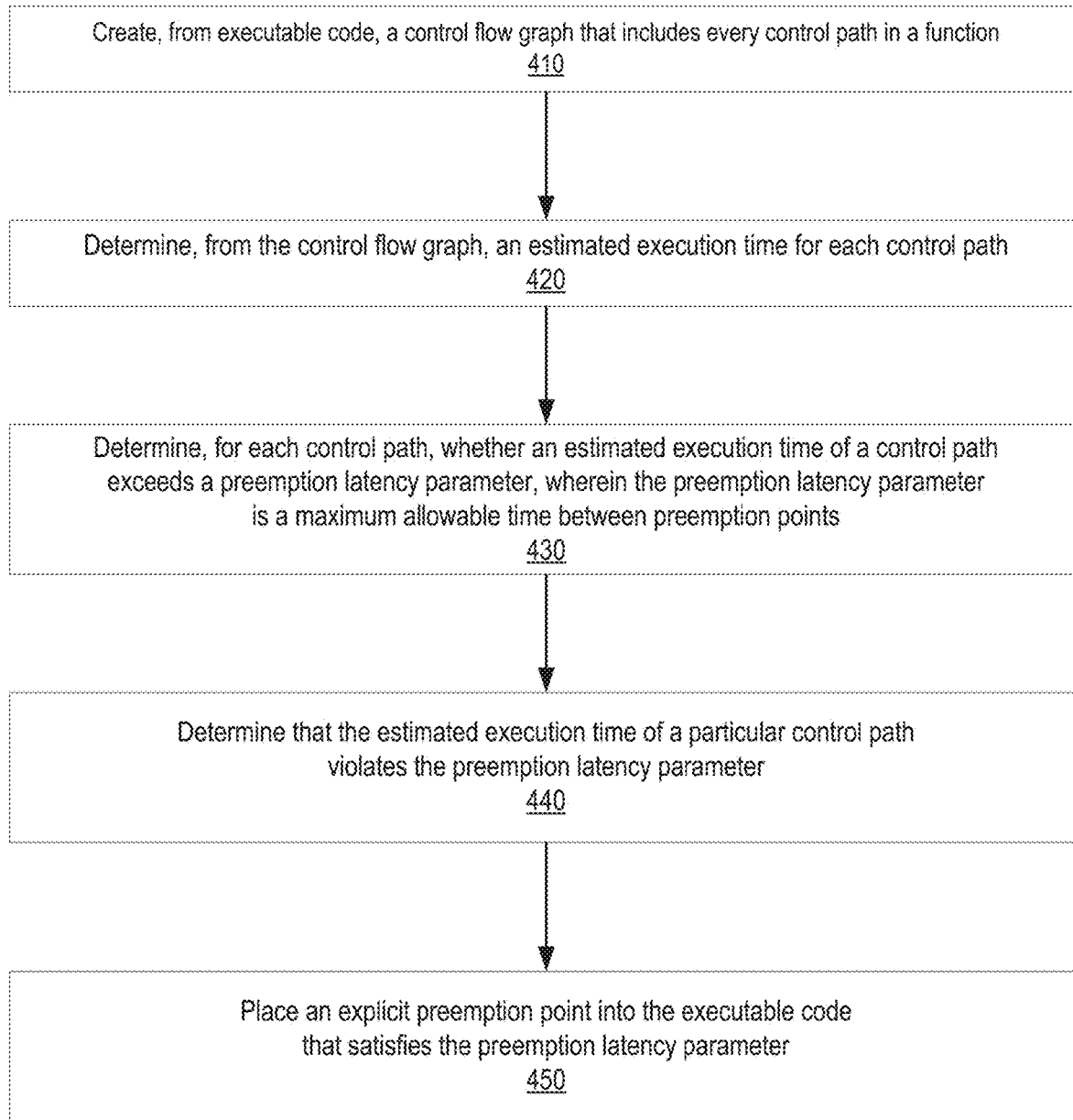
FIG. 4 is a flow chart illustrating a method in accordance with embodiments of the present invention.

For further explanation, FIG. 4 sets forth a flow chart illustrating a further exemplary method for placement of explicit preemption points into compiled code according to embodiments of the present invention that includes creating, from executable code, a control flow graph that includes every control path in a function 410, determining, from the control flow graph, an estimated execution time for each control path 420, determining, for each control path, whether an estimated execution time of a control path exceeds a preemption latency parameter, wherein the preemption latency parameter is a maximum allowable time between preemption points 430, determining that the estimated execution time of a particular control path violates the preemption latency parameter 440, and placing an explicit preemption point into the executable code that satisfies the preemption latency parameter 450.

In the example method depicted in FIG. 4, a control flow graph is created from executable code that represents every control path in a function 410. A function is divided into basic blocks, with each basic block having a cost field to represent the expected CPU time required to execute the block and a boolean preemption check field to indicate whether this block includes a preemption check. Further, a control flow graph is represented by lists of successors and predecessors associated with each basic block. Distinct basic blocks represent the method's prologue and epilogue.

In determining, from the control flow graph, an estimated execution time for each control path 420, the estimated execution time is based on expected-case instruction timings for every instruction along every control path, particularly for soft real-time programming. In determining, from the control flow graph, an estimated execution time for each control path 420, the estimated execution time is based on worst-case instruction timings for every instruction along every control path, particularly for hard real-time programming.

In determining, for each control path, whether an estimated execution time of a control path exceeds preemption latency parameter 450, wherein preemption latency parameter 450 is a maximum allowable time between preemption points 430, a method translation is assumed to maintain the following invariants: (i) the method checks and responds to a pending preemption request within alpha CPU time units of being invoked; (ii) upon return from a method, control automatically flows through a preemption yielding trampoline subroutine if a pending preemption request was delivered more than gamma prior to the moment control returns to the caller; and (iii) during its execution, the method implementation checks for preemption requests at least once every Psi CPU time units. The code that precedes a method invocation checks for preemption no more than Psi-alpha execution time units prior to the method invocation. The code that follows a method invocation checks for preemption no more than Psi-gamma execution time units following return from the method invocation. Though the invention can be configured to support a wide range of possible configuration options, one configuration according to embodiments of the present invention may implement the following values, represented in units of expected execution time: (a) Psi is 1 μs, and (b) While alpha and gamma are determined primarily as characteristics of the target architecture, typical values for both alpha and gamma are less than 50 ns. When a valid control path would exceed these values, it is determined that the estimated execution time of a particular control path violates the preemption latency parameter 440.

Figure 5:
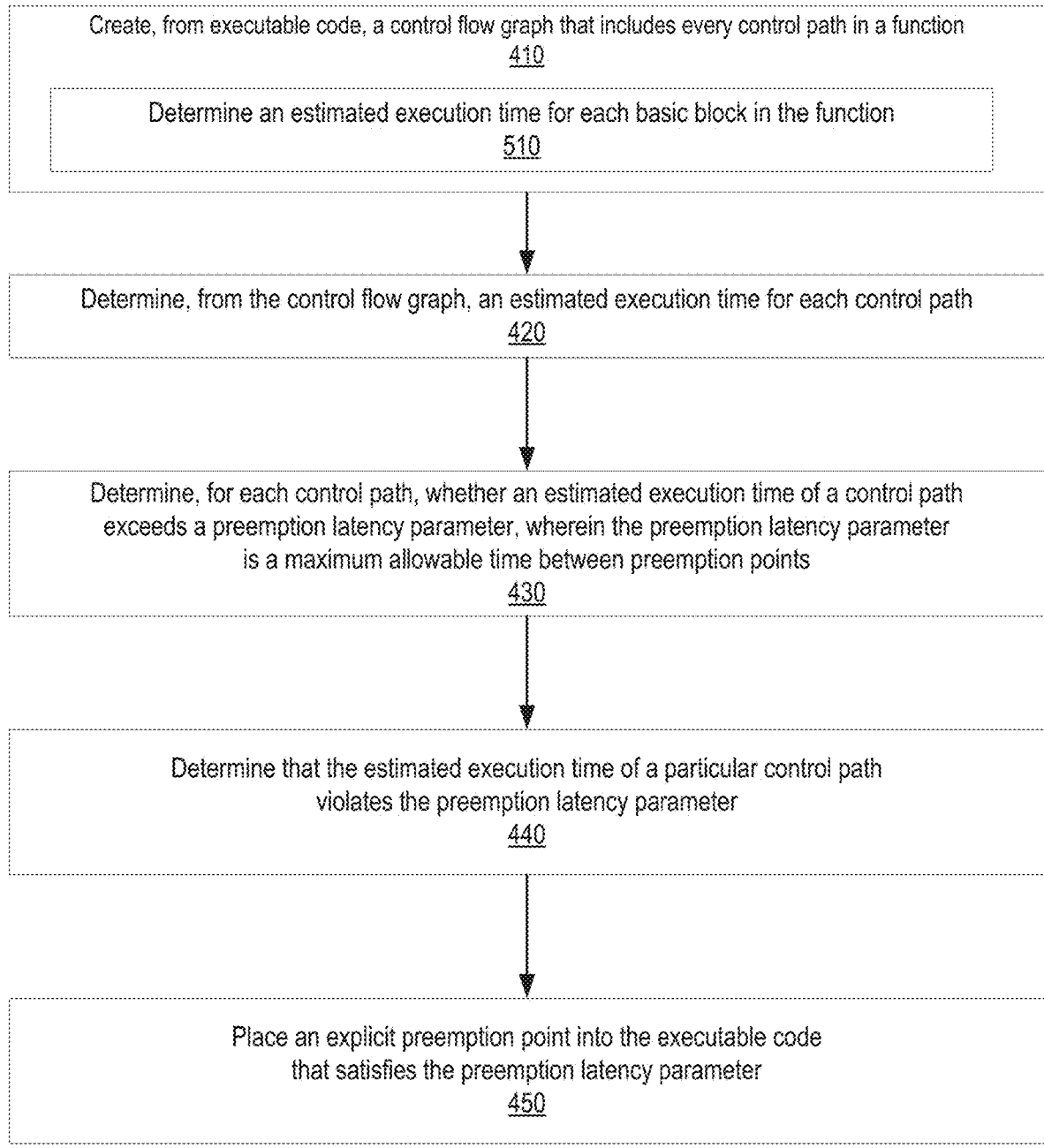
FIG. 5 is a flow chart illustrating a method in accordance with embodiments of the present invention.

For further explanation, FIG. 5 sets forth a flow chart illustrating a further exemplary method for placement of explicit preemption points into compiled code according to embodiments of the present invention. The example method depicted in FIG. 5 is similar to the example method depicted in FIG. 4, as the example method depicted in FIG. 5 also includes creating, from executable code, a control flow graph that includes every control path in a function 410, determining, from the control flow graph, an estimated execution time for each control path 420, determining, for each control path, whether an estimated execution time of a control path exceeds a preemption latency parameter, wherein the preemption latency parameter is a maximum allowable time between preemption points 430, determining that the estimated execution time of a particular control path violates the preemption latency parameter 440, and placing an explicit preemption point into the executable code that satisfies the preemption latency parameter 450.

In the example method depicted in FIG. 5, determining, from the control flow graph, an estimated execution time for each control path 410 includes determining an estimated execution time for each basic block in the function 510.

Figure 6:
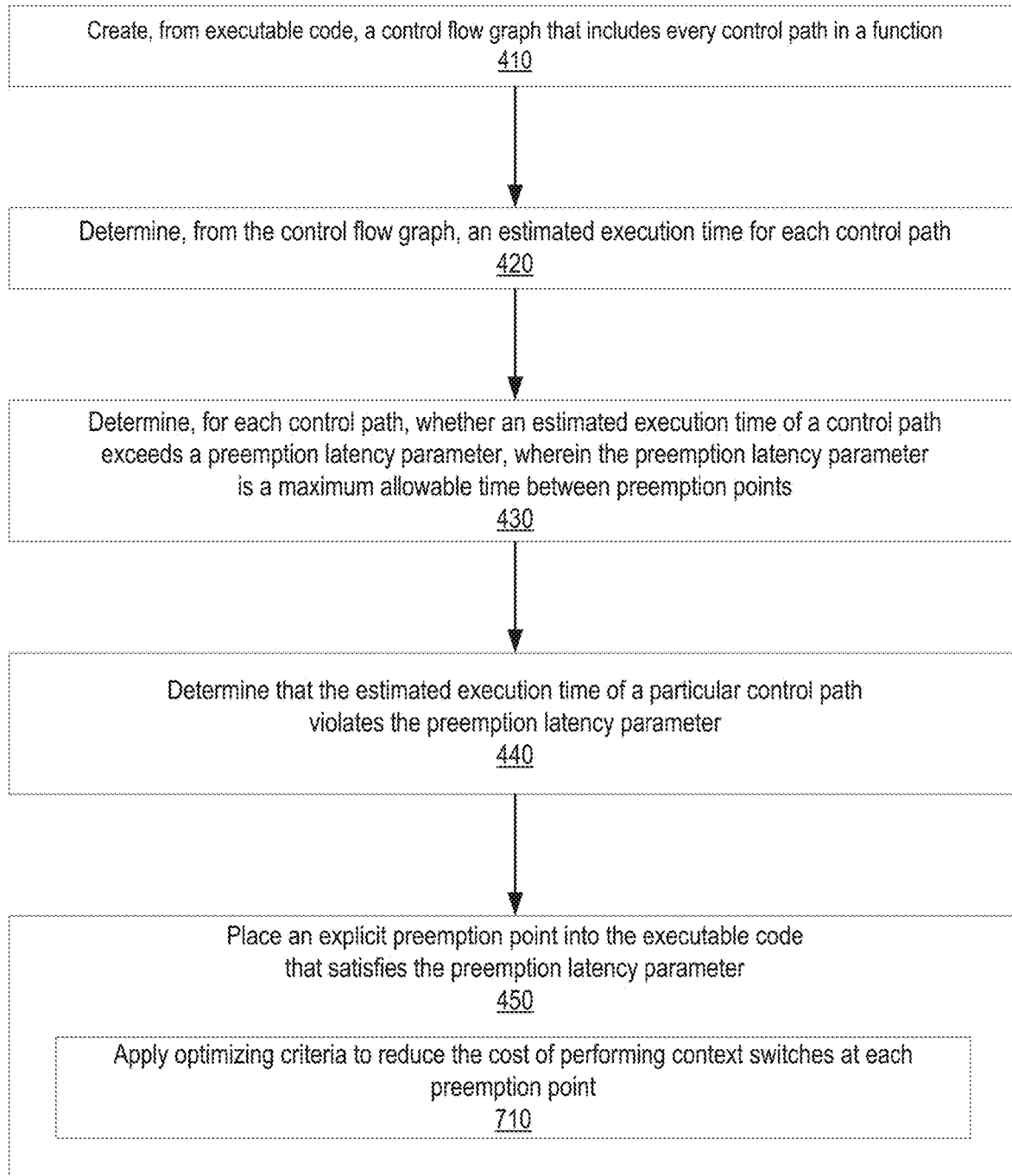
FIG. 6 is a flow chart illustrating a method in accordance with embodiments of the present invention.

For further explanation, FIG. 6 sets forth a flow chart illustrating a further exemplary method for placement of explicit preemption points into compiled code according to embodiments of the present invention. The example method depicted in FIG. 6 is similar to the example method depicted in FIG. 4, as the example method depicted in FIG. 6 also includes creating, from executable code, a control flow graph that includes every control path in a function 410, determining, from the control flow graph, an estimated execution time for each control path 420, determining, for each control path, whether an estimated execution time of a control path exceeds a preemption latency parameter, wherein the preemption latency parameter is a maximum allowable time between preemption points 430, determining that the estimated execution time of a particular control path violates the preemption latency parameter 440, and placing an explicit preemption point into the executable code that satisfies the preemption latency parameter 450.

In the example method depicted in FIG. 6, placing an explicit preemption point into the executable code that satisfies the preemption latency parameter 450 includes reducing the cost of performing context switches at each preemption point by applying optimizing criteria 710.

The placement of explicit preemption points may further be optimized by placing explicit preemption points at a function return to minimize the number of live registers. The placement of explicit preemption points may further be optimized by placing explicit preemption points to minimize the number of live pointer variables. Such optimizations are described in further detail with respect to the class and method implementation described below.

In an example embodiment according to the present invention, the translation of every method enforces the following three invariants. (i) The method checks and responds to a pending preemption request within alpha execution time of being invoked. The target-specific constant alpha represents the maximum amount of time required to save all non-volatile registers that are to be overwritten by this method onto the thread's stack. The instruction that reserves the activation frame for the newly called function, which is recognized as a preferred preemption point, must occur within alpha CPU time of the moment that control reaches the function's entry point. A typical value of alpha is less than 50 ns. In the case that a leaf method needs only to preserve a small number of non-volatile registers and does not instantiate an activation frame, the preferred preemption point that is designated by the function's blr return instruction typically occurs within alpha CPU time of entry into the function. (ii) The blr instruction that implements return from a function is recognized as a preferred preemption point. Thus, the preemption handler is automatically invoked if a preemption request is pending when the function returns. The target-specific constant gamma represents the maximum of the amount of time required to execute the blr instruction and the time required to resume execution of a thread following preemption of the thread. A typical value of gamma is less than 50 ns. (iii) During its execution, every method implementation checks for preemption requests at least once every Psi execution time units. Psi is a configuration specific constant representing a preferred upper bound on preemption latency. A typical value of Psi is 1 microsecond. Related to enforcement of this constraint, the translation of a method invocation also enforces the following constraints: (a) The code that precedes a method invocation checks for preemption no more than Psi-alpha execution time units prior to the method invocation. (b) The code that follows a method invocation checks for preemption no more than Psi-gamma execution time units following return from the invoked method.

Libraries of data types, classes, methods, and other programming language constructs are defined to implement embodiments of the present invention. By way of example and not limitation, the following description and references to the FIGS. 7-31 provide an example implementation of these libraries.

In an example embodiment according to the present invention, for any basic block beta, certain defined attributes and services are described below. Many of the descriptions below speak of offsets within the basic block. An offset represents the distance from the first instruction in the basic block, measured in bytes. Explicit preemption checks are assumed, in this context, to occupy no instruction memory. The code that implements preemption checks is inserted during a subsequent compilation pass. This convention simplifies the implementation as it avoids the need to recompute all offsets each time a new preemption check is inserted into a basic block. For any basic block beta, defined attributes and services are described by the following according to embodiments of the present invention.

For any basic block beta, beta.checksPreemption( ) is true if and only if basic block beta includes one or more implicit or explicit checks for preemption requests.

For any basic block beta, beta.invokesMethods( ) is true if and only if basic block beta includes one or more method invocations.

For any basic block beta, beta.explicitlyChecksPreemption( ) is true if and only if basic block beta includes one or more explicit checks for preemption requests.

For any basic block beta, beta.executionTime (offset) is the execution time of executing up to, but not including, the instruction at offset within the basic block. In the case that beta includes preemption checking code and offset is greater than beta.preemptionOffset (n), the execution time includes the costs of the first (n+1) preemption request checks, executing the code that for each case saves and restores registers and yields the CPU to a different thread. If beta does not include preemption checking code or offset is less than or equal to beta.preemptionOffset (0), the execution time does not include the cost of any preemption checks. beta.executionTime (−1) is defined to represent the execution time of the entire basic block, including any preemption check that is performed following the last instruction.

For any basic block beta, beta.oblivionAtStart( ) represents the execution time of the instructions within beta that precede the first preemption check within beta if beta.checksPreemption( ). Otherwise, beta.oblivionAtStart( ) is the same as beta.executionTime( ).

For any basic block beta, beta.oblivionAtEnd( ) represents the execution time of the instructions that follow the last check for preemption within beta if beta.checksPreemption( ). Otherwise, beta.oblivionAtEnd( ) is the same as beta.executionTime( ).

For any basic block beta, beta.oblivionDuring( ) is the maximum of beta.oblivionAtStart( ), beta.oblivionAtEnd( ), and the maximum execution time between any two consecutive (possibly implicit) checks within beta if beta.checksPreemption( ). Otherwise, beta.oblivionDuring( ) is the same as beta.executionTime( ).

For any basic block beta, beta.preemptions( ) represents the number of times preemption is implicitly or explicitly checked within basic block beta. Returns 0 if not beta.checksPreemption( ).

For any basic block beta, beta.preemptionOffset (n) represents the offset within the basic block at which the nth preemption check is performed. If the nth preemption check is explicit, the check occupies no width in the instructions associated with block beta. Otherwise, this is the offset of the instruction that invokes a method that will perform preemption checks during its prologue or epilogue code. The first preemption check is represented by n=0.

For any basic block beta, beta.preemptionIsExplicit (n) is true if and only if the $n^{th}$ preemption check is explicit. A false value means the $n^{th}$ preemption check is implicit, as represented by a method invocation. The first preemption check is represented by n=0.

For any basic block beta, beta.oblivionThatFollows (n) is the maximum amount of oblivion, represented as execution time, that follows the nth preemption check within block beta, not including oblivion that might occur in the successors of block beta. The first preemption check is represented by n=0. If n is the last preemption check within beta, this is the same as beta.oblivionAtEnd( ). Otherwise, this is the maximum oblivion that may occur between the $n^{th}$ preemption check and the $(n+1)^{th}$ preemption check. In computing the maximum oblivion, this considers all possible scenarios, including the case that (a) the $n^{th}$ preemption check may be either implicit or explicit, (b) the $(n+1)^{th}$ preemption check may be either implicit or explicit, and (c) the $n^{th}$ preemption check may have either yielded or not yielded to a pending preemption request.

For any basic block beta, beta.instructions( ) represents the number of instructions contained within beta, excluding any instructions used to implement explicit preemption checks.

For any basic block beta, beta.instructionAt (offset) represents the number of the instruction found at offset within beta, excluding any instructions used to implement explicit preemption checks. The value of the offset argument is represented in bytes, with zero representing the first instruction in the basic block. The number of the first instruction in the basic block is zero. This function is required because instructions are assumed to have variable width.

For any basic block beta, beta.instructionOffset (n) represents the offset within beta at which instruction n begins. If a preemption check immediately precedes instruction n, this returns the offset of the code that follows the preemption check. The first instruction is represented by n=0. If n equals beta.instructions( ), this represents the offset following the last instruction contained within beta.

For any basic block beta, beta.registerPressureAt (offset) represents the number of equivalent general purpose registers holding live data at the specified offset within basic block beta. Each vector or other special purpose register that holds live data counts as the number of general purpose registers that are required to hold the equivalent amount of data. The value of the offset argument is represented in bytes, with zero representing the first instruction in the basic block.

For any basic block beta, beta.pointerRegisterPressureAt (offset) represents the number of registers holding live pointer data at the specified offset within basic block beta. Each vector or other special purpose register that holds live data counts as the number of general purpose registers that are required to hold the equivalent amount of data. The value of the offset argument is represented in bytes, with zero representing the first instruction in the basic block.

For any basic block beta, beta.insertPreemptionAt (offset) has the effect of causing an explicit preemption check to be performed immediately before the instruction at the specified offset within beta, or at the end of block beta if offset represents the instruction memory following the last instruction of beta. It is an error to invoke this service with an offset that does not represent the beginning or end of an instruction within beta. In the case that beta ends with a conditional or unconditional branch, a preemption check should not follow the last instruction in beta as a preemption check at this location will not be seen along all successor paths.

In an example embodiment according to the present invention, let omega=zeta.Paths (A, B) represent the set of all possible non-iterative paths from the start of basic block A to the end of basic block B within control flow graph zeta. The set zeta.Paths (A, A) comprises the single element representing a control flow through basic block A. Let rho represent a single non-iterative path in omega as represented by the sequence of basic blocks $beta_0 beta_1 \ldots beta_{n-1}$. Let delta represent a subpath within rho. For the example embodiment, define the following properties:

(i) A prefix subpath of rho is understood to start with the first basic block of rho. A suffix subpath is understood to end with the last basic block of rho.

(ii) rho.checksPreemption( ) is true if and only if at least one basic block on path rho checks for preemption. delta.checksPreemption( ) is true if and only if subpath delta includes at least one basic block that checks for preemption requests. omega.checksPreemption( ) is true if and only if rho.checksPreemption( ) is true for every path rho in omega.

(iii) rho.executionTime( ) is the sum of beta.executionTime( ) for each basic block beta on path rho.delta.executionTime( ) is the sum of beta.executionTime( ) for each basic block beta on subpath delta.omega.executionTime( ) is the maximum rho.executionTime( ) over all rho in omega.

(iv) rho.oblivionAtStart( ) represents the maximum amount of execution time that a thread executing along a prefix path delta of rho ignores preemption requests. If not rho.checksPreemption( ), this equals rho.executionTime( ). Otherwise, this equals delta.executionTime( ) plus lambda.oblivionAtStart( ), where delta is the longest prefix of rho for which delta.checksPreemption( ) is false, and lambda is the basic block that immediately follows delta in rho.omega.oblivionAtStart( ) is the maximum of rho.oblivionAtStart( ) over all rho in omega.

(v) For a given prefix $delta_{theta}$ of $rho_i$, where $delta_{theta}$ is represented by basic blocks $beta_0 beta_1 \ldots beta_{theta}$, $delta_{theta}$.oblivionAtStartOngoing( ) represents $delta_{theta}$.executionTime( ) if not $delta_{theta}$.checksPreemption( ). Otherwise, $delta_{theta}$.oblivionAtStartOngoing( ) equals ET.zero.

Conceptually, delta.oblivionAtStartOngoing( ) represents the amount of oblivion that starts at the beginning of delta and is still ongoing at the end of delta. Note that multiple $rho_i$ in omega may pass through the same basic block $beta_{theta}$. For any $rho_i$ in omega that passes through $beta_{theta}$, there is only one prefix $delta_{theta}$ that ends with block $beta_{theta}$ since the set omega is assumed to contain only acyclic control flows. Let $omega_{theta}$ be the subset of omega that includes every path $rho_i$ in omega that passes through basic block $beta_{theta}$. Define $omega_{theta}$.oblivionAtStartOngoing( ) to be the maximum value of $delta_{theta}$.oblivionAtStartOngoing( ) over all $delta_{theta}$ of $rho_i$ in $omega_{theta}$.

(vi) rho.oblivionDuring( ) represents the maximum execution time during which preemption requests might be ignored during execution along path rho. Assume rho is represented by the sequence of basic blocks $beta_0 beta_1 \ldots beta_{n-1}$. For integer values i, j, and k greater than or equal to zero and less than n, define $OblivionBetween_{ik}$ as follows: $OblivionBetween_{ii}$ is the maximum of $beta_i$.oblivionAtStart( ), $beta_i$.oblivionDuring( ), and $beta_i$.oblivionAtEnd( ).

$OblivionBetween_{ik}$ if k=i+1, is $beta_i$.oblivionAtEnd( )+$beta_k$.oblivionAtStart( ).

$OblivionBetween_{ik}$ if k>i+1 and $beta_j$.checksPreemption( ) is false for every j such that i<j and j<k, is $beta_i$.oblivionAtEnd( )+$beta_k$.oblivionAtStart( )+the sum of $beta_j$.executionTime( ) for all j such that i<j and j<k.

$OblivionBetween_{ik}$ is zero in all other cases.

(vii) rho.oblivionDuring( ) is defined to equal the maximum of rho.oblivionAtStart( ), rho.oblivionAtEnd( ), and $OblivionBetween_{ik}$ for all integer values of i and k with $0 \leq i \leq k < n$. omega.oblivionDuring( ) is the maximum of rho.oblivionDuring( ) for every rho in omega.

(viii) rho.oblivionAtEnd( ) represents the maximum amount of execution time that a thread executing along a suffix of path rho ending at its last basic block ignores preemption requests. If not rho.checksPreemption( ), this equals rho.executionTime( ). Otherwise, this equals delta.executionTime( ) plus lambda.oblivionAtEnd( ), where delta is the longest suffix of rho for which delta.checksPreemption( ) is false, and lambda is the block that immediately precedes delta in rho.omega.oblivionAtEnd( ) is the maximum of rho.oblivionAtEnd( ) over all rho in omega.

Class Block:

In an example embodiment according to the present invention, a BasicBlock object has methods to represent each of the properties and services described above with regard to the example basic block beta. Additionally, the BasicBlock class implements the following services:

(i) int numPredecessors( ): The number of predecessors of this BasicBlock.

(ii) int numSuccessors( ): The number of successors of this BasicBlock.

(iii) BasicBlock predecessor (int n): Return the $n^{th}$ predecessor of this BasicBlock.

(iv) BasicBlock successor (int n): Return the $n^{th}$ successor of this BasicBlock.

Class ET:

In an example embodiment according to the present invention, a class ET is a final concrete class providing an abstraction that represents constant (immutable) execution time values. This quantity is represented as an abstract data type in order to facilitate maintenance and evolution of the implementation in response to anticipated evolution of execution time measurement and enforcement capabilities. The following static fields are supported:

(i) static final ET Undefined: This final field references an ET object representing an undefined amount of execution time. The result of boolean tests on an undefined value is always false. The result of arithmetic operations on an undefined value is an undefined value.

(ii) static final ET Zero: This final field references an ET object representing zero execution time.

(iii) static final ET Infinity: this final field references an ET object that represents an infinite amount of execution time. Infinity is greater than any finite value. Magnitude comparisons between Infinity and Infinity return false. Infinity plus or minus any finite value equals Infinity. Infinity plus Infinity equals Infinity. The result of subtracting Infinity from Infinity and of adding Infinity and NegativeInfinity is Undefined.

(iv) static final ET NegativeInfinity: this final field references an ET object that represents an infinite amount of execution time. NegativeInfinity is less than any finite value. Magnitude comparisons between NegativeInfinity and NegativeInfinity return false. NegativeInfinity plus or minus any finite value equals NegativeInfinity. NegativeInfinity plus NegativeInfinity equals NegativeInfinity. The result of subtracting NegativeInfinity from NegativeInfinity and of adding Infinity and NegativeInfinity is Undefined.

In an example embodiment according to the present invention, services implemented by the ET class are described:

ET (long nanoseconds): Instantiate an ET object which represents the amount of CPU time consumed by running this thread continuously for the specified number of nanoseconds.

final boolean gt (ET other): Returns true if and only if this ET object has magnitude greater than the magnitude of "other" ET object. Returns false if not this.isDefined( ) or not other.isDefined( ), or if this ET object has a magnitude less than or equal to the magnitude of other.

final boolean ge (ET other): Returns true if and only if this ET object has magnitude greater than or equal to the magnitude of "other" ET object. Returns false if not this.isDefined( ) or not other.isDefined( ), or if this ET object has a magnitude less than the magnitude of other.

final boolean lt (ET other): Returns true if and only if this ET object has magnitude less than the magnitude of "other" ET object. Returns false if not this.isDefined( ) or not other.isDefined( ), or if this ET object has a magnitude greater than or equal to the magnitude of other.

final boolean le (ET other): Returns true if and only if this ET object has magnitude less than or equal to the magnitude of "other" ET object. Returns false if not this.isDefined( ) or not other.isDefined( ), or if this ET object has a magnitude greater than the magnitude of other.

final boolean eq (ET other): Returns true if and only if this ET object has magnitude equal to the magnitude of "other" ET object. Returns false if not this.isDefined( ) or not other.isDefined( ), or if this ET object has a magnitude not equal to the magnitude of other.

final ET sum (ET other): Returns a new ET object to represent the sum of this and other. Returns ET.Undefined if not this.isDefined( ) or not other.isDefined( ) or if not this.isFinite( ) and not other.isFinite( ) and other not equal to this.

final ET difference (ET other): Returns a new ET object to represent the difference of this and other. Returns ET.Undefined if not this.isDefined( ) or not other.isDefined( ) or if not this.isFinite( ) and not other.isFinite( ) and other equals this.

final ET product (int multiplier): Returns a new ET object to represent the product of this and multiplier. Returns ET.Undefined if not this.isDefined( ).

final boolean isDefined( ): Returns true if and only if this ET object has a defined value (i.e., not equal to ET.Undefined).

final boolean isFinite( ): Returns true if and only if this ET object has a finite value (ie. not equal to ET.Undefined, ET.Infinity, or ET.NegativeInfinity).

Class ETC:

In an example embodiment according to the present invention, the class ETC is a concrete class that is an execution time container. The services implemented by the ETC class include: (i) ETC (ET value): Instantiates an ET object which represents the same amount of ET as its value argument. (ii) ET set (ET value): Overwrites the value held in this container, returning the previous value of the container( ). (iii) ET get( ): Returns the current value held in this container.

Class CodePath:

In an example embodiment according to the present invention, the class CodePath is an abstract class representing a set of non-iterative flows through an associated control-flow graph. Concrete subclasses of CodePath include CatenationPath, AlternationPath, and IterationPath.

Each basic block is associated with a single CatenationPath object.

Multiple CodePath objects are linked together by predecessor relationships into a CodePath data structure which is a representation of a control flow graph. The Traversal class, described below, represents a subgraph of the full control-flow graph that is represented by the CodePath data structure. The Traversal constructor takes two CodePath arguments, the first identified as start_sentinel and the second as end. The instantiated Traversal object represents the set of all non-iterative paths through the associated control-flow graph that begin at a CodePath that is a successor of the start_sentinel object and end at the specified end node. The subgraph represented by an instantiated Traversal object is known as a traversal. By convention, each traversal has a single entry point and a single exit point. Traversals of this form are sufficient to cover any reducible control flow graph. Control flow graphs that are not reducible are converted into reducible graphs by performing node splitting before beginning the analysis and code transformations described herein. Within the context of a particular traversal, each CodePath instance represents the set of all non-iterative control flows from the entry node of the traversal to the specified end node.

Inasmuch as each CodePath instance that is associated with a particular Traversal object represents a set of control flows, each CodePath object implements all of the services described above with regard to basic block beta and pertaining to the associated set of control flows. For IterationPath instances, these services have special significance: (i) executionTime( ) denotes the time to execute the control path that starts at the traversal's entry point and flows to the IterationPath instance without iterating through the loop body. (ii) checksPreemption( ) denotes whether the control path from the traversal's entry point to the IterationPath instance without iteration through the loop body has a preemption check. (iii) oblivionAtStart( ) denotes the oblivion at the start of the control path from the traversal's entry point to the IterationPath instance without iteration through the loop body. (iv) oblivionAtEnd( ), unlike the attributes described above, accounts for the behavior of the loop body. The service oblivionAtEnd( ) is the maximum of the oblivion at the end of the control path from the traversal's entry point to the IterationPath instance without iteration through the loop body and oblivion at the end of the loop body. Every loop body checks for preemption at least once. (v) oblivionDuring( ) is computed in the traditional way for the control path from the traversal's entry point to the IterationPath instance without iteration through the loop body. However, if the IterationPath instance's oblivionAtEnd( ) attribute is greater than the oblivionDuring( ) attribute computed in this way, then oblivionDuring( ) is the same as oblivionAtEnd( ). This corresponds to the case that the loop body has a large value of oblivionAtEnd( ).

Instantiating a Traversal object that spans a subset of a full control-flow graph is the first step in calculating certain attributes associated with the individual CodePath instances that comprise the subgraph. Calculation of these attribute values is required in order to determine where to insert preferred preemption points. The calculation of attributes is performed by the computeAttributes( ) method of the Traversal class. Each of the CodePath objects that is associated with an instantiated Traversal object provides the following instance fields to facilitate the computation of attributes and the insertion of preemption points.

private int expected_visits: This private integer field represents the number of expected backwards-directed visits by successors of this node in the most current traversal.

private int visits: This private integer field represents the number of backwards-directed visits by successors of this node that have been realized in the most current traversal.

private int forward_visits: This private integer field represents the number of forward-directed visits by predecessors of this node that have been realized in the most current traversal. The expected number of forward visits is the same as the number of predecessors.

private ET max_oblivion_at_end: This private field represents the most restrictive of the max_oblivion_at_end constraints imposed on this CodePath instance by backwards traversals through this CodePath instance.

private ET max_tolerance_at_end: This private field represents the tolerance associated with the most restrictive of the max_oblivion_at_end constraints imposed by backwards traversals through this CodePath instance.

private CodePath [ ] traversal_successors: This private array field represents the successor CodePath objects in the most current traversal.

private Traversal traversal: This private field represents the Traversal object that is currently involved in analyzing this CodePath object. This association is overwritten each time a new Traversal object affecting this CodePath object is instantiated.

In an example embodiment according to the present invention, the CodePath class implements the following non-private services:

BasicBlock associatedBlock( ): Obtains a reference to the BasicBlock object that is directly associated with this CodePath instance. In the case that this is an AlternationPath or IterationPath, there is no directly associated BasicBlock so this method returns null.

final int predecessorCount( ): Returns how many predecessors this CodePath object has. CatenationPath and IterationPath instances have only a single predecessor. An AlternationPath object may have an arbitrarily large number of predecessors.

final CodePath predecessor (int n): Obtains a reference to the $n^{th}$ predecessor of this CodePath object, where the first predecessor is represented by n=0.

final int loopNestingLevel( ): Returns the number of levels of nested loops that enclose this CodePath object. A value of zero denotes that this CodePath object is not contained within any loop. A newly instantiated CodePath object has nesting level 0.

final void incrementLoopNestingLevel( ): Adds 1 to the count of nesting levels associated with this CodePath object.

final ET localExecutionTime( ): The amount of execution time to execute the directly associated basic block if there is one, including the time required to execute any explicit preemption checks that have been inserted into this basic block. If there is no directly associated basic block, the value is ET.Zero.

void accommodateTraversalPassOne (Traversal traversal): FIG. 10 shows exemplary pseudocode for implementing the accommodateTraversalPassOne function according to embodiments of the present invention. This method is invoked as part of setting up a new traversal through this CodePath object.

CodePath accommodateTraversalPassTwo (CodePath successor): FIG. 11 shows exemplary pseudocode for implementing the accommodateTraversalPassTwo function according to embodiments of the present invention. This method is invoked as part of setting up a new traversal through this CodePath object.

void computeAttributes( ): FIG. 12 shows exemplary pseudocode for implementing the computeAttributes function according to embodiments of the present invention. This method starts a depth-first traversal from the traversal entry and descending toward the traversal end. As individual CodePath nodes are visited, their associated attributes are computed. A Traversal object's computeAttributes method invokes entry.computeAttributes( ) to begin the process of computing the attributes for the CodePath data structure representing a particular traversal.

private void continueComputingAttributes( ): FIG. 13 shows exemplary pseudocode for implementing the continueComputingAttributes function according to embodiments of the present invention. This method continues the depth-first traversal that is initiated by the computeAttributes( ) method.

void adjustAttributes( ): FIG. 14 shows exemplary pseudocode for implementing the adjustAttributes function according to embodiments of the present invention. Having previously computed all of the attributes for a particular traversal, this method recomputes the attributes that might be affected by insertion of a new preemption check into this CodePath node.

private void continueAdjustingAttributes( ): FIG. 15 shows exemplary pseudocode for implementing the continueAdjustingAttributes function according to embodiments of the present invention. Having previously computed all of the attributes for a particular traversal, this method continues recomputation of the attributes that might be affected by insertion of a new preemption check into one of its ancestor nodes.

abstract boolean initializeAttributesForwardFlow( ): Given that this CodePath instance equals this.traversal.getEntry( ) and there are therefore no traversal predecessors of this CodePath node, compute the forward flowing attributes for this node. Forward flowing attributes include checksPreemption( ), executionTime( ), oblivionAtStart( ), oblivionAtStartOngoing, oblivionDuring( ), and oblivionAtEnd( ). Returns true if and only if this invocation has caused this node's attributes to change. As this is an abstract method, each of the AlternationPath, CatenationPath, and IterationPath subclasses provide overriding implementations.

Figure 32:
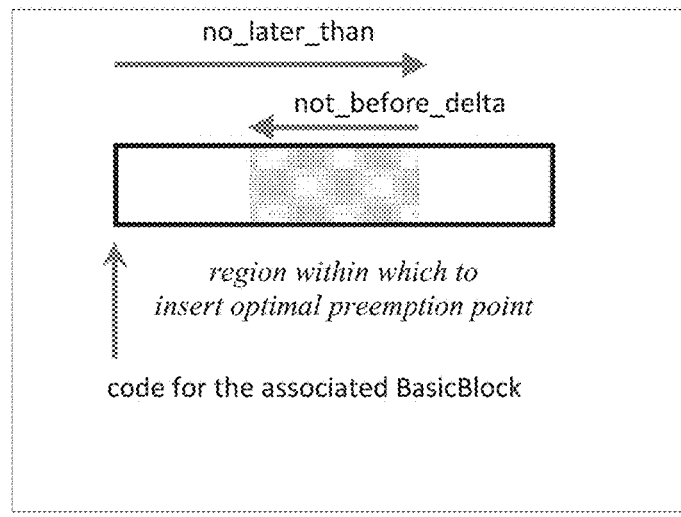
FIG. 32 is a diagram illustrating an optimal preemption point insertion in accordance with embodiments of the present invention.
Figure 33:
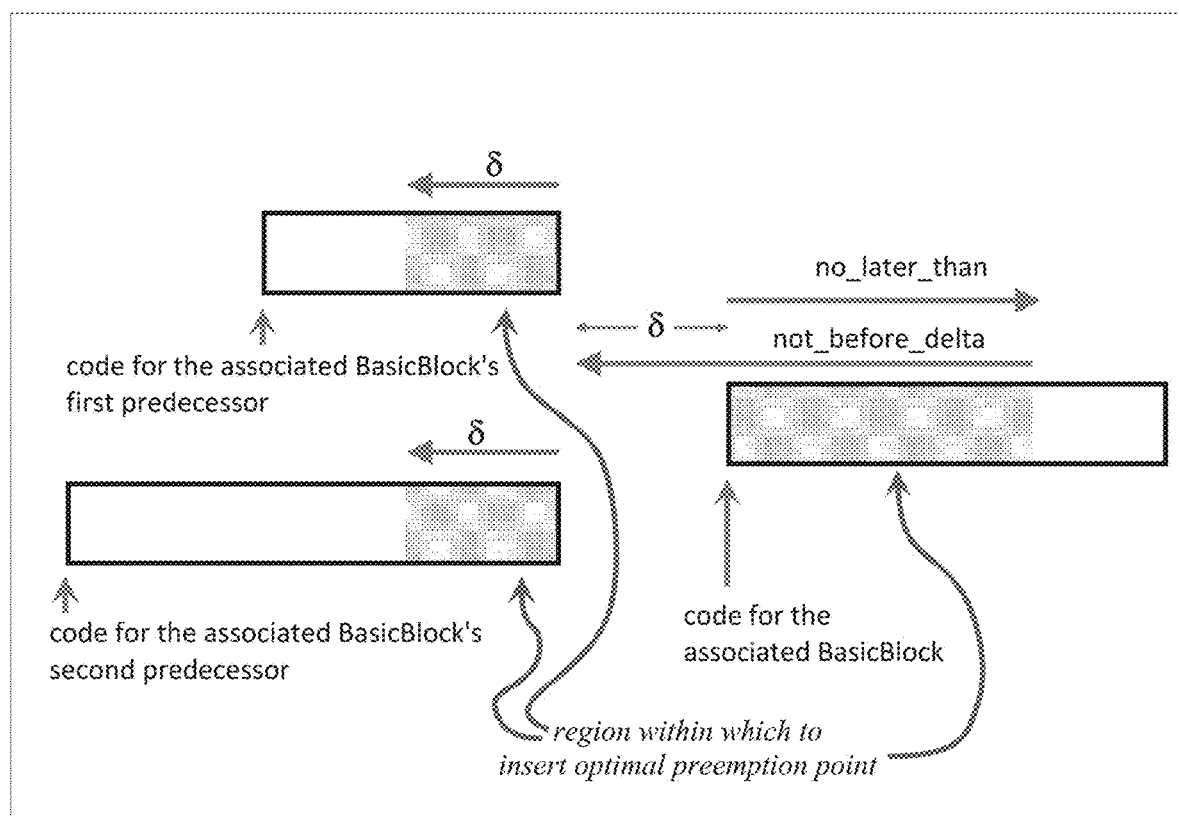
FIG. 33 is a diagram illustrating an optimal preemption point insertion in accordance with embodiments of the present invention.

FIG. 16 shows exemplary pseudocode for an overriding implementation of the initializeAttributesForwardFlow function for the AlternationPath subclass according to embodiments of the present invention. FIG. 17 shows exemplary pseudocode for an overriding implementation of the initializeAttributesForwardFlow function for the CatenationPath subclass according to embodiments of the present invention. FIG. 18 shows exemplary pseudocode for an overriding implementation of initializeAttributesForwardFlow function for the IterationPath subclass according to embodiments of the present invention.

abstract boolean computeAttributesForwardFlow( ): Given that the forward flowing information has already been computed for all traversal predecessors of this CodePath node, compute the forward flowing attributes for this node. Returns true if and only if this invocation has caused this node's attributes to change. An exemplary pseudocode for implementation of the computeAttributesForwardFlow function of the CodePath class according to embodiments of the present invention is:

abstract boolean computeAttributesForwardFlow( );
As this is an abstract method, each of AlternationPath, CatenationPath, and IterationPath subclasses provide overriding implementations, described below.

boolean isIterationPath( ): This method returns true if and only if this object is an instance of IterationPath.

void markLoop (IterationPath header, int expect_level): This method implements a depth-first backwards-flowing traversal starting from the loop body of its header argument. Recursion stops upon encountering the header node. This method increments the loop count for nodes whose current loop count equals the value of its expect_level argument. Nodes with a different expected level are either contained within an inner-nested loop or have been visited redundantly by this loop body traversal. FIG. 22 shows exemplary pseudocode for implementing the markLoop function according to embodiments of the present invention.

void insertPreemptionChecks (boolean enforce_preemption, ET max_oblivion_at_start, ET at_start_tolerance, ET max_oblivion_during, ET during_tolerance, ET max_oblivion_at_end, ET at_end_tolerance): This method implements a depth-first traversal for the purpose of inserting preemption checks to enforce the constraints described by the method's arguments: (a) if enforce_preemption is true, this assures that every path from traversal.getEntry( ) to the end of this node has a preemption check; (b) assures that this.oblivion_at_start is less than or equal to max_oblivion_at_start along every path from traversal.getEntry( ) to the end of this node; (c) if it is necessary to insert a preemption check to enforce the max_oblivion_at_start constraint along any control flow from traversal.getEntry( ) to this node, insert the preemption check following max_oblivion_at_start.difference (at_start_tolerance) of execution time along that control flow (i.e., insert the preemption check within at_start_tolerance of the end of the oblivious control flow of max_oblivion_at_start duration that ends with a following preemption check); (d) assures that this.oblivion_during is less than or equal to max_oblivion_during along every path from traversal.getEntry( ) to the end of this node; (e) if it is necessary to insert a preemption check to enforce the max_oblivion_during constraint along any control flow from traversal.getEntry( ) to this node, inserts the preemption check no less than max_oblivion_during.difference (during_tolerance) of execution time before any following preemption check along that control flow (i.e. insert the preemption check within during_tolerance of the start of the oblivious control flow of max_oblivion_during duration that ends with a following preemption check); (f) assures that this.oblivion_at_end is less than or equal to max_oblivion_at_end along every path from traversal.getEntry( ) to the end of this node; and (g) if it is necessary to insert a preemption check to enforce the max_oblivion_at_end constraint along any control flow from traversal.getEntry( ) to this node, inserts the preemption check no less than max_oblivion_at_end.difference (at_end_tolerance) of execution time from the end of this CodePath instance (i.e. insert the preemption check within at_end_tolerance of the start of the oblivious suffix control-flow of max_oblivion_at_end duration). Whenever a preemption check is inserted, all affected attributes are recomputed. FIG. 9 shows exemplary pseudocode for implementing the insertPreemptionChecks function according to embodiments of the present invention.

private ET calcPredMaxOblivionAtEnd (ET my_max_oblivion_at_end, ET my_max_oblivion_during, ETC at_end_tolerance_container, ET during_tolerance): This method calculates and returns the value of the max_oblivion_at_end argument to be passed to recursive invocations of insertPreemptionChecks for the predecessors of this CodePath node. If necessary, overwrites the value of the at_end_tolerance argument which will also be passed to the recursive invocations of insertPreemptionChecks. FIG. 23 shows exemplary pseudocode for implementing the calcPredMaxOblivionAtEnd function according to embodiments of the present invention.

private boolean insertLocalPreemptionCheckBackward (boolean enforce_preemption, ET max_oblivion_during, ET during_tolerance, ET this.max_oblivion_at_end, ET at_end_ tolerance): Insert one preemption check into the directly associated BasicBlock or into some predecessor of this BasicBlock if necessary in order to enforce the constraints specified by the arguments. The tolerance arguments specify the range within which the preemption checks should be inserted. Return true if a preemption check is inserted as this may require certain attributes associated with the CodePath data structure to be recomputed before it can be determined whether additional preemption checks need to be inserted. Otherwise, return false. FIG. 24 shows exemplary pseudocode for implementing the insertLocalPreemptionCheckBackward function according to embodiments of the present invention.

private void insertOptimalPreemptionBackward (ET no_later_than, ET not_before_delta): Insert a preemption point at an optimal control point before the first instruction within this CodePath object's associated BasicBlock that begins to execute following no_later_than execution time of the start of the basic block and after the last instruction that begins to execute at time not_before_delta prior to the no_later_than time. If not_before_delta equals ET.infinity, this method places preemption checks at "optimal" locations to assure that every control flow from this CodePath object to the associated traversal's end_sentinel has a preemption check. The range of allowed preemption points is illustrated in FIGS. 32 and 33. In FIG. 32, not_before_delta is less than no_later_than, so the allowed region for insertion of preemption points is contained entirely within the associated BasicBlock. In FIG. 33, not_before_delta is greater than no_later_than by delta, so the allowed region for insertion of preemption points includes both the associated BasicBlock and its predecessors. Assume that a third predecessor of the associated BasicBlock, not shown in FIG. 33, has execution time that is shorter than delta. Suppose this predecessor equals this.traversal.getEntry( ). Thus, the longest control flow prefix through this third predecessor is less than delta. Since insertOptimalPreemptionBackward has the role of enforcing max_oblivion_at_end and max_oblivion_during constraints, any prefix control flow that has less execution time than delta does not require insertion of preemption checks. Since the execution is less than delta, the oblivion associated with that path is also less than delta. In the case that this method decides to place the preemption point into a predecessor block, it inserts preemption points into each of the predecessors. The determination of which preemption point(s) within the region is (are) optimal is based on liveness of registers. Given multiple potential preemption points at the same loop nesting level, the best offset at which to preempt control is the offset at which registerPressure At( ) is minimal. If two candidate preemption points reside at different loop nesting levels, the preemption point that resides in a more deeply nested loop is considered less desirable by a factor of LOOP_SCALE_FACTOR. This symbolic constant typically holds a value of 10. FIGS. 25 and 26 show exemplary pseudocode for implementing the insertOptimalPreemptionBackward function according to embodiments of the present invention.

private boolean insertLocalPreemptionCheckForward (ET max_oblivion_at_start, ET at_start_tolerance): Insert one preemption check into the directly associated BasicBlock or into some successor of this BasicBlock if necessary, in order to enforce the constraints specified by the arguments. The start_tolerance argument specifies the range within which the preemption check should be inserted. Return true if a preemption check is inserted as this may require certain attributes associated with the CodePath data structure to be recomputed before it can be determined whether additional preemption checks need to be inserted. Otherwise, return false. FIG. 27 shows exemplary pseudocode for implementing the insertLocalPreemptionCheckForward function according to embodiments of the present invention.

private void insertOptimalPreemptionForward (ET no_sooner_than, ET not_after_delta): Insert a preemption point at an optimal control point after the first instruction within this CodePath object's associated BasicBlock that begins to execute following no_sooner_than execution time of the start of the basic block and before the last instruction that begins to execute at time not_before_delta following the no_sooner_than time. In the case that this method decides to place the preemption point into a successor block, it inserts preemption points into each of the successors that requires it. The determination of which preemption point(s) within the region is (are) optimal is based on liveness of registers. Given multiple potential preemption points at the same loop nesting level, the best offset at which to preempt control is the offset at which registerPressureAt( ) is minimal. If two candidate preemption points reside at different loop nesting levels, the preemption point that resides in a more deeply nested loop is considered less desirable by a factor of LOOP_SCALE_FACTOR. This symbolic constant typically holds a value of 10. Since insertOptimalPreemptionForward has the role of enforcing max_oblivion_at_start constraints, any suffix control flow that has less execution time than delta does not require insertion of preemption checks. When the suffix execution time is less than delta, the oblivion associated with the suffix path is also less than delta. FIGS. 28A and 28B show exemplary pseudocode for implementing the insertOptimalPreemptionForward function according to embodiments of the present invention.

private int bestBackwardRegisterPressure (ET range): Determine the best register pressure available prior to the end of the code directly associated with this CodePath object, and within the specified range. The range may span code that belongs to predecessor CodePath objects. If range equals ET.Infinity, determine the best pointer register pressure available in the backwards traversal that ends with this.traversal( ).getEntry( ). If there are no instructions within range, return the symbolic constant TooManyRegisters, an integer value known to be larger than the number of registers supported by the target architecture. If a preemption check is already present within range, return a cost of zero to indicate that there is no incremental cost associated with using the preemption check that is already present. FIG. 29 shows exemplary pseudocode for implementing the bestBackwardRegisterPressure function according to embodiments of the present invention.

private int bestForwardRegisterPressure (ET range): Determine the best register pressure available following the start of the code directly associated with this CodePath object, and within the specified range. The range may span code that belongs to successor CodePath objects. If the range is longer than the execution time of this CodePath object and the longest transitive closure of its traversal successors, return 0. This indicates that there is no cost associated with insertion of preemption checks into this suffix control flow because a control flow with shorter execution time than the intended max_oblivion_at_start constraint does not require a preemption check. If a preemption check is already present, return a cost of zero to indicate that there is no incremental cost associated with using the preemption check that is already present. If there are no instructions within range, return the symbolic constant TooManyRegisters, an integer value known to be larger than the number of registers supported by the target architecture FIG. 30 shows exemplary pseudocode for implementing the bestForwardRegisterPressure function according to embodiments of the present invention.

Class AlternationPath:

In an example embodiment according to the present invention, the class AlternationPath is a concrete subclass of CodePath. An AlternationPath represents the convergence of one or more control flows following a divergence of control flows that results from conditional branching. The subclass AlternationPath includes overriding implementations of the following methods of CodePath: initializeAttributesForwardFlow and computeAttributesForwardFlow. FIG. 16 shows exemplary pseudocode for implementing the initializeAttributesForwardFlow method of AlternationPath. FIG. 19 shows exemplary pseudocode for implementing the computeAttributesForwardFlow method of AlternationPath.

Additional services supported by AlternationPath are: (i) AlternationPath (int num_alternatives): Instantiate an AlternationPath object that represents the convergence of num_alternatives control flows. (ii) void establishAlternative (int n, CodePath alternative_flow): Establish alternative_flow as the nth alternative flow to be associated with this AlternationFlow object. (iii) void setPredecessor (CodePath pred): Throws IllegalOperationException. An AlternationPath object does not have a predecessor in the traditional sense. Instead, it has a set of alternatives.

Class CatenationPath:

In an example embodiment according to the present invention, the class CatenationPath is a concrete subclass of CodePath. A CatenationPath is associated with a single BasicBlock object. The subclass CatenationPath includes overriding implementations of the following methods of CodePath: initializeAttributesForwardFlow and computeAttributesForwardFlow. FIG. 17 shows exemplary pseudocode for implementing the initializeAttributesForwardFlow method of CatenationPath. FIGS. 20A and 20B show exemplary pseudocode for implementing the computeAttributesForwardFlow method of CatenationPath. The service CatenationPath (BasicBlock associated_block) instantiates a CatenationPath object to represent the associated BasicBlock object.

Class IterationPath:

In an example embodiment according to the present invention, the class IterationPath is a concrete subclass of CodePath. An IterationPath represents the body of a loop. The subclass IterationPath includes overriding implementations of the following methods of CodePath: initializeAttributesForwardFlow, computeAttributesForwardFlow, and calcPredMaxOblivionAtEnd. FIG. 18 shows exemplary pseudocode of the initializeAttributesForwardFlow method of IterationPath according to embodiments of the present invention. FIG. 21 shows exemplary pseudocode of the computeAttributesForwardFlow method of IterationPath according to embodiments of the present invention. FIG. 31 shows exemplary pseudocode of the calcPredMaxOblivionAtEnd method of the IterationPath according to embodiments of the present invention. Additional services supported by this class are:

(i) IterationPath (CodePath loop_body): Instantiate an IterationPath object to represent a loop with the specified loop_body. Following instantiation of this object, user code arranges for the entry node of the CodePath data structure that is referenced from loop_body to see this newly instantiated IterationPath as its predecessor.

(ii) CodePath loopBody( ): Return a reference to the loop body associated with this IterationPath object.

Class Traversal:

In an example embodiment according to the present invention, the class Traversal is a class that represents the ability to traverse parts of a CodePath data structure. A Traversal instance maintains the following final instance fields: (i) final CodePath end: Refers to the constructor argument by the same name. (ii) final CodePath start_sentinel: Refers to the constructor argument by the same name. (iii) final CodePath entry: Computed during construction. This is the entry point for the Traversal. The single predecessor of entry equals start_sentinel.

In an example embodiment according to the present invention, services provided by the Traversal data type include:

Traversal (CodePath start_sentinel, CodePath end): Construct a Traversal object for the purpose of visiting all of the control flows from, but not including start_sentinel through the end node. The typical use of traversals is to analyze and transform control flows that are produced by reduction of a CFG. In the case that the intent of the traversal is to analyze a loop body (as identified by a T1 transformation), the start_sentinel value is the IterationPath node that represents the loop. In other cases (reductions by T2 transformations), the start_sentinel value is typically null. When a CodePath data structure is produced by a sequence of T1 and T2 transformations, the predecessor relationships form a directed acyclic graph (DAG) that is rooted at one or more end points. The cyclic data structure that represents a loop is formed through the use of a special loop_body field contained within the IterationPath node. For each end point associated with a particular reduction, the transitive closure of predecessor relationships eventually reaches the single CodePath node that is the entry point to the associated reduction. If every backward flowing path from end does not reach start_sentinel, the arguments to the Traversal instantiation are considered invalid. An instantiated Traversal object can be used to perform traversals of this DAG only until another Traversal object spanning one or more of the same CodePath objects as this Traversal object is instantiated. The Traversal constructor performs the following:

```
this.end = end;
this.start_sentinel = start_sentinel;
end.accommodateTraversalPassOne (start_sentinel);
this.entry = end.accommodateTraversalPassTwo (this);
``` public getEntry( ): This method returns a reference to the CodePath object that represents the entry node for this traversal.

public getEnd( ): This method returns a reference to the CodePath object that represents the end node for this traversal.

public computeAttributes( ): This method has the effect of computing the attributes for each CodePath node along all control flows from start_sentinel, exclusive, to end, and may be implemented by this.entry.computeAttributes( ).
public void insertPreemptionPoints (boolean enforce_preemption, ET max_oblivion_at_start, ET at_start_tolerance, ET max_oblivion_during, ET during_tolerance, ET max_oblivion_at_end, ET at_end_tolerance): This method inserts any preemption checks that are required to enforce that every control flow rho between the start_sentinel CodePath object, exclusive, and the end CodePath object, inclusive, honor the constraints that rho.oblivionAtStart( )≤max_oblivion_at_start, rho.oblivionDuring( )≤max_oblivion_during, rho.oblivionAtEnd( )≤max_oblivion_at_end. Furthermore, if enforce_preemption is true, this method assures that every such control flow rho has a preemption check. The computeAttributes method must be invoked before the insertPreemptionChecks method. A Traversal object's insertPreemptionChecks method performs the following to begin the process of inserting preemption points into the control flows represented by the Traversal object:

```
if (end.oblivionAtStart( ).le (max_oblivion_at_start))
    max_oblivion_at_start = ET.Infinity;
    if (end.oblivionAtEnd( ).le (max_oblivion_at_end))
    max_oblivion_at_end = ET. Infinity;
    if (end.oblivionDuring( ).le (max_oblivion_during))
    max_oblivion_during = ET. Infinity;
    if (end.checksPreemption( ))
enforce_preemption= false;
    end.insertPreemptionChecks (enforce_preemption,
max_oblivion_at_start, at_start_tolerance,
max_oblivion_during, during_tolerance,
max_oblivion_at_end, at_end_tolerance).
```

Class Reduction:

In an example embodiment according to the present invention, the class Reduction is a concrete class that represents a region of a method's reducible control-flow graph (CFG). The instance fields implemented by this type are: (i) CodePath entry: The CodePath object through which all control flows to enter into the region represented by this Reduction object. (ii) CodePath terminating_path: If non-null, this Reduction object spans the terminating CodePath object, which is referenced from this field. The terminatingCodePath object is the last CodePath object in the method. If a method contains multiple return statements, the successor of each block ending with a return statement is the terminating CodePath object. (iii) Reduction [ ] inward_flows: This array holds all of the Reduction objects that represent regions of code from which control can flow into this Reduction object's region of code. If this Reduction has an inward flow from itself, the self-referential flow is included in the inward_flows array. (iv) Reduction [ ] outward_flows: This array holds all of the Reduction objects that represent regions of code to which control can flow from this Reduction object's region of code. If this Reduction has an outward flow back to itself, the self-referential flow is included in the outward_flows array. (v) CodePath [ ] [ ] outward_paths: For each of the regions of code to which control may flow from this Reduction object, the inner-nested array represents all of the CodePath objects residing within this region of code through which control may flow directly to a CodePath object residing in the associated Reduction object's region of code.

In accordance with embodiments of the present invention, various services implemented by the Reduction type are described below:

Reduction (CatenationPath associated_path): Construct a Reduction object to represent associated_path. This form of the constructor is used to build a Reduction-based representation of a method's CFG. It is assumed that the associated_path object has no predecessors. Space is reserved within the constructed Reduction object to represent the number of outward flows indicated by associated_path.associatedBlock( ).predecessorCount( ). The implementation comprises:

```
this.entry = assocated_path;
this.terminating_path = null;
int successors = associated_path.associatedBlock( ).numSuccessors( );
this.outward_flows = new Reduction [successors]
this.outward_paths = new CodePath [successors][ ];
int predecessors = associated_path.numPredecessors( );
this.inward_flows = new Reduction [predecessors];
```

Reduction (CatenationPath associated_path, boolean is_terminating): Construct a Reduction object to represent associated_path. If is_terminating is true, mark this Reduction object as a terminating Reduction and identify the associated_path as a terminating path. The implementation comprises:

```
        super (associated_path);
        if (is_terminating)
            this.terminating_path = associated_path;
```

Reduction (Reduction loop_body): Construct a Reduction object to represent a loop whose body is represented by the previously constructed Reduction supplied as an argument. This form of the constructor is used in the implementation of a T1 transformation. A side effect of this constructor is to instantiate a new IterationPath object iteration_path and enforce that the loop body has appropriate preemption checks. Additionally, each CodePath node that is contained within traversal (iteration_path.loop_body, iteration_path) has its loop nesting level incremented by 1. The outward flows for the newly constructed Reduction are the same outward flows as for loop_body except for the self-referential outward flow that is eliminated by this T1 transformation. FIG. 7 shows exemplary pseudocode for implementing the Reduction (Reduction loop_body) function according to embodiments of the present invention.

Reduction (Reduction pred_region, Reduction succ_region): Construct a Reduction object to represent the catenation of pred_region and succ_region. This form of the constructor is used in the implementation of a T2 transformation. The outward flows for the newly constructed Reduction are the same as the union of outward flows for pred_region and succ_region, with removal of the outward flow from pred_region to succ_region unless succ_region has a self-referential outward flow. If succ_region has a self-referential outward flow, the newly constructed Reduction object will also have a self-referential outward flow. FIGS. 8A and 8B show exemplary pseudocode for implementing the Reduction (Reduction pred_region, Reduction succ_region) function according to embodiments of the present invention.

void establishOutwardFlow (int n, Reduction r): set the destination of the $n^{th}$ outward flow from this Reduction object to be r. The first outward flow is identified by n=0. This method is typically only used for Reduction objects that are constructed using the forms that expect a CatenationPath argument. At the time the Reduction is instantiated, space is reserved to represent as many outward flows as the supplied associated_path.associatedBlock( ) has successors. The outward flows are established as each of the successor basic blocks becomes associated with a corresponding Reduction object.

void establishInwardFlow (int n, Reduction r): set the source of the nth inward flow into this Reduction object to be r. The first inward flow is identified by n=0. This method is typically only used for Reduction objects that are constructed using the forms that expect a CatenationPath argument. At the time the Reduction is instantiated, space is reserved to represent as many inward flows as the supplied associated_path.associatedBlock( ) has predecessors. The inward flows are established as each of the predecessor basic blocks becomes associated with a corresponding Reduction object.

final CodePath entry( ): Given that the CFG is assumed to be reducible and that each Reduction represents either a single CatenationPath node or is the result of a T1 or T2 transformation, each Reduction has a single entry point. This method returns a reference to that entry point.

final CodePath terminatingPath( ): If this Reduction spans the terminating node, return a reference to the node. Otherwise, return null.

int inwardFlows( ): Queries how many inward flows enter this Reduction. An inward flow is a control flow originating in a region of code associated with some other Reduction object, or possibly even associated with this same Reduction object and flowing into the region of code represented by this Reduction object. Each Reduction object maintains a representation of all of its inward flows.

Reduction inwardFlow (int n): Queries from which source Reduction does control flow for the $n^{th}$ inward flow to this Reduction. The first inward flow is identified as n=0.

int outwardFlows( ): Queries how many outward flows depart this Reduction. An outward flow is a control flow from the region of code represented by this Reduction to the region of code represented by some other Reduction or possibly by this same Reduction. Each Reduction object maintains a representation of all of its outward flows. For each outward flow, the Reduction also keeps track of all the CodePath objects that map to the outward flow.

Reduction outwardFlow (int n): Queries to which destination Reduction does control flow for the $n^{th}$ outward flow from this Reduction. The first outward flow is identified as n=0.

private int outwardPaths (int n): Queries how many outgoing CodePath objects are associated with the $n^{th}$ outward flow from this Reduction. Since the associated CFG is assumed to be reducible, each of the associated CodePath objects must flow to the same CodePath object, which is the entry block for the region represented by outwardFlow (n).

private CodePath outwardPath (int n, int p): Return the CodePath object to which the $p^{th}$ CodePath object associated with the $n^{th}$ control flow departing this Reduction flows.

In an example embodiment according to the present invention, the insertion of preemption checks into a method body is the last step of compilation, after all optimization phases have been completed and all code has been generated. Before inserting extra preemption checks into any function's implementation, the compiler first examines the existing function implementation to identify all occurrences of instructions that are recognized automatically by the computer system to be preferred preemption points. In a typical system configuration, computer-hardware-recognized preferred preemption points are already present in the function's prologue (at the point that stack memory is reserved for the function's activation frame), in the function's epilogue (at the point that stack memory that had been reserved for the function's activation frame is released, and at the function's return instruction), and within the function's body at each point that the function calls another function. The compiler marks each of the preferred preemption points that are already present in the existing function implementation as such. For many functions, these already existing preferred preemption checks are sufficient to satisfy all the upper-bound constraints on oblivion that must be enforced on the function's implementation. The typical exception to this rule is the presence of unbounded loops, into each of which the compiler may need to insert one or more preemption checks at points that minimize the amount of contextual information that must be saved and restored at each context switch.

Assume the CFG already exists and assume the CFG is reducible. Perform node splitting as necessary in order to make the CFG reducible if it is not already reducible. If the CFG has multiple basic blocks that return from the function, create a single new BasicBlock object to represent the function's end point and insert this BasicBlock object into the CFG with all of the originally returning BasicBlock objects as its predecessors. Call this new basic block the terminating basic block. Call the CatenationPath node that is associated with this basic block the terminating path. Call satisfies the preemption constraints, for example, using the implementation in Table 2, where Psi is the preemption latency parameter.

After the compiler has determined where it desires to insert new preemption points, code must be inserted to cause the computer system to recognize the desired instructions as preferred preemption points. If a newly inserted preferred point appears within a loop, the typical optimal implementation is to place an instruction into the loop pre-header which informs the computer system to treat the instruction address at which the preferred preemption point is found as a preferred preemption point. Otherwise, the newly inserted preferred preemption is not found within a loop. In this case, the compiler has the option of either inserting a harmless instruction which is known to be recognized by the computer system as representing a preferred preemption point (e.g. "addi 1,1,0"), or inserting a "preempt_at address" instruction at some control point that dominates (in the computer compiler sense) the instruction that has been identified as the new preferred preemption point that is to be inserted, using the address of the new instruction as the operand of the preempt_at instruction.

TABLE 1

```
while (num_active_reductions > 1) {
    for (int i = 0; i < num_active_reductions; i++) {
        Reduction r1 = active_reductions [i];
        if ((r1.inwardFlows ( ) == 1) && (r1.inwardFlow (0) != r1)) {
            Reduction predecessor = r1.inwardFlow(0);   /* Do T2 transform. */
            Reduction r2 = new Reduction (predecessor, r1);
            /* Replace the successor with r2. */
            active_reductions [i] = r2;
            /* Remove the predecessor. Find j, index of predecessor. */
            for (int j = 0; active_reductions [j] != predecessor; j++)
                ;
            while (++j < num_active_reductions)
                active_reductions [j-1] = active_reductions [j];
            num_active_reductions--;
            break;     /* Restart the outer loop. */
        } else if (r1.outwardFlows ( ) > 0) {
            boolean found_T1 = false;
            for (int j = r1.outwardFlows ( ); j-- > 0; ) {
                Reduction loop_candidate = r1.outwardFlow (j);
                if (loop_candidate == r1) {
                    found_T1 = true;
                    break;
                }
            }
            if (found_T1) {                          /* Do T1 transform. */
                active_reductions [i] = new Reduction (loop_candidate);
                break;                               /* Restart outer loop. */
            } /* else, continue search for an eligible T1 or T2 transformation. */
    } /* likewise, continue search for an eligible T1 or T2 transformation. */
``` the associated Reduction object a terminating Reduction. If there is only one basic block that returns from the function, identify the CatenationPath node associated with that basic block as the terminating path, identifying the associated Reduction object as the terminating Reduction. Allocate an array active_reductions of Reduction object references with as many array elements as there exist BasicBlock objects in the existing CFG. Walk the CFG, instantiating a CatenationPath object to represent each existing BasicBlock and a Reduction object to represent each CatenationPath. Establish the outward flows and inward flows for each instantiated Reduction object. Insert a reference to each newly instantiated Reduction object into the active_reductions array. Set the variable num_active_reductions to represent the size of the active_reductions array. Resolve active Reduction objects, for example, by executing the loop in Table 1. At this point, there is only active Reduction. Assure that it

TABLE 2

```
CodePath end = active_reductions [0].terminatingPath ( );
Traversal t = new Traversal (null, end);
t.computeAttributes ( );
t.insertPreemptionPoints (false, ET.Infinity, ET.Zero,
    Psi, QuarterPsi, ET.Infinity, ET.Zero)
```

In view of the explanations set forth above, the placement of explicit preemption points into compiled code according to embodiments of the present invention serves the needs of soft real-time developers as well as hard real-time developers. Whereas developers of hard real-time systems are generally expected to budget for the worst-case behavior of every software component, soft real-time developers are generally more interested in expected behavior. A hard real-time system is expected to never miss any deadline. In contrast, a soft real-time engineer is expected to effectively manage deadlines. Managing deadlines comprises endeavoring to reduce the likelihood of misses, providing appropriate handling when deadlines are occasionally missed, and assuring system stability in the face of transient work overloads. There are many reasons that soft real-time is more challenging than hard real-time. For example, soft real-time systems tend to be larger and much more complex. The soft real-time workload tends to be much less predictable. The very severe constraints of hard real-time systems are only relevant to very simple algorithms with very predictable workloads.

Whereas a hard real-time system is either correct (always satisfying all timing constraints), or incorrect (failing to satisfy some timing constraints some of the time), most soft real-time systems are held to more nuanced standards of quality. For example, soft real-time systems may address the need to: minimize the number of deadlines missed, minimize the total amount of lateness, adjust priorities to miss only the "less important" deadlines while honoring more important deadlines, dynamically adjust service quality to maximize the utility of work that can be reliably completed with available resources, and/or design for stability in the face of transient work overloads, assuring that the most important time-critical work is still performed reliably even when certain resources must be temporarily reassigned to the task of determining how to effectively deal with oversubscription of system capacity.

Figure 34:
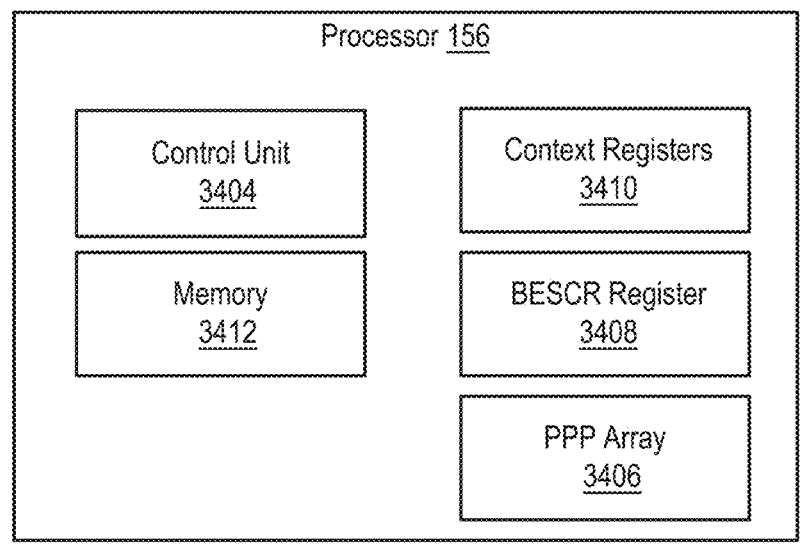
FIG. 34 is a block diagram of a processor configured for compiler-optimized context switching.

Various embodiments of the present invention that provide compiler-optimized context switching in accordance with the present invention will now be discussed with reference to at least FIGS. 34-39. More specifically, exemplary computer implemented methods, computer systems/apparatus, and computer program products that provide compiler-optimized context switching in accordance with the present invention and are described with reference to the accompanying drawings, beginning with FIG. 34. FIG. 34 sets forth a block diagram of a processor 156 configured for compiler-optimized context switching according to embodiments of the present invention. The system of FIG. 34 includes a control unit 3704 that directs operation of processor 156. For example, the control unit 3704 may control the storage and loading of data and/or instructions. The control unit 3704 may also interpret and/or decode instructions into commands and/or signals. The control unit 3704 may control transfer of instructions and/or data in the processor 156. The control unit 3704 may also coordinate various parts of the processor 156 (e.g., processing cores, functional units, etc.).

Processor 156 (e.g., the control unit 3704) may receive an instruction (e.g., from an instruction stack or call stack) indicating a preferred preemption point. A preferred preemption point is an instruction address that a compiler has determined to be a preferred point to perform a context switch from a first thread to a second thread. Accordingly, if an operating system or managed run-time environment has requested that a context switch be performed, the control unit 3704 should preferentially initiate the context switch when the program counter has reached an instruction indicated as a preferred preemption point.

The instruction indicating a preferred preemption point may be identified by the compiler-generated operation "preempt_at" with a first operand being an instruction address of the preferred preemption point. The instruction address of the preferred preemption point may comprise a program counter-relative address (e.g., an address offset). The instruction indicating the preferred preemption point may also comprise a second operand as an M-bit index value.

In response to receiving the instruction indicating the preferred preemption point, processor 156 (e.g., the control unit 3704) may store the preferred preemption point in a data structure. For example, the processor 156 may store the preferred preemption point in a Preferred Preemption Point (PPP) Array 3706. The PPP Array 3706 comprises an indexed plurality of registers (e.g., an array of registers). For example, the PPP Array 3706 may comprise $N=2^M$ registers, where M is a number of bits of an index value operand of the instruction indicating the preferred preemption point. Accordingly, storing the preferred preemption point in a data structure may comprise storing the instruction address operand of the instruction in the PPP Array 3706 at an index defined by the index value operand.

Processor 156 (e.g., the control unit 3704) may then determine that a preferred preemption point has been reached by a first thread. For example, the control unit 3704 may compare the current program counter value to the one or more entries in the PPP Array 3706. Processor 156 may then determine that a preferred preemption point has been reached by the first thread based on a match between the program counter and an entry in the PPP Array 3706.

Processor 156 (e.g., the control unit 3704) may then determine that preemption of the first thread for a second thread has been requested (e.g., by operating system 3510 or managed run-time environment 310). For example, the control unit 3704 may determine that operating system 3510 or managed run-time environment 310 has requested preemption of the first thread for a second thread based on a state of a bit of a register. The register may be accessible to and modifiable by operating system 3510 or managed run-time environment 310. Operating system 3510 or managed run-time environment 310 may then set the bit to "1" when requesting preemption of the first thread for the second thread. Such a bit may be hereinafter referred to as a Preferred Preemption Point Exception Enabled (PPPEE) bit.

For example, the register comprising the bit indicating that operating system 3510 or managed run-time environment 310 has requested preemption of the first thread for a second thread may comprise a Branch Event Status and Control (BESCR) Register 3408. Accordingly, the bit may comprise a previously reserved bit of the BESCR Register 3408, e.g. bit 28. It is understood that the use of the BESCR Register 3408 for storing the bit indicating that operating system 3510 or managed run-time environment 310 has requested preemption of the first thread for a second thread is exemplary, and that other registers or memory may also be used to store the bit indicating that operating system 3510 or managed run-time environment 310 has requested preemption of the first thread for a second thread.

Figure 40:
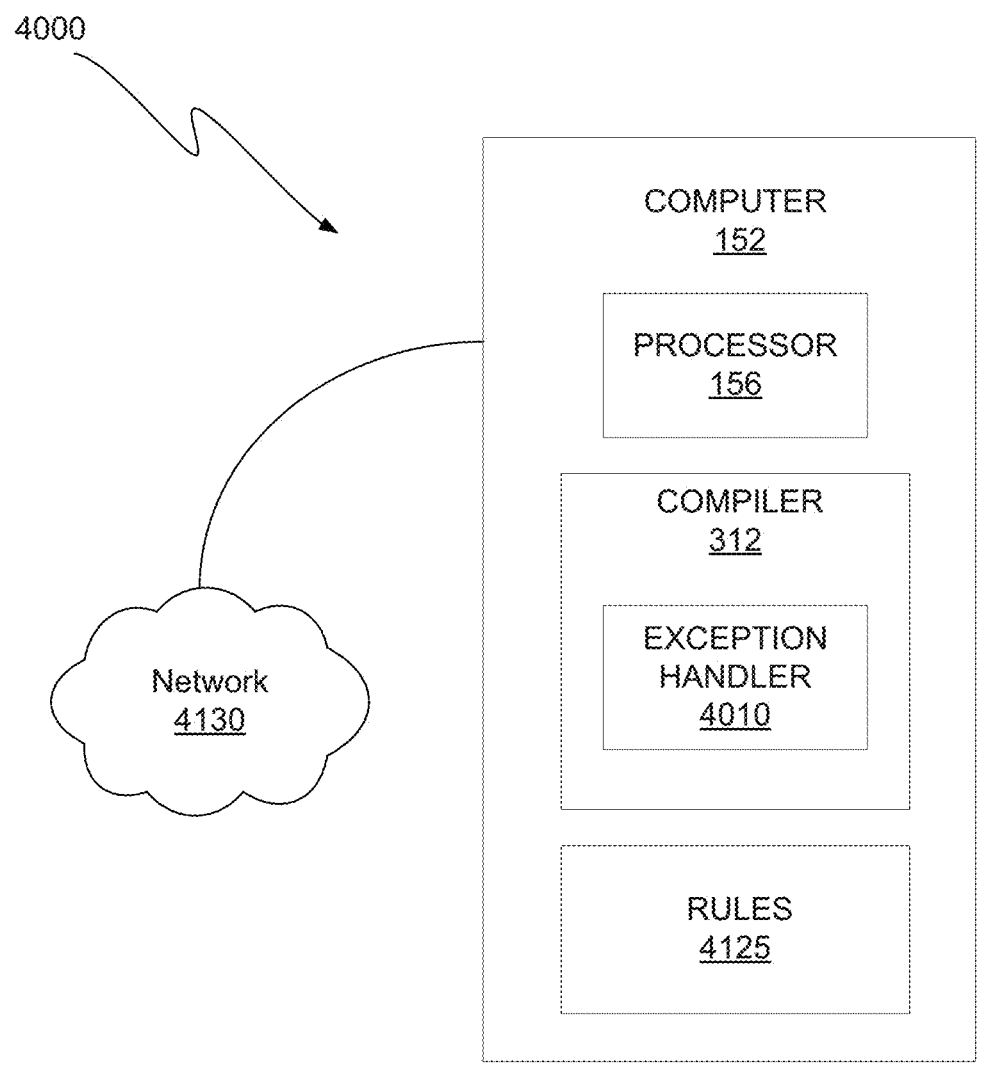
FIG. 40 is a functional block diagram illustrating a data processing environment, in accordance with an exemplary embodiment of the present invention.

Processor 156 (e.g., the control unit 3704) may modify the state of another bit of a register (e.g., the BESCR Register 3408) indicating that a Preferred Preemption Point Exception (PPPE) has occurred (e.g., the program counter has reached a preferred preemption point and preemption has been requested). Such a bit may be hereinafter referred to as a Preferred Preemption Point Exception Occurred (PPPEO) bit. For example, processor 156 may set a reserved bit of the BESCR Register 3408 (e.g., bit 60) to "1," indicating that the PPPE has occurred. Thus, when an event-based exception handler is called, e.g., when exception handler 4010 of FIG. 40 is called, the exception handler may access this bit to determine that the exception handler was called due to the PPPE occurring.

Processor 156 may then perform a context switch from the first thread to the second thread. For example, processor 156 may determine one or more context registers of a plurality of context registers 3410. The context registers 3410 comprise registers accessible to and modifiable by one or more executed threads. Determining the one or more context registers may comprise accessing a data structure (e.g., a compiler-generated table) indicating the one or more context registers as being in use by a function when the preferred preemption point is reached. For example, compiler 312 may generate a data structure for each function. A data structure entry for a given function may indicate a preferred preemption point within that function and the one or more context registers in use by the function at the preferred preemption point. For the purposes of this invention, the context registers 3410 may exclude a stack pointer and/or instruction pointer. Since these two registers are assumed to always be live, they do not need to be explicitly addressed in the mechanism that conditionally saves and restores only the registers currently being used by the respective threads.

Performing the context switch may then comprise saving one or more values stored in the determined one or more context registers 3410. This allows the values of registers used by the first thread to be later restored when performing a context switch back to the first thread. For example, the values may be saved to memory 3412. The memory 3412 may comprise embedded Dynamic Random-Access Memory (eDRAM). The values of the registers may also be saved to a cache, to other Random-Access Memory (RAM), to disk storage, or otherwise saved.

Processor 156 may then overwrite each of the context registers 3410 (e.g., the determined one or more context registers 3410 and the remaining context registers 3410). Overwriting the context registers 3410 may comprise storing a "0" value, some other predefined value, or a randomly generated value into each of the context registers 3410. This may hereinafter be referred to as a "purge" phase of overwriting the context registers 3410. This prevents data leakage between threads that may occur by accessing, by one thread, values stored in registers used by another thread. The purge phase may be performed by a single instruction, or by a number of instructions that is less than or equal to the number of purged context registers 3410.

Overwriting the context registers 3410 may also comprise loading (e.g., "restoring"), into one or more of the context registers 3410, one or more saved values associated with the second thread. For example, the one or more values associated with the second thread may have been previously stored in the context registers 3410 and saved as a result of a context switch from the second thread. In other words, overwriting the context registers 3410 may comprise a "purge" phase during which a value is stored in each of the context registers, and a "restore" phase where saved values previously stored in context registers 3410 are reloaded into their respective context registers. Although the context registers 3410 into which a value is loaded in the "restore" phase were previously overwritten during the "purge" phase, this approach (where all context registers 3410 are purged prior to the restore phase) is more efficient than selectively overwriting or purging only those context registers 3410 not used by the second thread. As was set forth above, the context registers 3410 may exclude a stack pointer and/or instruction pointer. Accordingly, the stack pointer and/or instruction pointer would not be purged. Processor 156 may then begin executing instructions of the second thread.

After completing the functionality of the second thread for which preemption was requested, processor 156 may then perform another context switch back to the first thread. Performing the other context switch to the first thread may comprise overwriting each of the context registers 3410 (e.g., by storing, into each of the context registers 3410, "0" or another value) and loading, into the determined context registers 3410 (e.g., the context registers 3410 used by the first thread at the preferred preemption point) the saved values. Performing the other context switch to the first thread may comprise modifying a state of the bit indicating that preemption of the first thread has been requested (e.g., the PPPEE bit). For example, the PPPEE bit may be set to "0," as the preemption of the first thread by the second thread has been resolved. If used, the PPPEO bit may also be set to "0."

Performing the context switch from the first thread to the second thread may be facilitated by an exception handler, e.g., exception handler 4010 of FIG. 40. For example, processor 156 may set the PPPEO bit to "1," indicating that a PPPE has occurred. Processor 156 may also store (e.g., in one or more reserved bits of the BESCR Register 3408 or in another data structure or storage unit) an indication of the preferred preemption point that was reached to cause the PPPE to occur. For example, assuming a PPP Array 3706 size of N−1, M bits of the BESCR Register 3408 (or another register) may be used to indicate the PPP Array 3706 index of the preferred preemption point that was reached to cause the PPPE to occur where N=2^M. Assuming that the preferred preemption point at PPP Array 3706 index [i] caused the PPPE to occur, processor 156 would then set the M bits to the value of [i]. These reserved M bits are hereinafter referred to as the PPPE Hash. PPE Hash values of 0 to N−2 identify each of the N−1 instruction addresses stored within the PPP Array. The special PPE Hash value of N−1 may be used to indicate that the preferred preemption point exception that just occurred corresponds to the matching of one of the special patterns that is known to identify preferred preemption points rather than the matching an instruction address against the contents of the PPP Array.

Processor 156 may then trigger the exception handler, e.g., exception handler 4010 of FIG. 40 is triggered. The exception handler would access the PPPEO bit, set to "1," to determine that the exception handler was triggered due to a PPPE. The exception handler would then access the PPPE Hash to determine an index [i] of the PPP Array 3706, and load the instruction address at PPP Array 3706 index [i] if i is less than N−1. If i equals N−1, the exception handler would identify that the preferred preemption point is at the address that immediately follows the most recently decoded instruction. The exception handler may then load the data structure entry, e.g., a data table entry, corresponding to the preferred preemption point instruction address to determine which context registers 3410 must be saved in order to perform the context switch. The exception handler may then save the determined context registers 3410 before yielding control to operating system 3510 or managed run-time environment 310 which requested preemption of the thread. The operating system 3510 or managed run-time environment 310 may then (i) purge the contents of all context registers 3410 and may (ii) further modify the state of a bit indicating that preemption of the first thread (e.g., the PPPEE bit) has been requested. For example, the PPPEE bit may be set to "0" as the thread to which the preemption request was directed has yielded to the request. If used, the PPPEO bit may also be set to "0." Then operating system 3510 may resume execution of a second thread, and the second thread may restore the context registers 3410, which were determined to be used by that second thread.

Compiler-optimized context switching in accordance with the present invention is generally implemented with computers, that is, with automated computing machinery. Therefore, for further explanation, FIG. 35 sets forth a block diagram of automated computing machinery comprising an exemplary computer 152 configured for compiler-optimized context switching according to embodiments of the present invention. The computer 152 of FIG. 35 includes at least one computer processor, for example, processor 156, or 'CPU' as well as random access memory 168 ('RAM') which is connected through a high-speed memory bus 166 and bus adapter 158 to processor 156 and to other components of the computer 152.

Figure 35:
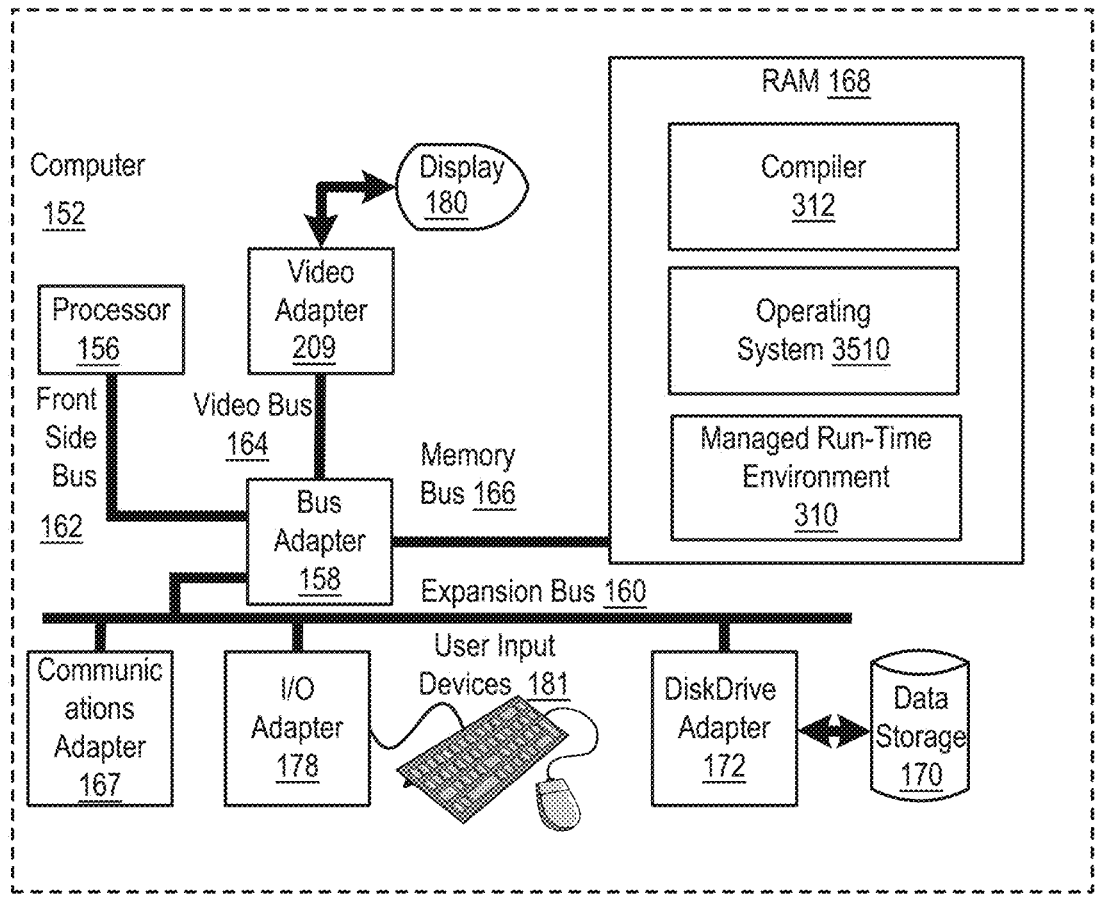
FIG. 35 is a block diagram of an example system for compiler-optimized context switching.

Stored in RAM 168 is an operating system 3510. Operating systems useful in computers configured for compiler-optimized context switching according to embodiments of the present invention include UNIX™, Linux™, Microsoft Windows™, AIX™, IBM's i OS™, and others as will occur to those of skill in the art. Also stored in RAM 168 may be a managed run-time environment 310. Managed run-time environments useful in computers configured for compiler-optimized context switching according to the embodiments of the present invention include Java™ Virtual Machine (JVM) and Common Language Runtime (CLR). The operating system 3510 and managed run-time environment 310 in the example of FIG. 35 are shown in RAM 168, but many components of such software typically are stored in non-volatile memory also, such as, for example, on data storage 170, such as a disk drive. Also stored in RAM 168 is compiler 312 for compiler-optimized context switching according to embodiments of the present invention.

The compiler 312 may be configured to compile code (e.g., source code) into processor-executable instructions. During code compilation, the compiler 312 may determine one or more preferred preemption points. For example, compiler 312 may determine an instruction in a function where a number of registers falls below a predefined threshold. The address of a determined instruction may then be determined to be a preferred preemption point. The compiler 312 may then encode, into the processor-executable instructions, an instruction indicating the preferred preemption point (e.g., a "preempt_at" instruction). For example, the instruction may be included at the beginning of a function comprising the preferred preemption point. Thus, on execution of the function, each preferred preemption point for that function is stored in the PPP Array 3706. As another example, the instruction may be included outside of a loop or other recursive and/or iterative operation comprising the preferred preemption point. Thus, the preferred preemption point need only be identified once for the multiple times it may be encountered during the operation.

The instruction may be included with the instruction address of the preferred preemption point as a first operand. The instruction may also be included with an index value as a second operand. The index value may be based on an order in which the preferred preemption point is encountered in a given function, source code file, or other set of operations. For example, the first preferred preemption point may be given index value "0," while the second preferred preemption point may be given index value "1," etc.

The compiler 312 determines one or more context registers 3410 in use at each preferred preemption point. The compiler 312 may then insert, into the processor-executable instructions, a data structure that indicates which context registers 3410 are determined used at each preferred preemption point. A tailored copy of this data structure may be inserted once for each function at a known offset from the function's entry point. The data structure may then be referenced (e.g., by exception handler 4010 of FIG. 40) to determine which context registers 3410 to save in order to perform a context switch. The data structure may comprise one entry for each preferred preemption point contained within the function. In the case that there are more preferred preemption points in the function than N, the data structure may have more entries than N and may use software hashing based on the address of the encountered preemption point to resolve which entry determines the used context registers 3410 in one embodiment. The data structure may also comprise exactly N entries, with each entry representing a set of used context registers 3410 that is a superset of the used context registers 3410 associated with each preferred preemption point that maps to this entry. The function's implementation may include instructions to change the data structure that is used to determine used context registers 3410 during each part of the function's execution, such that data structure entry [i] always exactly describes the used context registers 3410 each time a requested preemption causes a PPPE to execute.

The computer 152 of FIG. 35 includes disk drive adapter 172 coupled through expansion bus 160 and bus adapter 158 to processor 156 and other components of the computer 152. Disk drive adapter 216 connects non-volatile data storage to the computer 152 in the form of data storage 170. Disk drive adapters useful in computers configured for compiler-optimized context switching according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer 152 of FIG. 35 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example computer 152 of FIG. 35 includes a video adapter 209, which is an example of an I/O adapter specially designed for graphic output to a display device 180 such as a display screen or computer monitor. Video adapter 209 is connected to processor 156 through a high-speed video bus 164, bus adapter 158, and the front side bus 162, which is also a high-speed bus.

The exemplary computer 152 of FIG. 35 includes a communications adapter 167 for data communications with other computers and for data communications with a data communications network, such as network 100. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for compiler-optimized context switching according to embodiments of the present invention include, but are not limited to, modems for wired dial-up communications, Ethernet (IEEE 802.3) adapters for wired data communications, and 802.11 adapters for wireless data communications.

Figure 36:
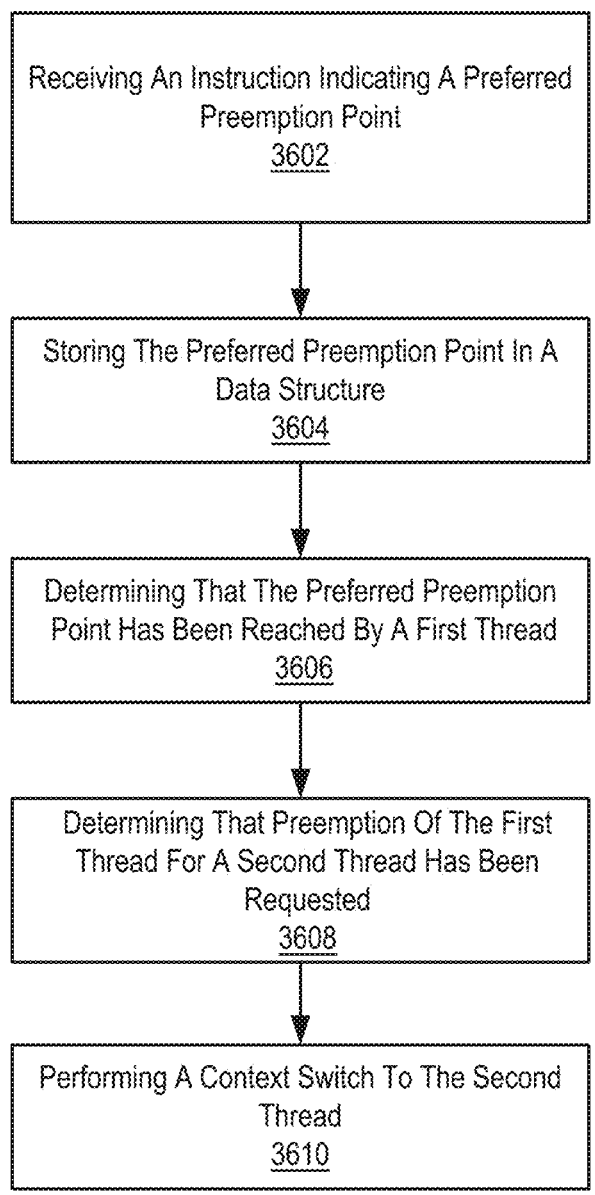
FIG. 36 is a flowchart of an example method for compiler-optimized context switching.

For further explanation, FIG. 36 sets forth a flow chart illustrating an exemplary method for compiler-optimized context switching according to embodiments of the present invention that includes receiving 3602 (e.g., by a processor 156, by a control unit 3404 of a processor 156) an instruction (e.g., from an instruction stack or call stack) indicating a preferred preemption point. A preferred preemption point is an instruction address that a compiler has determined to be a preferred point to perform a context switch from a first thread to a second thread. Accordingly, if an operating system or managed run-time environment has requested that a context switch be performed, the control unit 3404 should preferentially initiate the context switch when the program counter has reached an instruction indicated as a preferred preemption point.

The instruction indicating a preferred preemption point may be identified by the compiler-generated operation "preempt_at" with a first operand being an instruction address of the preferred preemption point. The instruction address of the preferred preemption point may comprise a program counter-relative address (e.g., an address offset). The instruction indicating the preferred preemption point may also comprise a second operand as an M-bit index value.

The method of FIG. 36 may further comprise storing 3604 (e.g., by the processor 156, by the control unit 3404 of the processor 156) the preferred preemption point in a data structure. For example, the processor 156 may store the preferred preemption point in a Preferred Preemption Point (PPP) Array 3406. The PPP Array 3406 comprises an indexed plurality of registers (e.g., an array of registers). For example, the PPP Array 3406 may comprise N=2^M registers, where M is a number of bits of an index value operand of the instruction indicating the preferred preemption point. Accordingly, storing the preferred preemption point in a data structure may comprise storing the instruction address operand of the instruction in the PPP Array 3406 at an index defined by the index value operand.

The method of FIG. 36 may further comprise determining 3606 (e.g., by the processor 156, by the control unit 3404 of the processor 156) that a preferred preemption point has been reached by a first thread. For example, the control unit 3404 may compare the current program counter value to the one or more entries in the PPP Array 3406. The processor 156 may then determine that a preferred preemption point has been reached by the first thread based on a match between the program counter and an entry in the PPP Array 3406.

The method of FIG. 36 may further comprise determining 3608 (e.g., by the processor 156, by control unit 3404 of processor 156, that preemption of the first thread for a second thread has been requested (e.g., by an operating system or managed run-time environment). For example, control unit 3404 may determine that preemption of the first thread for a second thread based on a state of a bit of a register has been requested. The register may be accessible to and modifiable by the operating system or managed run-time environment. The operating system or managed run-time environment may then set the bit to "1" when requesting preemption of the first thread for the second thread. Such a bit may be hereinafter referred to as a Preferred Preemption Point Exception Enabled (PPPEE) bit.

For example, the register comprising the bit indicating that the operating system or managed run-time environment has requested preemption of the first thread for a second thread may comprise a Branch Event Status and Control (BESCR) Register 3408. Accordingly, the bit may comprise a previously reserved bit of the BESCR Register 3408, e.g. bit 28. It is understood that the use of the BESCR Register 3408 for storing the bit indicating that preemption of the first thread for a second thread has been requested is exemplary, and that other registers or memory may also be used to store the bit indicating that preemption of the first thread for a second thread has been requested.

Figure 37:
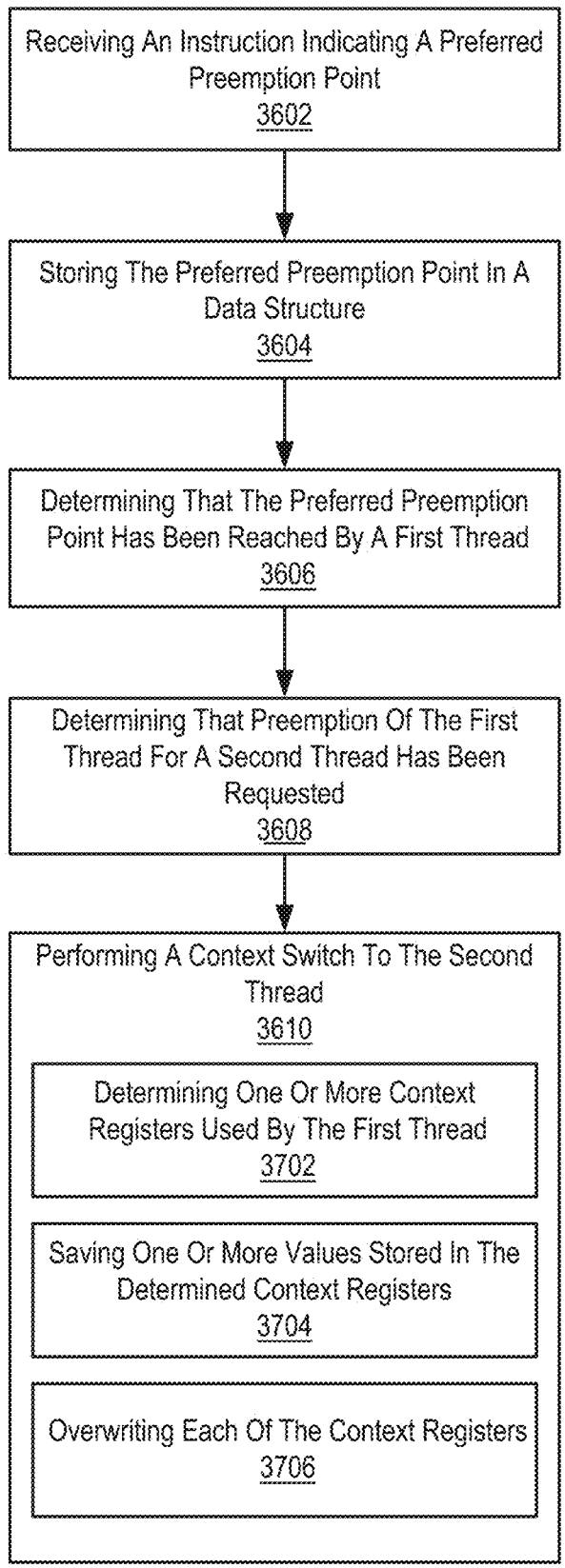
FIG. 37 is a flowchart of an example method for compiler-optimized context switching.

For further explanation, FIG. 37 sets forth a flow chart illustrating a further exemplary method for compiler-optimized context switching according to embodiments of the present invention that includes: receiving 3602 an instruction indicating a preferred preemption point; storing 3604 the preferred preemption point in a data structure, determining 3606 that the preferred preemption point has been reached by a first thread, determining 3608 that preemption of a first thread for a second thread has been requested, and performing 3610 a context switch to the second thread.

FIG. 37 differs from FIG. 36 in that performing 3610 a context switch from the first thread to the second thread further comprises: determining 3702 one or more context registers of a plurality of context registers 3410 used by the first thread. The context registers 3410 comprise registers accessible to and modifiable by one or more executed threads. Determining the one or more context registers may comprise accessing a data structure (e.g., a compiler-generated table) indicating the one or more context registers as being in use by a function when the preferred preemption point is reached. For example, a compiler may generate a data structure for each function. A data structure entry for a given function may indicate a preferred preemption point within that function and the one or more context registers in use by the function at the preferred preemption point.

FIG. 37 further differs from FIG. 36 in that performing 3610 a context switch from the first thread to the second thread further comprises: saving 3703 one or more values stored in the determined one or more context registers 3410. This allows the values of registers used by the first thread to be later restored when performing a context switch back to the first thread. For example, the values may be saved to memory 3412. The values of the registers may also be saved to a cache, to other Random-Access Memory (RAM), to disk storage, or otherwise saved.

FIG. 37 further differs from FIG. 36 in that performing 3610 a context switch from the first thread to the second thread further comprises: overwriting 3706 each of the context registers 3410 (e.g., the determined one or more context registers 3410 and the remaining context registers 3410). Overwriting the context registers 3410 may comprise storing a "0" value, some other predefined value, or a randomly generated value into each of the context registers 3410. This may hereinafter be referred to as a "purge" phase of overwriting the context registers 3410. This prevents data leakage between threads that may occur by accessing, by one thread, values stored in registers used by another thread. The purge phase may be performed by a single instruction, or by a number of instructions that is less than or equal to the number of purged context registers 3410.

Overwriting the context registers 3410 may also comprise loading (e.g., "restoring"), into one or more of the context registers 3410, one or more saved values associated with the second thread. For example, the one or more values associated with the second thread may have been previously stored in the context registers 3410 and saved as a result of a context switch from the second thread. In other words, overwriting the context registers 3410 may comprise a "purge" phase during which a value is stored in each of the context registers, and a "restore" phase where saved values previously stored in context registers 3410 are reloaded into their respective context registers. Although the context registers 3410 into which a value is loaded in the "restore" phase were previously overwritten during the "purge" phase, this approach (where all context registers 3410 are purged prior to the restore phase) is more efficient than selectively overwriting or purging only those context registers 3410 not used by the second thread. As was set forth above, the context registers 3410 may exclude a stack pointer and/or instruction pointer. Accordingly, the stack pointer and/or instruction pointer would not be overwritten during the purge phase. After restoring the one or more saved context registers 3410 associated with the second thread and restoring the second thread's saved instruction and stack pointers, the processor 156 may then begin executing instructions of the second thread.

Performing the context switch from the first thread to the second thread may be facilitated by an exception handler, e.g., by exception handler 4010 of FIG. 40. For example, the processor 156 may set the PPPEO bit to "1," indicating that a PPPE has occurred. The processor 156 may also store (e.g., in one or more reserved bits of the BESCR Register 3408 or in another data structure or storage unit) an indication of the preferred preemption point that was reached to cause the PPPE to occur. For example, assuming a PPP Array 3706 size of N, M bits of the BESCR Register 3408 (or another register) may be used to indicate the PPP Array 3706 index of the preferred preemption point that was reached to cause the PPPE to occur where N=2^M. Assuming that the preferred preemption point at PPP Array 3706 index [i] caused the PPPE to occur, the processor 156 would then set the M bits to the value of [i]. These reserved M bits are hereinafter referred to as the PPPE Hash.

The processor 156 may then trigger the exception handler, e.g., exception handler 4010 of FIG. 40 is triggered. The exception handler would access the PPPEO bit, set to "1," to determine that the exception handler was triggered due to a PPPE. The exception handler would then access the PPPE Hash to determine an index [i] of the PPP Array 3706, and load the instruction address at PPP Array 3706 index [i]. The exception handler may then load the data structure entry corresponding to the loaded instruction address to determine which context registers 3410 must be saved in order to perform the context switch.

Figure 38:
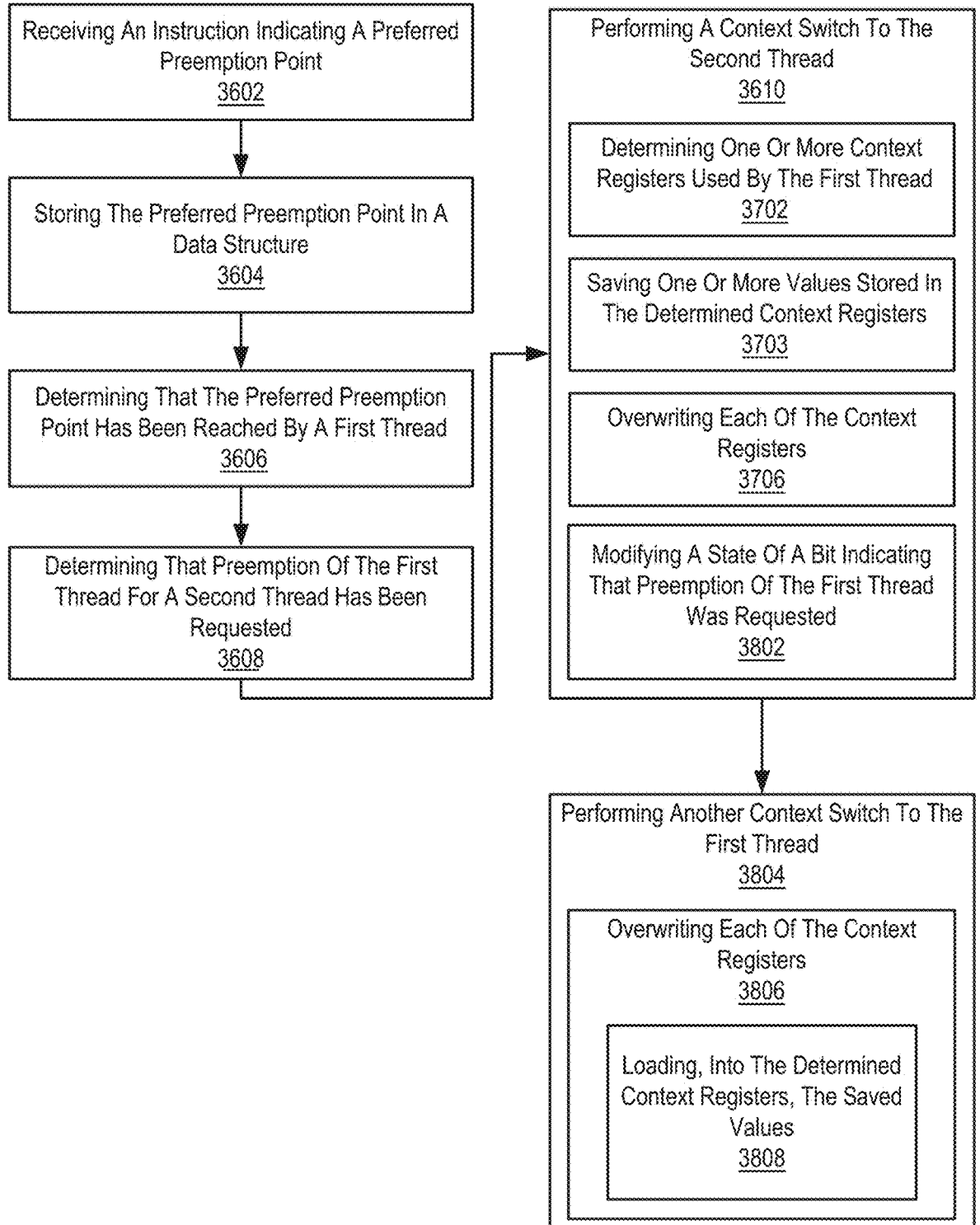
FIG. 38 is a flowchart of an example method for compiler-optimized context switching.

For further explanation, FIG. 38 sets forth a flow chart illustrating a further exemplary method for compiler-optimized context switching according to embodiments of the present invention that includes: receiving 3602 an instruction indicating a preferred preemption point; storing 3604 the preferred preemption point in a data structure, determining that the preferred preemption point has been reached by a first thread 3606, determining 3608 preemption of the first thread for a second thread has been requested, and performing 3610 a context switch to the second thread, where performing 3610 a context switch to the second thread further comprises: determining 3702 one or more context registers 3410 used by the first thread; saving 3703 one or more values stored in the determined context registers 3410; and overwriting 3706 each of the context registers 3410.

FIG. 38 differs from FIG. 37 in that, in the method of FIG. 38, performing 3610 a context switch to the second thread further comprises: modifying 3802 a state of the bit indicating that the operating system has requested preemption of the first thread (e.g., the PPPEE bit). For example, the PPPEE bit may be set to "0,". If used, the PPPEO bit may also be set to "0." The method of FIG. 38 further differs from FIG. 37 in that the method of FIG. 38 further comprises: performing 3804 another context switch back to the first thread. Performing the other context switch to the first thread may include: overwriting 3806 each of the context registers 3410 (e.g., by storing, into each of the context registers 3410, "0" or another value, thereby "purging" the context registers 3410), where overwriting 3806 each of the context registers 3410 includes loading 3808 (e.g., after "purging" the context registers), into the determined context registers 3410 (e.g., the context registers 3410 used by the first thread at the preferred preemption point) the saved values.

Figure 39:
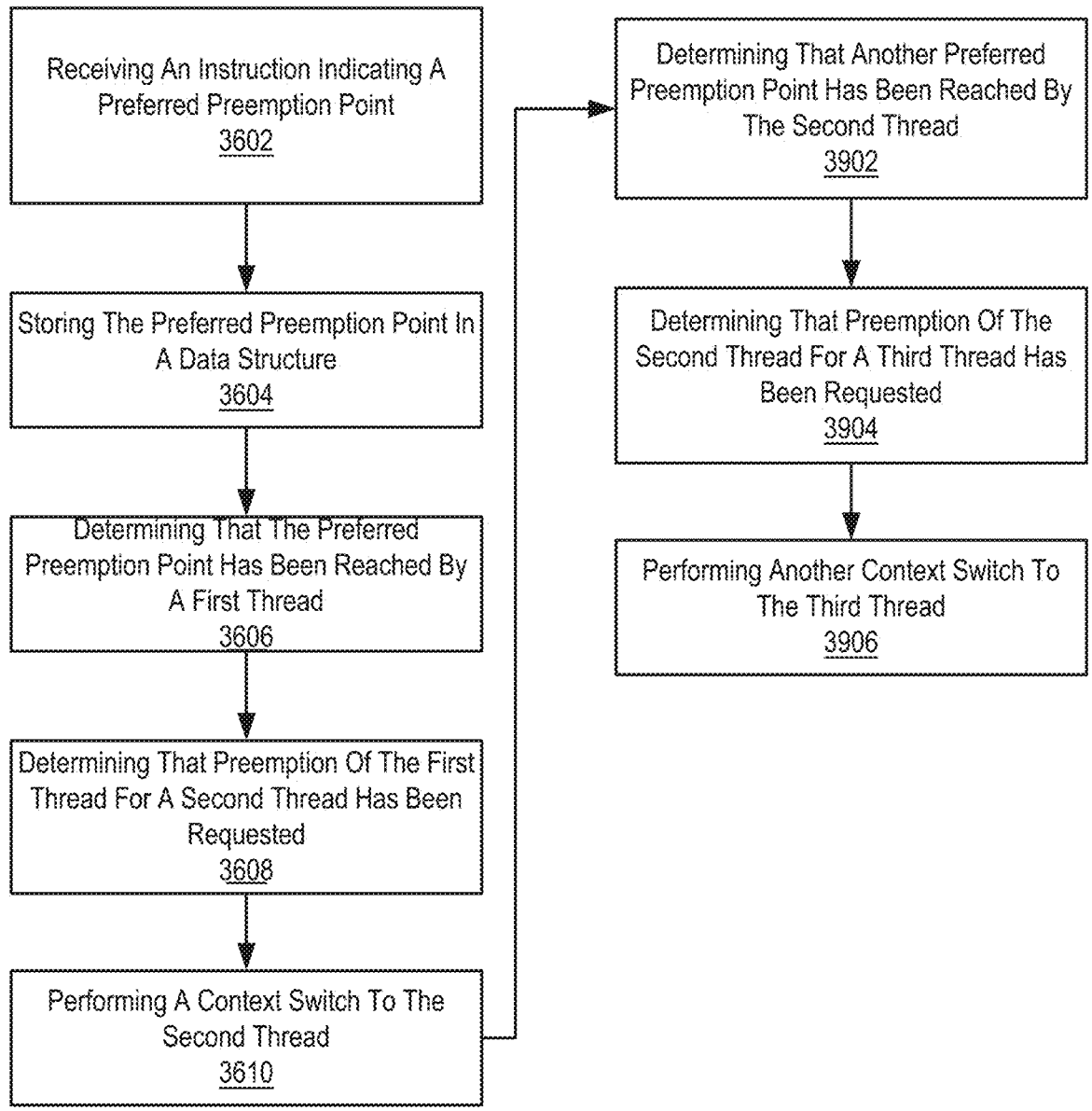
FIG. 39 is a flowchart of an example method for compiler-optimized context switching.

For further explanation, FIG. 39 sets forth a flow chart illustrating a further exemplary method for compiler-optimized context switching according to embodiments of the present invention that includes: receiving 3602 an instruction indicating a preferred preemption point; storing 3604 the preferred preemption point in a data structure, determining 3606 that the preferred preemption point has been reached by a first thread, determining that preemption of a first thread for a second thread has been requested 3608, and performing 3610 a context switch to the second thread.

FIG. 39 differs from FIG. 36 in that the method of FIG. 39 further comprises: determining 3902 that another preferred preemption point has been reached by the second thread (e.g., by comparing the current program counter value to the one or more entries in the PPP Array 3706), determining 3904 that preemption of the second thread has been requested by a third thread (e.g., based on a state of a PPPEO bit), and performing 3906 a context switch from the second thread to the third thread. Performing the context switch to the third thread may comprise determining one or more context registers 3410 used by the second thread and saving one or more values of the determined one or more context registers 3410. Performing the context switch to the third thread may also comprise overwriting each of the context registers 3410. Overwriting each of the context registers 3410 may include "purging" the context registers 3410 by storing a value (e.g., "0", a random value, another predefined value) in each of the context registers 3410. Overwriting each of the context registers 3410 may also include "restoring" one or more saved values associated with the third thread by loading these one or more saved values into their respective context registers 3410.

In view of the explanations set forth above, readers will recognize that the benefits of compiler-optimized context switching according to embodiments of the present invention include: (i) The use of instructions to identify preferred preemption points prior to encountering them during execution, requiring that these instructions need only be executed once for a processor to know the addresses of preferred preemption points for a given function. (ii) Reduced risk of data leakage between threads by overwriting context registers as part of a context switch. Efficiency may be increased by overwriting all context registers, instead of overwriting only selectively determined context registers. Further efficiency is achieved by overwriting all context registers using a single instruction. (iii) Reduced processing and time costs in performing a context switch by only saving values stored in registers used by a function at the preferred preemption point. and (iv) Leveraging reserved bits of existing registers for improved compatibility with existing processors.

Exemplary embodiments of the present invention are described largely in the context of a fully functional computer system for compiler-optimized context switching. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

Various embodiments of the present invention that provide compiler-optimized context switching in accordance with the present invention will now be discussed with reference to at least FIGS. 40-43. More specifically, exemplary computer implemented methods, computer systems/apparatus, and computer program products that (i) provide compiler-assisted context switching and that (ii) leverage instructions that can be recognized as preferred preemption points based, at least in part, on associated contexts that dictate the treatment of those instructions in accordance with the present invention and are described with reference to the accompanying drawings, beginning with FIG. 40.

FIG. 40 is a functional block diagram illustrating a data processing environment, generally designated 4000, in accordance with one embodiment of the present invention. Data processing environment 4000 includes computer 152, which is connected to network 4130. Computer 152 includes processor 156, compiler 312, rules 4125, and exception handler 4010. In general, compiler 312, when executer by processor 156, provides compiler-assisted context switching and leverage instructions that can be recognized as preferred preemption points based, at least in part, on associated contexts that dictate the treatment of those instructions in accordance with the present invention. As is understood, various embodiments of computer 152 may include some or all of the hardware, software, and functionality of computer 152 as-is described herein above with reference to at least FIGS. 2 and 34.

In various embodiments of the present invention, the computer 152 is a computing device that can be a standalone device, a server, a laptop computer, a tablet computer, a netbook computer, a personal computer (PC), or a desktop computer. In another embodiment, computer 152 represents a computing system utilizing clustered computers and components to act as a single pool of seamless resources. In general, computer 152 can be any computing device or a combination of devices with (i) access to processor 156, compiler 312, rules 4125, and exception handler 4010, and (ii) is capable of executing compiler 312, rules 4125 and exception handler 4010. Computer 152 may include internal and external hardware components, as depicted and described in further detail with respect to FIG. 43.

In this exemplary embodiment, compiler 312, rules 4125, and exception handler 4010 are stored on computer 152. However, in other embodiments, compiler 312, rules 4125, and exception handler 4010 may be stored externally and accessed through a communication network, such as network 4130. Network 4130 can be, for example, a local area network (LAN), a wide area network (WAN) such as the Internet, or a combination of the two, and may include wired, wireless, fiber optic or any other connection known in the art. In general, network 4130 can be any combination of connections and protocols that will support communications between computer 152, compiler 312, rules 4125, and exception handler 4010, in accordance with a desired embodiment of the present invention.

In exemplary embodiments, compiler 312 leverages rules 4125, and exception handler 4010 to modify which instructions that can be recognized as preferred preemption points based, at least in part, on associated contexts that dictate the treatment of those instructions in accordance with the present invention.

In exemplary embodiments, compiler 312 leverages and provides various approaches for context switching, including context switching outside of a kernel. In general, compiler 312 provides processes for determining the control points at which preemption can be most efficiently performed. In some embodiments of the present invention and scenarios, such approaches are applied by compiler 312 to general purpose tasks running on general purpose processors, with each task having a multiplicity of "preferred preemption points". In some embodiments of the present invention, compiler 312 leverages a mechanism used by an application thread to test whether a preemption yield is required. In some embodiments of the present invention, compiler 312 leverages relatively frequent checks for preemption yield requests. In some embodiments of the present invention, compiler 312 provides a hardware-assisted way to check for preemption yield requests, which, in most scenarios, has no penalty on execution of application code. In some embodiments of the present invention, compiler 312 provides certain benefits to real-time code written in userspace, as opposed to kernel space, i.e., it does not require all real-time code to be written in kernel space. In some embodiments of the present invention, compiler 312 provides context switching between user threads regardless of whether or not they have real-time scheduling constraints. In some embodiments of the present invention and scenarios, compiler 312 offers much more frequent preemption opportunities when compared to traditional preemption handling solutions. In some embodiments of the present invention, compiler 312 provides a decreased overhead for coordination between application threads and the operating system. In various embodiments of the present invention and scenarios, compiler 312 provides for generation, selection, and/or detection of preemption points such that the amount of state data that must be saved and restored at each preemption point is minimized when compared to traditional preemption handling solutions.

As described above with reference to FIGS. 36-39, a compiler in an embodiment of the present invention, such as compiler 312, selects preferred preemption points and performs the following two actions for each: (i) identifies an instruction or inserts into the code sequence an instruction that is recognized by the underlying hardware instruction dispatcher that preemption is preferred at a particular instruction address and (ii) inserts into the translated program a data structure, such as data table, that is consulted at run time by a preemption performing exception handler. This data structure supplies information regarding which registers are live at each of the preferred preemption points. In one embodiment and scenario, the preemption performing exception handler only saves and restores these registers when a context switch is required.

FIGS. 41A-41C shows exemplary annotated pseudocode (in which the main program is translated from code written in the C programming language) for eliminating an extra instruction to identify preferred preemption points according to one scenario and an embodiment of the present invention.

Figure 42:
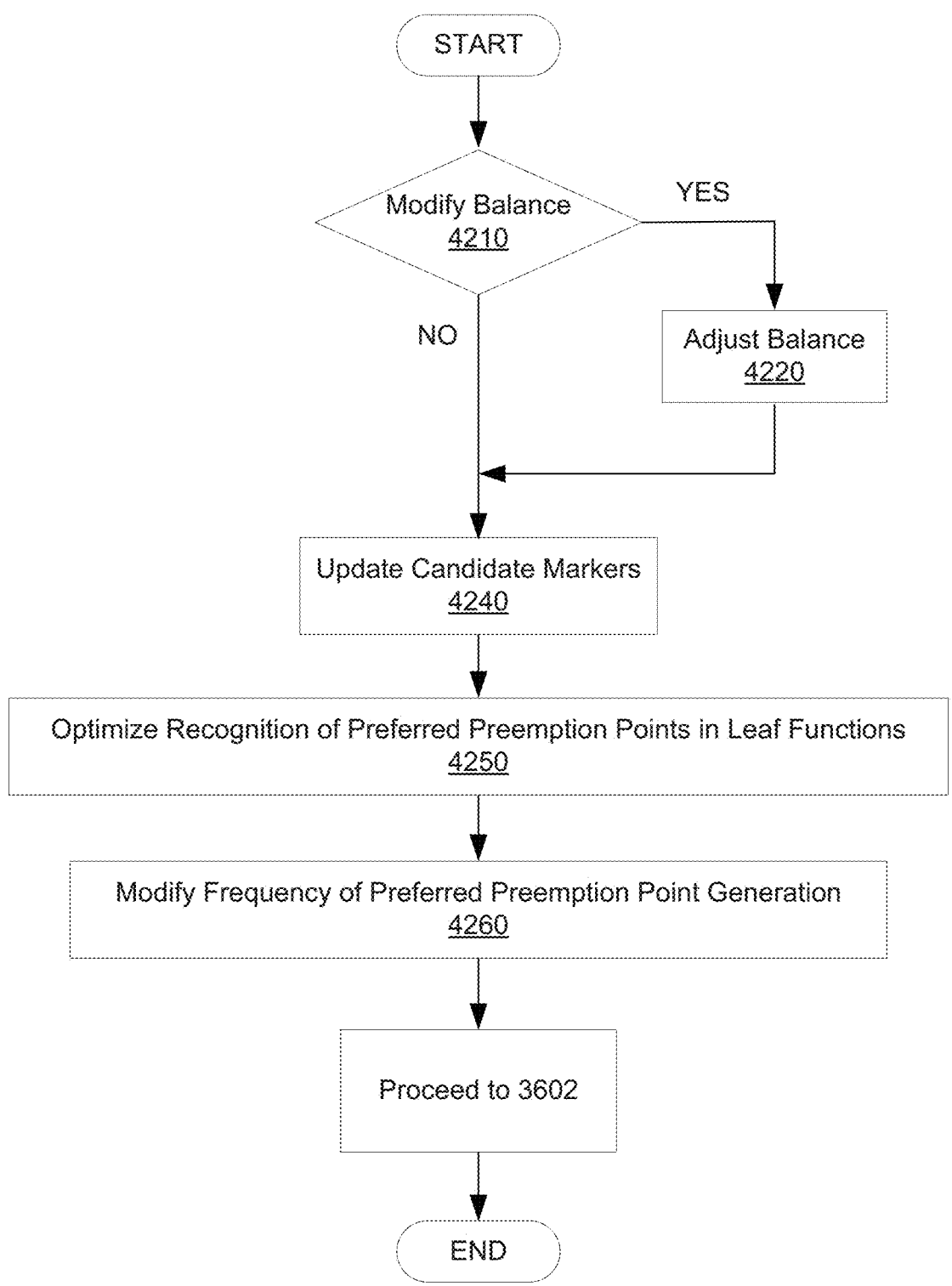
FIG. 42 illustrates operational processes of a compiler program, executing on a computing device within the environment of FIG. 40, in accordance with an exemplary embodiment of the present invention.

FIG. 42 illustrates operational processes of compiler 312, executing on computing device within the environment of FIG. 40, in accordance with an exemplary embodiment of the present invention. In general, FIG. 42 depicts a flowchart illustrating an example method for compiler-optimized context switching in accordance with one embodiment of the present invention.

In certain embodiments of the present invention, the implementation mechanisms of FIG. 42 further encompass and otherwise add to the processes that are described with reference to FIGS. 4-6, 33, and 36-39. Certain additional details and embodiments of the present invention are described hereinafter:

In decision process 4210, the compiler 312 determines whether or not to modify the balance between the number of volatile registers and the number of non-volatile registers. In general, the compiler 312 determines whether or not to modify the balance between the number of volatile registers and the number of non-volatile registers based on a rule, which may include a threshold, that is included in rules 4125. For example, rules 4125 include a rule that dictates that the balance between the number of volatile registers and the number of non-volatile registers should be adjusted such that the number of volatile registers is much larger than the number of non-volatile registers (e.g., a ratio such as 10:1). As such, rules 4125 determine the current balance between the number of volatile registers and the number of non-volatile registers in the computer 152 and compares that value to a required balance value included in rules 4125. In some embodiments of the present invention, if the difference between the required balance and the determined balance exceeds a balance threshold, then the compiler 312 determines that a modification to the actual balance is to be performed, such a difference between the new balance and the required balance is at most equal to the balance threshold.

In general, embodiments of the present invention recognize and leverage rules, included in rules 4125, that dictate that it is safe for application code, generated according to the conventions of a new ABI that has an increased number of volatile registers, to call library services provided by code generated according to a legacy ABI that has a smaller number of volatile registers. In general, embodiments of the present invention recognize and leverage rules, included in rules 4125, that dictate that if a library code calls back into the application code, then it is necessary to save those registers that are considered volatile in the new ABI but not in the legacy ABI. In some embodiments of the present invention and scenarios, this is achieved by providing context-saving wrapper functions around any function pointer that is passed into the library code.

If the compiler 312 determines that the modification to the balance between the number of volatile registers and the number of non-volatile registers is necessitated (decision process 4210, yes branch), then compiler 312 proceeds to process 4220.

In process 4220, compiler 312 adjusts the balance between the number of volatile registers and the number of non-volatile registers such that they are in compliance with one or more rules included in rules 4125.

If compiler 312 determines that the modification to the balance between the number of volatile registers and the number of non-volatile registers is not necessitated (decision process 4210, no branch), then compiler 312 proceeds to process 4240.

In process 4240, the compiler 312 generates updated candidate markers by modifying which instructions are considered as candidate markers for preferred preemption points.

For example, the compiler 312 recognizes that a stdux instruction is used instead of stdu to set up an activation frame whose size depends on a function's incoming arguments. As such, the compiler 312 treats the stdux instruction as a candidate marker for a preferred preemption point.

In another example, compiler 312 issues an add instruction with target and source registers both identified as register 1 (the stack pointer) that is used to remove an activation frame whose size depends on a function's incoming arguments. As such, the compiler 312 treats the add instruction as a candidate marker for a preferred preemption point.

In another example, for a 32-bit target, the stwu and stwux instructions serve the role of stdu and stdux on a 64-bit target. As such, the stwu and stwux instructions are recognized, by compiler 312, as candidate markers for preferred preemption points when programs are executing in 32-bit mode.

In another example, for a 32-bit target, the addi instruction may be represented by an addi followed by mr, where the target of the mr instruction is register 1 (the stack pointer). Thus, based on the code pattern of the addi following the mr in which the target of the mr instruction is register 1, the code pattern of an addi followed by an mr instructions is recognized by the compiler 312 as a candidate marker for a preferred preemption point. In this embodiment, a rule included in rules 4125 dictates that an instruction that immediately follows an stdu or addi instruction to be considered as a candidate for a preferred preemption point if the target and source of the instruction is register 1 (the stack pointer).

In some embodiments of the present invention, other languages and other compilers can have different "common use cases". As such, in some embodiments of the present invention, rules 4125 include a survey of common usage patterns that the compiler 312 leverages to guide the choice of which instructions are considered implicit preferred preemption points. For example, with an object-oriented language like Java, the bctrl instruction which is used to implement virtual method invocations occurs very frequently and typically represents a control point at which preemption is preferable. Thus, the bctrl instruction may be recognized as a preferred preemption point when an application is running in the Java mode of execution.

In some embodiments of the present invention, rules 4125 include a set of rules that dictate that the compiler 312 generate special instructions that are recognized as preferred preemption points and that have associated contexts, which are not the prologue contexts or epilogue contexts, that motivate special treatment of a particular set of instructions.

In one such embodiment, whenever the compiler 312 generates and emits an instruction that normally marks a preferred preemption point into a context that is actually not a preferred preemption point, the compiler 312 also generates a data structure entry that identifies the registers that must be saved in case preemption is triggered at that execution point. Thus, the occurrence of this instruction is treated as a preferred preemption point by the processor 156 even though the amount of contextual information that must be saved and restored at context switch time is higher than the typical preferred circumstance.

In another such embodiment, whenever the compiler 312 generates an instruction that otherwise marks a preferred preemption point but further has a context that is not included in a set of contexts associated with preferred preemption points, the compiler 312 generates a sentinel entry within the data structure to identify that this control point is really not a preferred preemption point. When a context-switching event handler 4010 executes, for example, the context-switching event handler consults this data structure and determines, based on the sentinel entry, that the instruction does not mark a preferred preemption point. The context-switching event handler then sets the machine state to continue looking for a preferred preemption point and immediately returns, thereby resuming execution of the running thread via the processor 156.

In another such embodiment, the compiler 312 reduces the occurrence of falsely identified preferred preemption points by treating selected instructions as preferred preemption points only if they occur in particular contexts that are associated with preferred preemption points. For example, in one such embodiment, the compiler 312 follows a rule, included in rules 4125, that dictates that stdu and stdux instructions are only treated as preferred preemption points if they follow execution of one of a branch-and-link instructions that has not already been followed by a stdu or stdux instruction. As such, when the compiler 312 emits a stdu or stdux instruction and the compiler 312 determines that the emitted stdu or stdux instruction is preceded by another occurrence of the stdu or stdux instruction along every path from the current function's entry point, the compiler 312 determines that this newly emitted stdu or stdux instruction will not be recognized as a preferred preemption point by the processor 156 based on the result of that determination and the rule. Thus, the compiler does not generate an entry within the data structure that identifies which registers must be saved and restored if a context switch occurs at this point in the program's execution.

In another such embodiment, the processor 156 provides a bit as part of each thread's execution state that denotes whether the thread is running in legacy mode or cooperative-preemption mode. Binaries compiled for legacy architectures run in the legacy mode. In some scenarios and embodiments of the present invention, certain rules included in rules 4125 dictate that potential preferred preemption points that have certain associated contexts, which are not included in a set of contexts associated with actual preferred preemption points, trigger the compiler 312 to generate instructions that temporarily switch the thread's status to legacy mode, which enables the compiler 312 to emit instructions that are normally treated as preferred preemption points into legacy-mode applications where they will not be treated by the processor 156 as preferred preemption points.

In another such embodiment, the processor maintains multiple bits as part of each thread's execution state and leverages these bits to denote one of multiple possible execution modes. This may be useful if, for example, code derived from different source languages or different compiler versions conforms to different code generation protocols. For example, the prologue and epilogue conventions for a Go program may be different than each of: (i) the prologue and epilogue conventions for a Java program, (ii) the prologue and epilogue conventions for a modernized 64-bit C program, (iii) the prologue and epilogue conventions or for a legacy 64-bit C program, and (iv) the prologue and epilogue conventions for a legacy 32-bit C program. In one such embodiment, the options are simplified by the processor 156 not addressing the large diversity of legacy practices. Instead, in one such embodiment, rules 4125 include a description of the conventions supported by a given new processor 156 and compiler 312 adjusts its code generation behavior to conform to those new conventions.

In another such embodiment, new forms of instructions are generated by the compiler 312 that distinguish between legacy-mode behavior and cooperative-preemption mode behavior. As such, when the compiler 312 introduces a preferred preemption point, the compiler 312 uses the form of the instruction that denotes that this instruction is a preferred preemption point. If the compiler 312 determines that a preferred preemption point is not to be introduced, the compiler 312 uses the legacy-mode instruction. In some embodiments of the present invention, since most opcodes are already assigned, it is required that the cooperative-preemption mode instructions use a multi-word opcode. Such embodiments of the present invention leverage processing characteristics to dictate how and when preferred preemption points are identified and instructions representing preferred preemption point are generated. Examples of processing characteristics include, but are not limited to, instruction prefetch efficiency and instruction cache efficiency which may be degraded with the use of larger instruction encodings. Therefore, some embodiments of the present invention may leverage various rules included in rules 4125 to control how and when preferred preemption points are identified and instructions regarding preferred preemption points are generated in certain scenarios that have certain processing conditions. For example, when one or both of the instruction prefetch efficiency and instruction cache efficiency are predicted to be degraded to below a threshold, it is to be understood that the compiler 312 can recognize those scenarios/processing conditions and select available modes of operation accordingly.

In the embodiments of the present invention disclosed herein, the compiler 312 has several modes of operation that may be selected based on determined processing conditions. In the embodiments of the present invention disclosed herein, the compiler 312 may switch between these several modes of operation at any point after the candidate markers have been updated. In some embodiments of the present invention and scenarios, there are situations in which the compiler 312 generates/transmits special instructions that are recognized as preferred preemption points based on additional contexts that (i) are not the prologue or epilogue contexts and (ii) that motivate a special treatment of those special instructions. The following describes several possible modes of operation for a compiler for generation, recognition, and treatment of such special instructions. Some embodiments of the present invention exclusively operate using only one such possible mode. In other embodiments of the present invention, the additional context/processing characteristics of a given scenario are detected and the compiler 312 selects a mode of operation that best matches those additional context/processing characteristics.

In one such embodiment, in a first mode of operation, the compiler 312 generates/emits an instruction that includes (i) an indication that a given control point is a preferred preemption point and (ii) an indication that the control point is associated with a context that is excluded from a set of contexts that are associated with preferred preemption points. In response to the generation/transmission of such an instruction, the compiler 312 generates an entry in the data structure to identify the registers that must be saved in case preemption is triggered at that execution point, i.e., at the preferred preemption point. Some embodiments of the present invention recognize that such a scenario may be a relatively rare event. Therefore, the extra effort required to save and restore the relatively large number of registers that must be preserved if a context switch occurs at one of these control points may be predicted to have a minimal impact on the overall system performance. Therefore, treating these non-ideal control points as preferred preemption points is considered an acceptable tradeoff.

In one such embodiment, in a second mode of operation, the compiler 312 generates/emits an instruction that (i) includes an indication that a given control point is a preferred preemption point and (ii) that the control point is associated with a context that is excluded from a set of contexts that are associated with preferred preemption points. In response to compiler 312 generating/transmitting an instruction, the compiler 312 either (a) does not generate a data structure entry in a data structure to identify the live registers at that control point, or (b) it generates/emits a sentinel entry within the data structure to identify that this control point is really not a preferred preemption point. As such, when the context-switching event handler executes, the context-switching event handler (i) consults the data structure and determines that the triggered control point does not correspond to an actual preferred preemption point, (ii) sets the machine state to continue looking for a preferred preemption point, and (iii) immediately returns, i.e., the system resumes execution of the currently running thread.

In one such embodiment, in a third mode of operation, to reduce the occurrence of false identification of preferred preemption points, selected instructions may be treated as preferred preemption points only if they occur in particular contexts. In one such embodiment, the stdu and stdux instructions are only treated as preferred preemption points if the stdu and stdux instructions follow an execution of a branch-and-link instruction that has not already been followed by a stdu or stdux instruction.

In one such embodiment, in a fourth mode of operation, a bit is provided as part of each thread's execution state and that bit denotes whether or not the thread is running in legacy mode or cooperative-preemption mode. Some embodiments of the present invention recognize that binaries compiled for legacy architectures are run in the legacy mode. In such an embodiment, if the compiler 312 is set to use preferred-preemption-marking instructions along with contexts that are not associated with preferred preemption points, then the compiler 312 generates/emits instructions to temporarily switch the thread's status to legacy mode.

In one such embodiment, in a fifth mode of operation, multiple bits are provided as part of each thread's execution state and those bits denote one of multiple possible execution modes. Some embodiments of the present invention recognize that such an approach may be useful if, for example, there is code that derived from different source languages or if different compiler versions conform to different code generation protocols. For example, in one scenario, the prologue and epilogue conventions for a Go program are different from all of: (a) the prologue and epilogue conventions for a Java program, (b) the prologue and epilogue conventions for a modernized 64-bit C program, (c) the prologue and epilogue conventions for a legacy 64-bit C program, and (d) the prologue and epilogue conventions for a legacy 32-bit code model C program. In one such embodiment, the options are simplified by not addressing the large diversity of legacy practices. In one embodiment, there is a description of the conventions supported by a given new hardware and a compiler adjusts its code generation behavior to conform to those new conventions.

In one such embodiment, in a sixth mode of operation, the set of instructions that are recognized as preferred preemption points is set by each application using special instructions to load masks, patterns, and certain other information into special purpose registers which are used for the purpose of determining the instructions that represent preferred preemption points. A mask identifies which bits of an operation code are considered relevant in the matching of an instruction against a pattern. If the bits of an instruction's operation code are logically anded with the mask and the result equals the pattern, this instruction is considered to represent a preferred preemption point. Certain other information which may also be loaded into special purpose registers for the purpose of enabling programmable preemption point detection may include for each of the preferred-preemption-point mask/pattern pairs a required prefix mask/pattern pair representing an instruction that must precede a matched preferred-preemption-point pattern, an exclusion mask/pattern pair which represents instructions that must not appear between an occurrence of the prefix instruction and the candidate preferred-preemption-point instruction, and an integer proximity value which represents the maximum number of instructions between an occurrence of an instruction matched by the prefix pattern and an instruction matched by the preferred-preemption-point pattern.

In one such embodiment, in a seventh mode of operation, new forms of instructions are provided/generated/transmitted that distinguish between legacy-mode behavior and cooperative-preemption mode behavior. As such, when the compiler 312 introduces a preferred preemption point, the compiler 312 uses the new form of the instruction to distinguish between legacy-mode behavior and cooperative-preemption mode behavior. If compiler 312 determines that a preferred preemption point is not to be introduced, then the compiler 312 uses the legacy-mode instruction. In some embodiments of the present invention, since most operation codes (i.e., opcodes) are already assigned, it is required that the cooperative-preemption mode instructions use a multi-word opcode. Such embodiments of the present invention recognize that processing characteristics such as, but not limited to, instruction prefetch and instruction cache efficiency, may be degraded with the use of larger instruction encodings. Therefore, some embodiments of the present invention may prohibit the use of this mode of operating in certain scenarios that have certain processing conditions, e.g. when one or both of instruction prefetch and instruction cache efficiency may be degraded to below a threshold. As such, it is to be understood that the compiler 312 can recognize those scenarios/processing conditions and select available modes of operation accordingly.

In process 4250, the compiler 312 optimizes the recognition of preferred preemption points in leaf functions. The compiler 312 identifies preferred preemption points within very small leaf functions, some of which may not build an activation frame. To support these functions, some embodiments of compiler 312 treat the blr instruction, which represents return from function call, as a preferred preemption point. Some embodiments of the present invention recognize that treating the blr instruction as a preferred preemption point may require the compiler 312 to generate live-register information at the point that immediately follows the blr instruction, even though the next instruction to execute is in the caller's code sequence. When a pattern representing a conditional or unconditional branch instruction is recognized by the processor 156 as a preferred preemption point, the processor 156 may be configured to treat the instruction address that follows the branching instruction (sometimes known as a branch-delay slot in some RISC computer architectures) as the "preferred preemption point" even though control branches around the following instruction. This allows the compiler 312 to emit a single entry in the preemption-point data structure which identifies the live-register information associated with the preferred preemption point rather than having to provide entries for each possible destination address of the branch. In some embodiments of the present invention and scenarios, if the blr instruction is treated as a preferred preemption point, then there is less incentive to treat the addi to target and source register 1 instruction as a preferred preemption point. In many embodiments of the present invention and scenarios, the blr instruction will occur within ten instructions or so of the occurrence of the addi instruction.

In some embodiments of the present invention and scenarios, the compiler 312 and processor 156 are configured to support either (a) treating the blr instruction as a preferred preemption point or (b) treating the addi to target and source register 1 instruction as a preferred preemption point. However, some embodiments of the present invention leverage both of these options, i.e., both (a) and (b), since the preferred preemption point at the addi instruction typically has much less state to be saved and restored when compared to a corresponding blr instruction that is treated as a preferred preemption point. Some embodiments of the present invention recognize that if both types of preemption points, i.e., both (a) and (b), are supported, it is much more likely that the preemption point associated with the addi instruction will be encountered, since there is typically more code in the function body than in the function epilogue. Some embodiments of the present invention recognize that supporting both instructions may make the hardware of such a system more complex and more expensive. Some embodiments of the present invention recognize that supporting both instructions may also require larger data structures, e.g., larger data tables, to be generated by compiler 312 to identify the live registers at each preferred preemption point. In some embodiments of the present invention, where only one of the two options, i.e., either (a) or (b), can be supported by hardware, then the blr instruction, not the addi instruction, may be treated as a preferred preemption point since this instruction provides reliable epilogue preemption point for both (i) functions that establish activation frames and (ii) functions that do not establish activation frames.

In process 4260, compiler 312 modifies the particular frequency of preemption points that are in the generated code. In some embodiments of the present invention and scenarios, there is no required particular frequency for preemption points to exist in the generated code. Some embodiments of the present invention recognize that the compiler 312 may, however, be configured, based on rules included in rules 4125, to guarantee that a maximum execution time interval between consecutive preferred preemption points is less than or equal to preemption latency parameter 450, as described with reference to at least FIGS. 4-6. As such, in some embodiments of the present invention, the compiler 312 is configured to only generate, and may remove, certain preferred preemption points into or out of areas of code such that the resulting code has a maximum execution time interval between consecutive preferred preemption points that is at most equal to preemption latency parameter 450.

Some embodiments of the present invention recognize that, in a scenario where (i) an operating system 3510 or managed run-time environment 310 requests preemption of a running thread, e.g., thread 309, and (ii) the thread does not yield sufficiently quickly, that the operating system 3510 or managed run-time environment 310 may initiate a traditional operating system context switch for that thread, which may result in the saving and restoration of all registers. In some embodiments of the present invention and scenarios, this behavior by the operating system 3510 or managed run-time environment 310 occurs in response to expiration of a timeout alarm that is set and handled by operating system 3510 or managed run-time environment 310.

Following process 4260, compiler 312 returns to Process 3602.

In one exemplary embodiment, compiler 312 determines (i) a set of possible locations for preferred preemption points in a set of functions based on an identification of a set of candidate markers for preferred preemption points and (ii) a type of context that is associated with a possible location included in the set of possible locations, and (iii) generates a modified set of possible locations in a data structure based on the type of context, wherein the modified set of possible locations indicate one or more preferred preemption points in the set of functions.

In at least one embodiment, the compiler 312 compares the type of context to a set of contexts that are associated with types of preferred preemption points.

In at least one embodiment, the compiler 312 (i) determines that the type of context satisfies one or more rules that govern creation of preferred preemption points and (ii) generates an entry in the data structure that indicates an instruction address associated with the preferred preemption point.

In at least one embodiment, the compiler 312 (i) determines that the type of context fails to satisfy one or more rules that govern creation of preferred preemption points and (ii) generates an entry in the data structure that indicates that the possible location corresponds to a site in a given function that is unavailable as a preferred preemption point, wherein given function is included in the set of functions.

In at least one embodiment, the compiler 312 determines the type of context based on a pattern of instructions in the function that are associated with the possible location, wherein, in the function, the possible location immediately follows a set of instructions included in the pattern of instructions.

In at least one embodiment, the compiler 312 (i) determines that a ratio of non-volatile registers to volatile registers exceeds a threshold and (ii) adjusts the ratio of volatile registers to non-volatile registers such that (a) the number of volatile registers is larger than the number of non-volatile registers and (b) the ratio of non-volatile registers to volatile registers is greater than or equal to the threshold.

In at least one embodiment, the compiler 312 (i) determines a threshold that corresponds to a maximum allowable execution time interval between consecutive preferred preemption points, and (ii) generates an updated set of possible locations for preferred preemption points in the set of threads by further modifying the modified set of possible locations such that a maximum execution time interval between two consecutive preferred preemption points in the updated set of possible locations is less than or equal to the threshold.

In at least one embodiment, compiler 312 generates an instruction that includes (i) an indication that a given control point in the thread is a preferred preemption point, (ii) an indication that the given control point is associated with a context that is excluded from the set of contexts that are associated with types of preferred preemption points, and (iii) an entry in the data structure that identifies a register that must be saved if preemption is triggered at the given control point.

In at least one embodiment, compiler 312 generates (i) an instruction that (a) includes an indication that a given control point corresponds to a type of preferred preemption point and (b) that the given control point is associated with a context that is excluded from the set of contexts that are associated with types of preferred preemption points and (ii) a sentinel entry within the data structure that indicates that the given control point is not a preferred preemption point, and (iii) prevents preemption at the given control point based on the sentinel entry.

In at least one embodiment, the operating system 35120 or the managed run-time environment 310 generates one or more bits as part of an execution state of a given thread that is included in the set of threads, wherein the one or more bits indicate a given execution mode included in a set of possible execution modes, wherein each possible execution mode of the set of possible execution modes includes a set of processing behaviors for processing the set of threads.

In at least one embodiment, the compiler 312 generates a preferred preemption point in the given function using a type of instruction that distinguishes between a processing behavior of the given execution mode and respective processing behaviors of other execution modes included in the set of possible execution modes.

In at least one embodiment, the operating system 3510 or the managed run-time environment 310 (i) generates a bit as part of an execution state of a given thread included in the set of threads, wherein the bit denotes whether the given thread is running in a legacy mode or a cooperative-preemption mode, (ii) determines that a current execution mode permits use preferred-preemption-marking instructions along with contexts that are excluded from the set of contexts that are associated with types of preferred preemption points, and (iii) wherein the compiler 312 generates an instruction to temporarily switch a status or execution mode of the thread to initiate processing of the given thread using legacy mode.

In at least one embodiment, the cooperative-preemption mode instructions for preferred preemption points include multi-word operation codes.

In at least one embodiment, the compiler 312 restricts the use of a particular execution mode included in a set of possible execution modes based on a determination that use of that the particular execution mode will create an unacceptable processing condition.

In at least one embodiment, the compiler 312 (i) determines that a new alternative encoding of an instruction has been introduced that is used to indicate possible locations for a type of preferred preemption point, and (ii) associates the new encoding of the instruction with a version of the instruction that is not recognized as indicating the possible locations for the type of preferred preemption point.

In one embodiment, a method of compiler-optimized context switching is provided. The method comprising: determining that an instruction represents a preferred preemption point based on a determination that bits of an opcode representation of the instruction match a particular pattern; determining that the preferred preemption point has been reached by a first thread based on pattern matching of an instruction opcode that is to be decoded; determining that preemption of the first thread for a second thread has been requested; and performing a context switch from the first thread to the second thread.

In one embodiment, the method comprises: determining that the instruction has completed execution; and initiating the context switch from the first thread to the second thread.

In one embodiment, a method of compiler-optimized context switching is provided. The method comprising: using an address of a given preempted instruction to compute a hash index; before the context switch, using the hash index to consult a table provided by a compiler, wherein an entry within the table indicates a set of context registers that are live at a time when the given preempted instruction is to be preempted; saving the values of each live context register into a private memory of the first thread; saving a current instruction and a set of stack pointers of the first thread; and suspending execution of an event-based branch handler of the first thread.

In one embodiment, the method comprises: determining that a period of time has elapsed after execution of the first thread was suspended; clearing the contents of all context registers; restoring the current instruction and the set of stack pointers of the first thread; resuming execution of the event-based branch handler of the first thread, wherein the event-based branch handler restores the values to the set of context registers; and resuming execution of instructions included in the first thread starting with an instruction that follows the preferred preemption point.

In one embodiment, the method comprises: determining that that the bits of the opcode representation of the instruction matching the particular pattern is a false-positive for the preferred preemption point based on based on information encoded in an entry of a table provided by a compiler, wherein the event-based branch handler consults the table provided by the compiler; and resuming execution of the original thread with the instruction that follows the preferred preemption point.

In one embodiment, the set of instruction opcode patterns represent preferred preemption points are adjusted at run-time by executing non-privileged instructions at the interfaces between different execution models.

In one embodiment, a number of sets of preemption-identifying instruction patterns are hard coded into the circuitry of a processor, and, at run-time, application code activates the each of the sets of preemption-identifying instruction patterns one at a time. For example, a new instruction is added which selects which set of preemption-identifying instruction patterns to treat as "active". In one embodiment, three bits of the opcode are reserved to select between 8 sets of instruction patterns. In one embodiment, the different sets of instructions are chosen at computer design time, based on usage patterns for typical important workloads, recognizing that different instruction patterns may represent the preferred preemption points for different workloads.

In one embodiment, the number of sets of preemption-identifying instruction patterns are supplied by application code, of an application program, as patterns at run time. For example, a new ISA instruction within which the opcode dedicates 5 bits to represent the pc-relative address of an in-memory 512-bit configuration vector. In this example, these 5 bits are the op_code bits. The configuration vector's effective address is computed as follows: (pc & ~0x3f)+ (op_code_bits*64), wherein op_code_bits are treated as a signed quantity ranging from −16 to 15. The control block holds encodings for up to 8 patterns and patterns are numbered from 0 to 8. Each pattern is represented by two 32-bit words. (This invention assumes 32-bit instruction encodings. Generalizing to 64-bit instructions or to variable length instructions can be easily accomplished by one skilled in the art.) The first word represents a mask identifying the bits of the pattern that must be matched, with 1 indicating that this bit is included in the comparison. The second word holds each of the bit values that must be matched. For each bit of the first word that holds a zero, the corresponding bit of the second word must also hold a zero. For any entry in the mask array that has value 0, the corresponding pattern matching is considered to be disabled.

The following structure is loaded directly from aligned memory as a 512-bit "vector":

```
struct {
    unsigned int mask [8];
        unsigned int content [8];
}
```

The array is assumed to be aligned on an address that is a multiple of 16 32-bit words (i.e. a multiple of 64 bytes). During instruction decode, parallel circuitry implements the equivalent of the following (in parallel), in which parallel circuitry represents each potential match based on:
define opcode_matches(i) ((opcode & mask [i]) == content [i])
In parallel, ask if any candidates match:

```
for (int i = 0; i < preferred_preemptions.candidates; i++) {
    if (opcode_matches (i))
        Signal preferred preemption point found for next machine cycle;
}
```

In one embodiment, the occurrence of certain instructions that match patterns belonging to certain of the number of sets of preemption-identifying instruction patterns is only counted as identification of a preferred preemption point if the matched instruction is preceded by execution of a certain prefix instruction at a certain maximum distance from the candidate matched instruction and there is no intervening instruction that disqualifies the prefix instruction.

In one example, the "stdu 1,?,1" or "stdux 1,?,1" instructions are only recognized as preferred preemption points if they are preceded by some form of branch-and-link instruction at a distance of no more than 32 instructions and there is no other "stdu 1,?,1" or "stdux 1,?,1" instruction between the branch-and-link instruction and the candidate "stdu 1,?,1" or "stdux 1,?,1" instructions.

In one embodiment, certain of the preemption-identifying patterns, included in the number of sets of preemption-identifying instruction patterns, are only considered eligible for matching if preceded by a particular prefix instruction at a distance of not more than a number of instructions from a given candidate matched instruction and not preceded by an occurrence of a particular non-intervening instruction between the prefix instruction and the given candidate matched instruction.

In one example, a new ISA instruction within which the opcode dedicates 5 bits, the op_code bits, to represent the pc-relative address of an in-memory 512-bit configuration vector. The configuration vector's effective address is computed as follows: (pc & ~0x3f)+(op_code_bits*64). Treat op_code_bits as a signed quantity ranging from −16 to 15.

In one example and embodiment, the control block holds encodings for up to 7 patterns. Patterns are numbered from 0 to 6. Pattern number 7 is a special code representing "no pattern". Each pattern can serve to represent a preferred preemption candidate. Additionally, each pattern can also present a required prefix that must precede the matching of a particular preferred preemption candidate pattern and/or may represent an exclusion pattern that identifies instructions that may not appear between the match of a prefix pattern and the match of a preferred preemption candidate.

In one example and embodiment, each pattern is represented by two 32-bit words. While, this example and embodiment assumes 32-bit instruction encodings, it is understood that generalizing to 64-bit instructions or to variable length instructions can be easily accomplished by one having ordinary skill in the art. In one example and embodiment, the first word represents a mask identifying the bits of the pattern that must be matched, with 1 indicating that this bit is included in the comparison. The second word holds each of the bit values that must be matched. For each bit of the first word that holds a zero, the corresponding bit of the second word must also hold a zero.

In one embodiment, the following structure is loaded directly from aligned memory as a 512-bit "vector":

```
*/
struct {
```

-continued

```
    unsigned int mask [7];
    unsigned int content [7];
    unsigned long long int packed_data;
/* packed_data is a bit field with the following masks
                representing relevant information:
    0x0000000000000007: candidates
    0x0000000000000038: prefixes [0]
    0x00000000000001c0: prefixes [1]
    0x0000000000000e00: prefixes [2]
    0x0000000000007000: prefixes [3]
    0x0000000000038000: prefixes [4]
    0x00000000001c0000: prefixes [5]
    0x0000000000e00000: prefixes [6]
    0x0000000007000000: nonintervener [0]
    0x0000000038000000: nonintervener [1]
    0x00000001c0000000: nonintervener [2]
    0x0000000e00000000: nonintervener [3]
    0x0000007000000000: nonintervener [4]
    0x0000038000000000: nonintervener [5]
    0x00001c0000000000: nonintervener [6]
    0x0000e00000000000: maxdistance [0]
    0x0007000000000000: maxdistance [1]
    0x0038000000000000: maxdistance [2]
    0x01c0000000000000: maxdistance [3]
    0x0e00000000000000: maxdistance [4]
    0x7000000000000000: maxdistance [5]
    0x8000000000000000: maxdistance [6]
*/
}
```

In one example and embodiment, the candidates field represents the number of preferred preemption point patterns, from 0 to 6. In one example and embodiment, values of 0 and 7 in the candidate's field are reserved for future use. In one example and embodiment, prefixes [i] represents the number of the pattern that represents a prefix instruction that must be seen before candidate pattern [i] is recognized. If prefixes [i] equals 7, then it means that this candidate pattern has no prefix instruction requirement. In addition, maxdistance [i] represents the maximum number of instructions that may execute following recognition of the prefix instruction and before recognition of the candidate pattern. The 3-bit value is interpreted according to the following 3-bit value meanings:

0 means 0 maximum intervening instructions
1 means 1 maximum intervening instructions
2 means 2 maximum intervening instructions
3 means 4 maximum intervening instructions
4 means 8 maximum intervening instructions
5 means 64 maximum intervening instructions
6 means 128 maximum intervening instructions
7 means 256 maximum intervening instructions In one example and embodiment, the maxdistance [6] entry has a single bit. In one example and embodiment, the interpretation of this bit is as follows:

1-bit value Meaning:
0 means 0 maximum intervening instructions
1 means 256 maximum intervening instructions In one example and embodiment, nonintervener [i] represents a pattern for instructions that may not occur follow-

```
#define NO_PATTERN        7
    struct {
uint3 candidates;          // 0 to 7
        uint32 mask [7];
        uint32 content [7];
uint3 prefixes [7];
uint3 non_interveners [7];
uint8 max_prefix_proximity [7];
        uint8 pattern_proximity [7];
        uint1 pattern_active [7]; // this pattern seen within 256 insns
    } preferred_preemptions;
```

In one example and embodiment, as part of instruction decode, the following actions occur in parallel for each "opcode" being decoded, in which parallel circuitry represents each potential match using:
define opcode_matches(i) ((opcode & mask [i]) == content [i])

In one example and embodiment, in parallel, ask if any candidates match for

```
                                                (int i
= 0; i < preferred_preemptions.candidates; i++) {
uint1 prefix_active, non_intervener_active;
uint8 prefix_proximity, non_intervener_proximity;
uint3 prefix_index, non_intervener_index;
prefix_index = preferred_preemptions.prefixes [i];
if (prefix_index != NO_PATTERN) {
    prefix_active = preferred_preemptions.prefix_active [prefix_index];
    prefix_proximity =
        preferred_preemptions.pattern_proximity [prefix_index];
    }
                non_intervener_index = preferred_preemptions.non_interveners [i];
    if (non_intervener_index != NO_PATTERN) {
        non_intervener_active =
            preferred_preemptions.prefix_active [non_intervener_index];
        non_intervener_proximity =
preferred_preemptions.pattern_proximity [non_intervener_index]
    }
                                if ((opcode_matches(i)) &&
        ((prefix_index == NO_PATTERN) ||
            ((prefix_active &&
                (prefix_proximity <=
                    preferred_preemptions.max_prefix_proximity [i])) &&
        ((non_intervener == NO_PATTERN) ||
            !non_intervener_active ||
            (non_intervener_proximity > prefix_proximity)))))
Signal preferred preemption point found for next machine cycle;
    }
``` ing recognition of prefix [i] but preceding recognition of the candidate represented by mask [i] and content [i]. In other words, if the nonintervener [i] pattern has been seen more recently than the prefixes [i] pattern, then matching the candidate pattern represented by mask [i] and content [i] does not identify a preferred preemption point. In one example and embodiment, when this new special-purpose instruction executes, the data contained within the 512-bit vector is loaded into the following structure and all entries of the pattern_proximity and pattern_active arrays are initialized to zero. In one example and embodiment, several non-standard data types are used in the following declaration with meanings as described immediately below:

uint1: 1-bit unsigned integer value
uint3: 3-bit unsigned integer value
uint8: 8-bit unsigned integer value
uint32: 32-bit unsigned integer value In one example and embodiment, these data structures and instruction "sequences" are implemented in hardware circuits so that they execute in parallel.

In one example and embodiment, the following "loop" also executes in parallel with all of the above code. In one example and embodiment, the changes to "global" state that occur below are not visible until the next decode cycle.

```
for (int i = 0; i < 7; i++) {
    if (opcode_matches (i)) {
        pattern_active [i] = 1;
        pattern_proximity [i] = 0;
    } else if (pattern_active [i] && (pattern_proximity [i] < 0xff))
        pattern_proximity [i]++;
    else {       // pattern_proximity overflows
        pattern_active [i] = 0;
        pattern_proximity [i] = 0;
    }
}
```

In one embodiment, preferred preemption points can also be identified by use of a preempt_at instruction.

In one embodiment, a programming language compiler generates preferred preemption points at a frequency within the machine-language representation of a program to assure that a program always reaches a preferred preemption point within a particular maximum number of machine cycles.

In one embodiment, a programming language compiler inserts preempt_at instructions into generated code whenever preferred preemption points, identified by instructions that match particular patterns, are separated, along all possible execution paths, by a distance that exceeds a threshold.

In one embodiment, (i) a compiler emits into a generated program a representation of live-register information that can be consulted by a preferred preemption point event handler to determine which registers must be saved and restored at each preferred preemption point, (ii) the representation of live-register information is independently generated for each subroutine, procedure, or function, and (iii) the live-register information is placed in memory that can be found in fast constant time by the preferred preemption point event handler when a detection of a preferred preemption point is signaled.

In one embodiment, the representation of live-register information is divided into (i) a first table that provides live-register information associated with preemption points that are identified by use of the preempt_at instruction, and (ii) a second table that provides live-register information associated with preemption points identified because the instruction opcode matches a specific pattern.

In one embodiment, the method comprises: determining that a first preferred preemption point handler is identified by a preempt_at instruction; calling the first preferred preemption point handler if preemption is triggered by execution of the instruction found at the address associated with the preempt_at instruction; determining that a second preferred preemption point is identified by an opcode that matches a particular pattern; and calling a second preferred preemption point handler if preemption is triggered by execution of the instruction found at the second preferred preemption point, wherein each preferred preemption handler consults a given table that holds the information associated with the preemption points associated only with that handler.

In one embodiment, the application program includes a first software components and a second software component that adhere to a different models of behavior, register usage conventions, and application binary interface protocols, and wherein a transition, between the first software component that adheres to one execution model to the second software component that adheres to a different execution model, includes execution of code to change a set of instruction opcode patterns that represent preferred preemption points.

In one embodiment, a supervisor which requests that a particular application thread preempt itself at its next preferred preemption point also causes a timeout alarm to fire if a running thread has not yielded to the preemption request within a particular amount of time, wherein an alarm handler forces the running thread to (i) save all registers (ii) perform a full context switch, and (iii) restore all registers when the running thread is resumed for execution.

Figure 43:
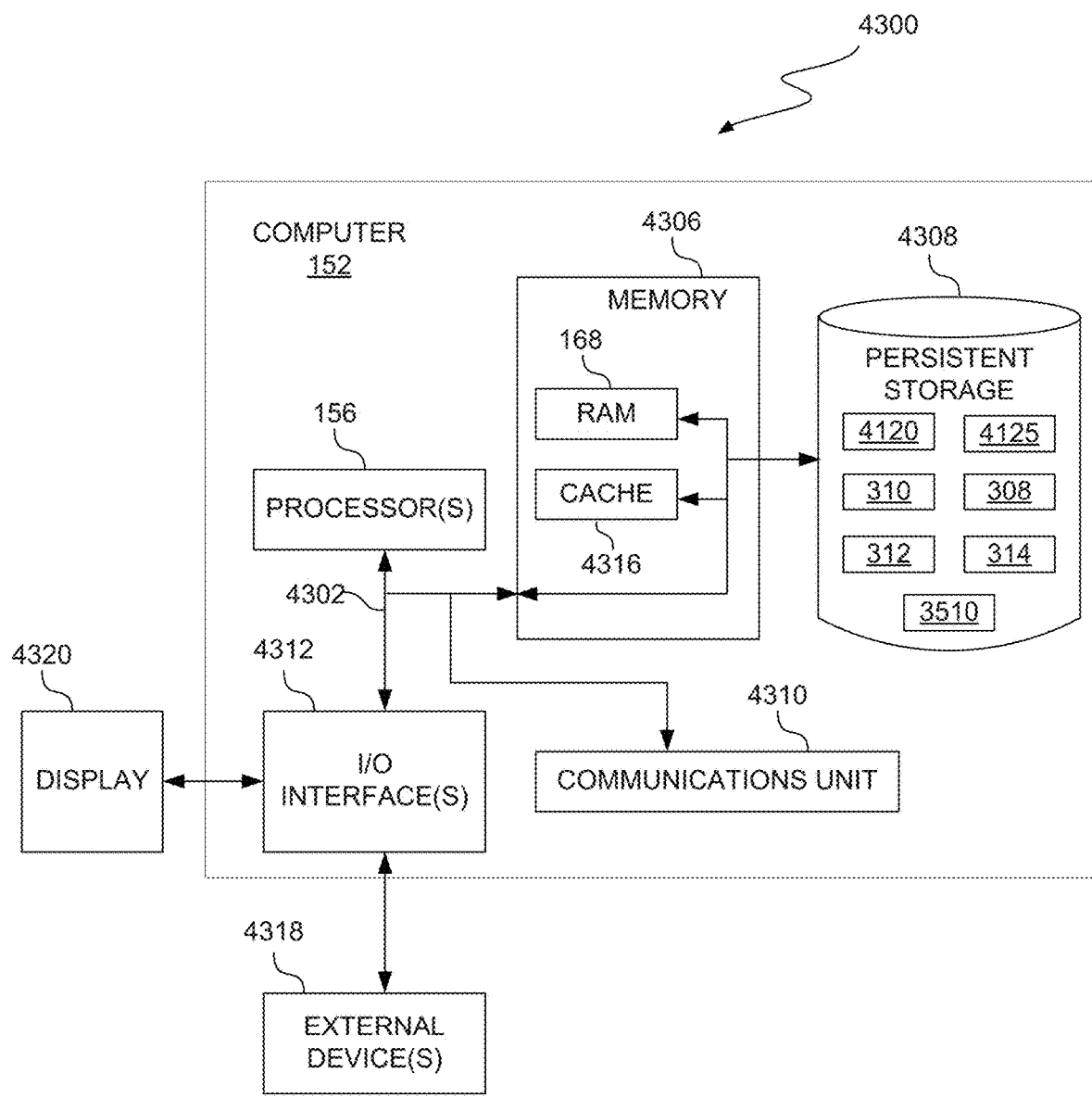
FIG. 43 depicts a block diagram of components of the computing device executing a compiler, in accordance with an exemplary embodiment of the present invention.

FIG. 43 depicts a block diagram, 4300, of components of one embodiment of computer 152 that is executing compiler 312, in accordance with an illustrative embodiment of the present invention. It should be appreciated that FIG. 43 provides only an illustration of one implementation and does not imply any limitations with regard to the environments in which different embodiments of the present invention may be implemented. Many modifications to the depicted environment may be made.

Computer 152 includes communications fabric 4302, which provides communications between computer processor(s) 156, memory 4306, persistent storage 4308, communications unit 4310, and input/output (I/O) interface(s) 4312. Communications fabric 4302 can be implemented with any architecture designed for passing data and/or control information between processors (such as microprocessors, communications and network processors, etc.), system memory, peripheral devices, and any other hardware components within a system. For example, communications fabric 4302 can be implemented with one or more buses.

Memory 4306 and persistent storage 4308 are computer-readable storage media. In this embodiment, memory 4306 includes Random-Access Memory (RAM) 168 and cache memory 4316. In general, memory 4306 can include any suitable volatile or non-volatile computer-readable storage media.

Compiled program 4120, rules 4125, thread 309, managed run-time environment 310, compiler 312, preemption point verifier 314, and operating system 3510 are stored in persistent storage 4308 for execution and/or access by one or more of the respective computer processors, denoted processor 156, via one or more memories or memory 4306. In this embodiment, persistent storage 4308 includes a magnetic hard disk drive. Alternatively, or in addition to a magnetic hard disk drive, persistent storage 4308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 4308 may also be removable. For example, a removable hard drive may be used for persistent storage 4308. Other examples include optical and magnetic disks, thumb drives, and smart cards that are inserted into a drive for transfer onto another computer-readable storage medium that is also part of persistent storage 4308.

Communications unit 4310, in these examples, provides for communications with other data processing systems or devices, including resources of network 4130. In these examples, communications unit 4310 includes one or more network interface cards. Communications unit 4310 may provide communications through the use of either or both physical and wireless communications links. Compiled program 4120, rules 4125, thread 309, managed run-time environment 310, compiler 312, preemption point verifier 314, and operating system 3510 may be downloaded to persistent storage 4308 through communications unit 4310.

I/O interface(s) 4312 allows for input and output of data with other devices that may be connected to computer 152. For example, I/O interface 4312 may provide a connection to external devices 4318 such as a keyboard, keypad, a touch screen, and/or some other suitable input device. External devices 4318 can also include portable computer-readable storage media such as, for example, thumb drives, portable optical or magnetic disks, and memory cards. Software and data used to practice embodiments of the present invention, e.g., rules 4125, thread 309, managed run-time environment 310, compiler 312, preemption point verifier 314, and operating system 3510, can be stored on such portable computer-readable storage media and can be loaded onto persistent storage 4308 via I/O interface(s) 4312. I/O interface(s) 4312 also connect to a display 4320.

Display 4320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments of the present invention, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that certain term(s) used herein may be subject to trademark rights in various jurisdictions throughout the world and are used here only in reference to the products or services properly denominated by the marks to the extent that such trademark rights may exist.

It is apparent that there has been provided approaches for compiler-assisted context switching. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

The invention claimed is:

1. A method of compiler-optimized context switching, the method comprising:
   determining that an instruction represents a preferred preemption point based on a determination that bits of an opcode representation of the instruction match a particular pattern;
   determining that the preferred preemption point has been reached by a first thread based on pattern matching of an instruction opcode that is to be decoded;
   determining that preemption of the first thread for a second thread has been requested;
   performing a context switch from the first thread to the second thread;
   using an address of a given preempted instruction to compute a hash index;
   before the context switch, using the hash index to consult a table provided by a compiler, wherein an entry within the table indicates a set of context registers that are live at a time when the given preempted instruction is to be preempted;
   saving a set of respective values of each live context register into a private memory of the first thread;
   saving a current instruction and a set of stack pointers of the first thread; and
   suspending execution of an event-based branch handler of the first thread.

2. The method of claim 1, the method comprising:
   determining that the instruction has completed execution; and
   initiating the context switch from the first thread to the second thread.

3. The method of claim 1, the method comprising:
   determining that a period of time has elapsed after execution of the first thread was suspended;
   clearing the contents of all context registers;
   restoring the current instruction and the set of stack pointers of the first thread;
   resuming execution of the event-based branch handler of the first thread, wherein the event-based branch handler restores the set of respective values to the set of context registers; and
   resuming the execution of instructions included in the first thread starting with an instruction that follows the preferred preemption point.

4. The method of claim 1, the method comprising:
   determining that that the bits of the opcode representation of the instruction matching the particular pattern is a false-positive for the preferred preemption point based on information encoded in an entry of a table provided by a compiler, wherein the event-based branch handler consults the table provided by the compiler; and
   resuming execution of the first thread with the instruction that follows the preferred preemption point.

5. The method of claim 1, wherein a set of instruction opcode patterns representing preferred preemption points are adjusted at run-time by executing non-privileged instructions at the interfaces between different execution models.

6. The method of claim 5, wherein a number of sets of preemption-identifying instruction patterns are hard coded into circuitry of a processor, and, at run-time, application code activates each of the sets of preemption-identifying instruction patterns one at a time.

7. The method of claim 6, wherein the number of sets of preemption-identifying instruction patterns are supplied by application code, of an application program, as patterns at run time.

8. The method of claim 6, wherein occurrence of certain instructions that match patterns belonging to certain of the number of sets of preemption-identifying instruction patterns is only counted as identification of a preferred preemption point if the matched instruction is preceded by execution of a certain prefix instruction at a certain maximum distance from the candidate matched instruction and there is no intervening instruction that disqualifies the prefix instruction.

9. The method of claim 7, wherein certain of the preemption-identifying patterns, included in the number of sets of preemption-identifying instruction patterns, are only considered eligible for matching if preceded by a particular prefix instruction at a distance of not more than a number of instructions from a given candidate matched instruction and not preceded by an occurrence of a particular non-intervening instruction between the prefix instruction and the given candidate matched instruction.

10. The method of claim 1, wherein preferred preemption points can also be identified by use of a preempt_at instruction.

11. The method of claim 1, wherein a programming language compiler generates preferred preemption points at a frequency within a machine-language representation of a program to assure that the program always reaches a preferred preemption point within a particular maximum number of machine cycles.

12. The method of claim 1, wherein a programming language compiler inserts preempt_at instructions into generated code whenever preferred preemption points, identified by instructions that match particular patterns, are separated, along a set of possible execution paths, by a distance that exceeds a threshold.

13. The method of claim 10, wherein (i) a compiler emits into a generated program a representation of live-register information that can be consulted by a preferred preemption point event handler to determine which registers must be saved and restored at each preferred preemption point, (ii) the representation of live-register information is independently generated for each subroutine, procedure, or function, and (iii) the live-register information is placed in memory that can be found in fast constant time by the preferred preemption point event handler when a detection of a preferred preemption point is signaled.

14. The method of claim 13, wherein the representation of live-register information is divided into (i) a first table that provides live-register information associated with preemption points that are identified by use of the preempt_at instruction, and (ii) a second table that provides live-register information associated with preemption points identified because the instruction opcode matches a specific pattern.

15. The method of claim 14, the method comprising:
determining that a first preferred preemption point handler is identified by a given preempt_at instruction;
calling the first preferred preemption point handler if preemption is triggered by execution of the instruction found at the address associated with the given preempt_at instruction;
determining that a second preferred preemption point is identified by an opcode that matches a given particular pattern; and
calling a second preferred preemption point handler if preemption is triggered by execution of the instruction found at the second preferred preemption point, wherein each preferred preemption handler consults a given table that holds the information associated with the preemption points associated only with that handler.

16. The method of claim 7, wherein the application program includes a first software components and a second software component that adhere to a different models of behavior, register usage conventions, and application binary interface protocols, and wherein a transition, between the first software component that adheres to one execution model to the second software component that adheres to a different execution model, includes execution of code to change a set of instruction opcode patterns that represent a set of preferred preemption points.

17. The method of claim 1, wherein a supervisor which requests that a particular application thread preempt itself at its next preferred preemption point also causes a timeout alarm to fire if a running thread has not yielded to the preemption request within a particular amount of time, wherein an alarm handler forces the running thread to (i) save data included in a set of registers, (ii) perform a full context switch, and (iii) restore the data included in the set of registers when the running thread is resumed for execution.

18. A computer system for generating context switching locations, the computer system comprising:
one or more computer processors;
at least one computer readable storage medium that is not a transitory signal per se; and
program instructions stored on the at least one computer readable storage medium, the program instructions being executable by at least one computer processor of the one or more computer processors to cause the at least one computer processor to perform a method comprising:
determining that an instruction represents a preferred preemption point based on a determination that bits of an opcode representation of the instruction match a particular pattern;
determining that the preferred preemption point has been reached by a first thread based on pattern matching of an instruction opcode that is to be decoded;
determining that preemption of the first thread for a second thread has been requested;
performing a context switch from the first thread to the second thread;
using an address of a given preempted instruction to compute a hash index;
before the context switch, using the hash index to consult a table provided by a compiler, wherein an entry within the table indicates a set of context registers that are live at a time when the given preempted instruction is to be preempted;
saving a set of respective values of each live context register into a private memory of the first thread;
saving a current instruction and a set of stack pointers of the first thread; and
suspending execution of an event-based branch handler of the first thread.

19. A computer program product for generating context switching locations, the computer program product comprising a computer readable storage medium having program instructions embodied therewith, wherein the computer readable storage medium is not a transitory signal per se, the program instructions executable by a device to cause the device to perform a method comprising:
determining that an instruction represents a preferred preemption point based on a determination that bits of an opcode representation of the instruction match a particular pattern;
determining that the preferred preemption point has been reached by a first thread based on pattern matching of an instruction opcode that is to be decoded;
determining that preemption of the first thread for a second thread has been requested;

performing a context switch from the first thread to the second thread;

using an address of a given preempted instruction to compute a hash index;

before the context switch, using the hash index to consult a table provided by a compiler, wherein an entry within the table indicates a set of context registers that are live at a time when the given preempted instruction is to be preempted;

saving a set of respective values of each live context register into a private memory of the first thread;

saving a current instruction and a set of stack pointers of the first thread; and suspending execution of an event-based branch handler of the first thread.

* * * * *